US012011962B2

(12) United States Patent
Harmon et al.

(10) Patent No.: US 12,011,962 B2
(45) Date of Patent: Jun. 18, 2024

(54) CONFIGURABLE VEHICLE FRAMES AND ASSOCIATED METHODS

(71) Applicant: Ford Global Technologies, LLC, Dearborn, MI (US)

(72) Inventors: Michael John Harmon, Westland, MI (US); Hussain Z. Tajmahal, Detroit, MI (US); Marielle Conrad, Detroit, MI (US); Benjamin Jordan Curtis, Ferndale, MI (US); David Earl Ooms, Canton, MI (US); Yejin Han, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/993,701

(22) Filed: Nov. 23, 2022

(65) Prior Publication Data
US 2023/0088224 A1    Mar. 23, 2023

Related U.S. Application Data

(63) Continuation of application No. 17/243,394, filed on Apr. 28, 2021, now Pat. No. 11,518,206.

(51) Int. Cl.
*B60G 17/015*    (2006.01)
*B60K 1/04*    (2019.01)
(Continued)

(52) U.S. Cl.
CPC .............. *B60G 17/015* (2013.01); *B60K 1/04* (2013.01); *B60G 2300/50* (2013.01);
(Continued)

(58) Field of Classification Search
CPC .............. B60G 17/015; B60G 2300/50; B60G 2500/30; B62D 63/025; B62D 21/12;
(Continued)

(56) References Cited

U.S. PATENT DOCUMENTS

| 4,854,772 A | 8/1989 | Sinkkonen |
| 4,881,756 A | 11/1989 | Kumasaka et al. |

(Continued)

FOREIGN PATENT DOCUMENTS

| CN | 203739574 U | 7/2014 |
| CN | 205601992 U | 9/2016 |

(Continued)

OTHER PUBLICATIONS

Acer, Chassis Frame With Variable Assembly Interface, May 12, 2010, EPO, EP 2184220 A2, Machine Translation of Description (Year: 2010).*

(Continued)

*Primary Examiner* — Paul N Dickson
*Assistant Examiner* — Matthew D Lee
(74) *Attorney, Agent, or Firm* — Lorne Forsythe; Hanley, Flight & Zimmerman, LLC

(57) ABSTRACT

An example vehicle frame disclosed herein includes a convex surface to face the ground when the vehicle frame is in a first operating position and face away from the ground when the vehicle frame is in a second operating position, the vehicle frame rotatable about a longitudinal axis of the vehicle frame between the first and second operating positions, and a concave surface opposite the convex surface, the concave surface to face away from the ground when the vehicle frame is in the first operating position and face the ground when the vehicle frame is in the second operating position.

19 Claims, 36 Drawing Sheets

(51) Int. Cl.
  *B60K 6/26* (2007.10)
  *B60K 6/28* (2007.10)
(52) U.S. Cl.
  CPC .. *B60G 2500/30* (2013.01); *B60K 2001/0438* (2013.01); *B60K 6/26* (2013.01); *B60K 6/28* (2013.01); *B60Y 2200/91* (2013.01); *B60Y 2200/92* (2013.01)
(58) Field of Classification Search
  CPC ........ B62D 21/14; B62D 33/08; B62D 33/10; B60K 1/04; B60K 2001/0438; B60Y 2200/91
  See application file for complete search history.

(56) References Cited

U.S. PATENT DOCUMENTS

| | | | |
|---|---|---|---|
| 5,401,056 | A | 3/1995 | Eastman |
| 5,934,397 | A | 8/1999 | Schaper |
| 6,021,861 | A | 2/2000 | Dickson |
| 6,199,894 | B1 | 3/2001 | Anderson |
| 6,817,655 | B2 | 11/2004 | Durand |
| 7,648,170 | B2 | 1/2010 | Geslin et al. |
| 7,780,197 | B2 | 8/2010 | White |
| 7,849,945 | B2 | 12/2010 | Ross, VII et al. |
| 8,205,892 | B2 | 6/2012 | Mackin et al. |
| 8,746,383 | B2 | 6/2014 | Basadzishvili |
| 8,925,941 | B2 | 1/2015 | Cordier et al. |
| 9,030,063 | B2 | 5/2015 | Rawlinson et al. |
| 9,085,302 | B2 | 7/2015 | Borroni-Bird et al. |
| 9,126,500 | B2 | 9/2015 | Ozaki |
| 9,168,818 | B2 | 10/2015 | Hirai et al. |
| 9,302,723 | B1 | 4/2016 | Pollitzer et al. |
| 9,636,949 | B2 | 5/2017 | Jong |
| 10,384,556 | B1 | 8/2019 | Miyata et al. |
| 10,569,663 | B2 | 2/2020 | Webb |
| 10,603,997 | B2 | 3/2020 | Bergstrom et al. |
| 10,723,211 | B2 | 7/2020 | Mastrandrea |
| 10,870,341 | B2 | 12/2020 | Hung et al. |
| 10,960,939 | B1 | 3/2021 | Kentley-Klay et al. |
| 11,235,824 | B2 | 2/2022 | Ishikawa et al. |
| 11,518,206 | B2 | 12/2022 | Harmon et al. |
| 2003/0094320 | A1* | 5/2003 | Chernoff ............... B60K 15/07 180/54.1 |
| 2009/0194985 | A1 | 8/2009 | McGuire |
| 2012/0208429 | A1 | 8/2012 | Sheridan et al. |
| 2014/0224557 | A1 | 8/2014 | Wu |
| 2016/0059895 | A1* | 3/2016 | Kariniemi ............. B62D 21/11 280/781 |
| 2016/0229293 | A1 | 8/2016 | Seo et al. |
| 2017/0001667 | A1 | 1/2017 | Ashraf et al. |
| 2017/0120951 | A1 | 5/2017 | Ashraf et al. |
| 2018/0345777 | A1 | 12/2018 | Birnschein et al. |
| 2018/0345971 | A1 | 12/2018 | Birnschein et al. |
| 2020/0079201 | A1 | 3/2020 | Suzuki et al. |
| 2020/0102014 | A1 | 4/2020 | Sakai et al. |
| 2020/0148292 | A1* | 5/2020 | Hosbach ............... B62D 65/04 |
| 2020/0324817 | A1* | 10/2020 | Hammond, Jr. ...... B62D 63/025 |
| 2020/0331533 | A1 | 10/2020 | Jin |
| 2021/0001924 | A1 | 1/2021 | Charbonneau et al. |
| 2021/0031837 | A1 | 2/2021 | Schmidt |
| 2021/0070123 | A1* | 3/2021 | Haeusler ................ B60G 3/04 |
| 2021/0300322 | A1 | 9/2021 | Toda et al. |
| 2021/0394780 | A1* | 12/2021 | Thomas ............... B62D 63/025 |
| 2022/0055701 | A1* | 2/2022 | Faga ...................... B62D 65/16 |
| 2022/0063434 | A1 | 3/2022 | King, Jr. et al. |
| 2022/0135133 | A1 | 5/2022 | Cai et al. |
| 2022/0348065 | A1 | 11/2022 | Harmon et al. |
| 2022/0348259 | A1 | 11/2022 | Harmon et al. |
| 2022/0348260 | A1 | 11/2022 | Harmon et al. |
| 2022/0348275 | A1 | 11/2022 | Harmon et al. |
| 2022/0348277 | A1 | 11/2022 | Harmon et al. |
| 2022/0355636 | A1 | 11/2022 | Harmon et al. |

FOREIGN PATENT DOCUMENTS

| | | | | |
|---|---|---|---|---|
| CN | 107235087 | A | | 10/2017 |
| CN | 112140856 | A | | 12/2020 |
| CN | 215663648 | U | * | 1/2022 ............... B60K 1/04 |
| CN | 114644045 | A | | 6/2022 |
| CN | 114654988 | A | * | 6/2022 |
| CN | 114701346 | A | * | 7/2022 |
| DE | 10154353 | A1 | | 5/2002 |
| EP | 1908674 | A1 | | 9/2008 |
| EP | 2184220 | B1 | | 4/2013 |
| FR | 3052110 | A1 | | 8/2017 |
| GB | 2470105 | A | | 11/2010 |
| IN | 205396209 | U | | 7/2016 |
| JP | 2020128152 | A | | 8/2020 |
| KR | 101759426 | B1 | | 7/2017 |
| TW | 202028041 | A | | 8/2020 |
| WO | 2012117204 | A1 | | 9/2012 |
| WO | 2017075523 | A2 | | 5/2017 |
| WO | 2017123597 | A1 | | 7/2017 |
| WO | 2019231372 | A1 | | 12/2019 |
| WO | 2020040685 | A1 | | 2/2020 |
| WO | 2020109498 | A1 | | 6/2020 |
| WO | 2020119848 | A1 | | 6/2020 |

OTHER PUBLICATIONS

Ramsey, "Tech Startup Ree Partners with Tier 1 Supplier on a Revolutionary EV Platform," Autoblog, May 28, 2020, retrieved from [https://www.autoblog.com/2020/05/28/ree-reecorner-reeboard-electric-car-platform/#slide-2236465] on Nov. 13, 2020, 5 pages.

United States Patent and Trademark Office, "Notice of Allowance and Fee(s) Due," dated Aug. 2, 2022, in connection with U.S. Appl. No. 17/243,394, 16 pages.

United States Patent and Trademark Office, "Restriction Requirement," dated Dec. 12, 2022 in connection with U.S. Appl. No. 17/243,383, 6 pages.

United States Patent and Trademark Office, "Non-Final Office Action," dated Jan. 27, 2023 in connection with U.S. Appl. No. 17/243,376, 11 pages.

United States Patent and Trademark Office, "Notice of Allowance," dated Feb. 23, 2023 in connection with U.S. Appl. No. 17/243,387, 8 pages.

United States Patent and Trademark Office, "Notice of Allowance," dated Feb. 27, 2023 in connection with U.S. Appl. No. 17/243,390, 9 pages.

United States Patent and Trademark Office, "Non-Final Office Action," dated Mar. 7, 2023 in connection with U.S. Appl. No. 17/243,383, 9 pages.

United States Patent and Trademark Office, "Non-Final Office Action," dated Mar. 20, 2023 in connection with U.S. Appl. No. 17/243,371, 7 pages.

United States Patent and Trademark Office, "Advisory Action," dated Oct. 17, 2023 in connection with U.S. Appl. No. 17/243,376, 3 pages.

United States Patent and Trademark Office, "Notice of Allowance and Fee(s) Due," dated Nov. 21, 2023 in connection with U.S. Appl. No. 17/243,376, 10 pages.

United States Patent and Trademark Office, "Notice of Allowance and Fee(s) Due," issued in connection with U.S. Appl. No. 17/243,387, dated Jun. 12, 2023, 5 pages.

United States Patent and Trademark Office, "Final Office Action," issued in connection with U.S. Appl. No. 17/243,376, dated Jul. 13, 2023, 14 pages.

United States Patent and Trademark Office, "Notice of Allowance and Fee(s) Due," issued in connection with U.S. Appl. No. 17/243,383, dated Aug. 14, 2023, 8 pages.

United States Patent and Trademark Office, "Notice of Allowance and Fee(s) Due," issued in connection with U.S. Appl. No. 17/243,371, dated Aug. 24, 2023, 5 pages.

* cited by examiner

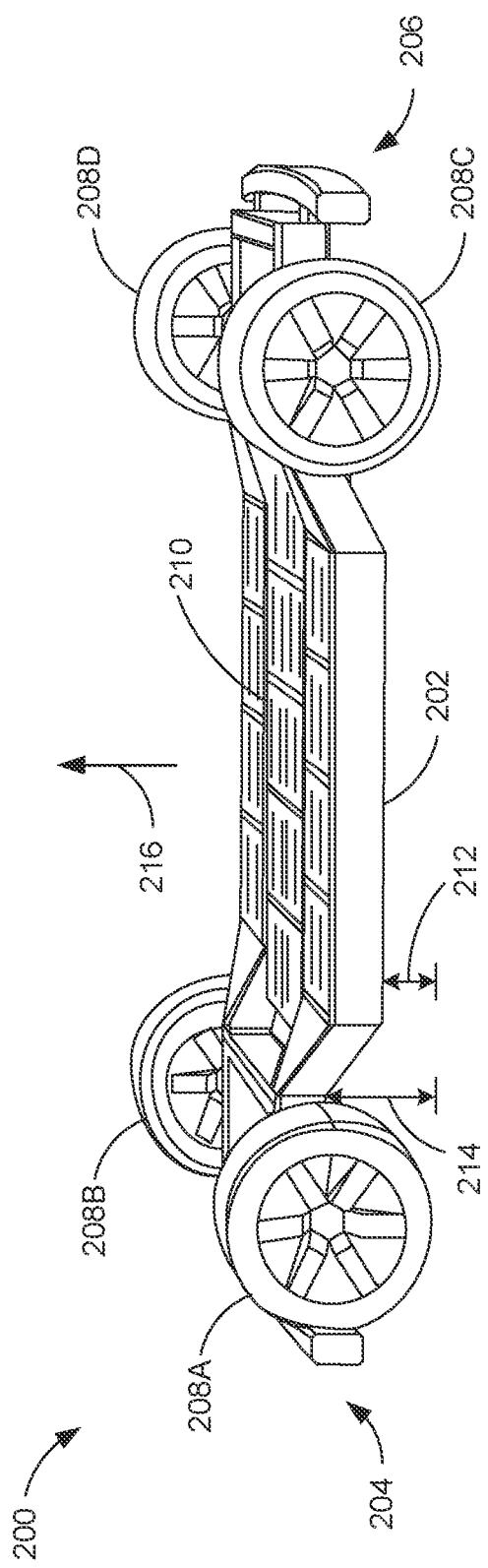
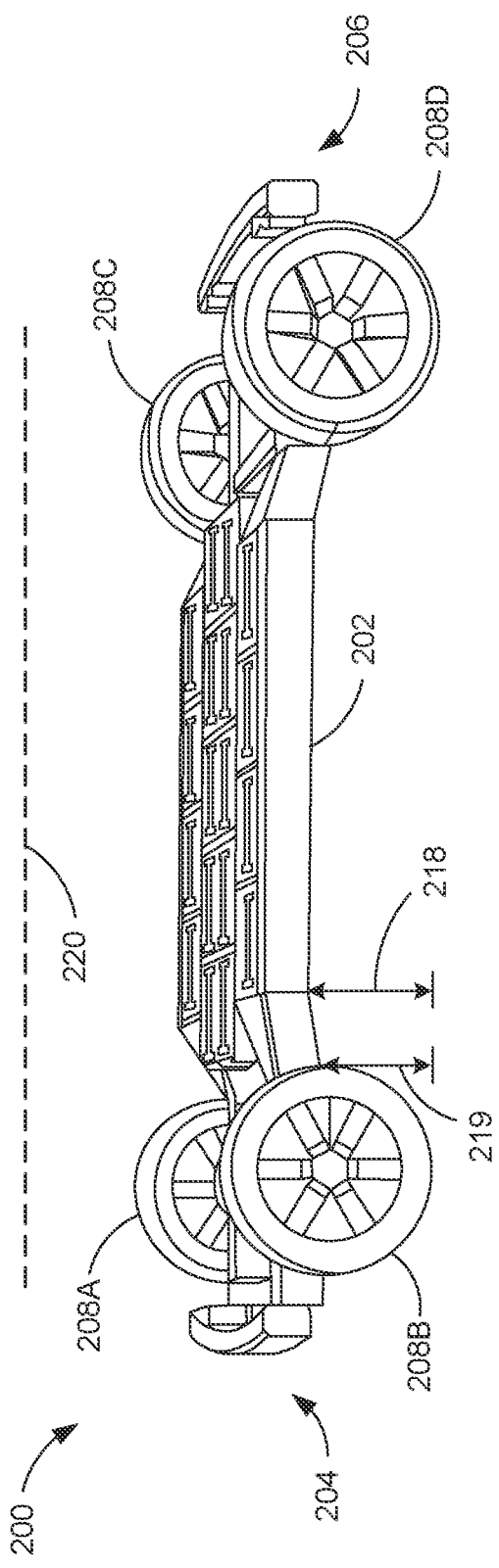

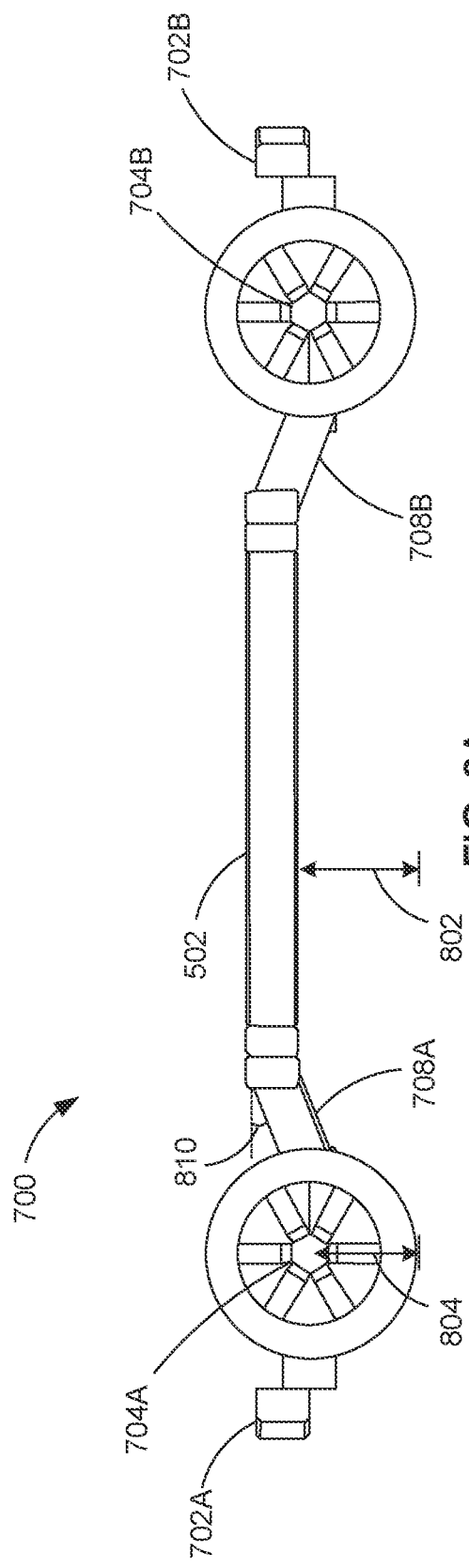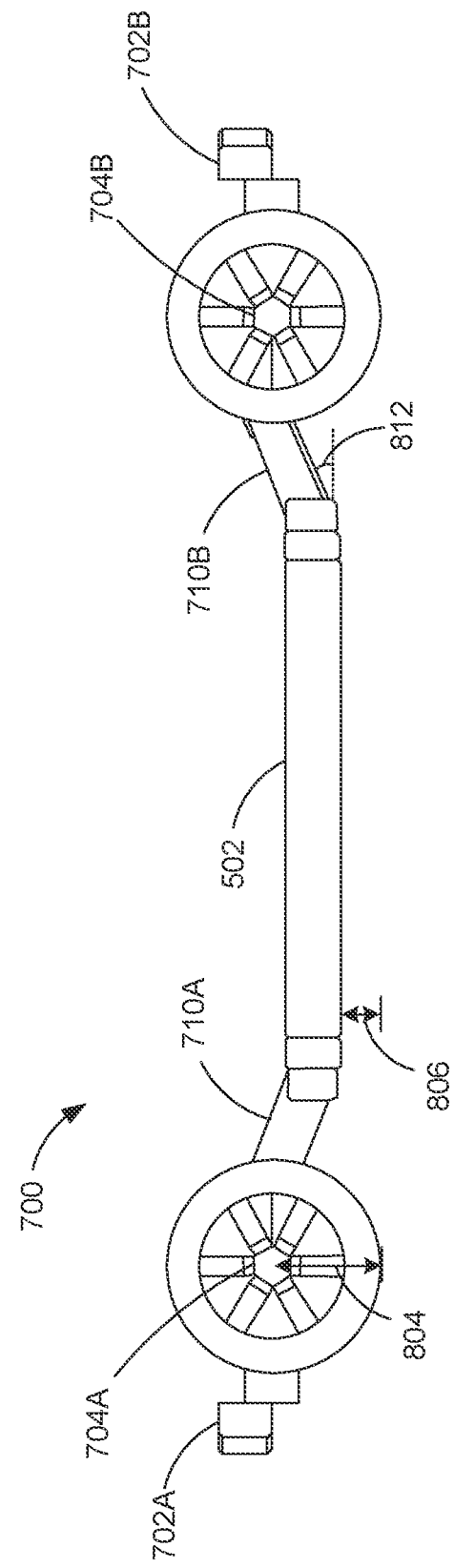

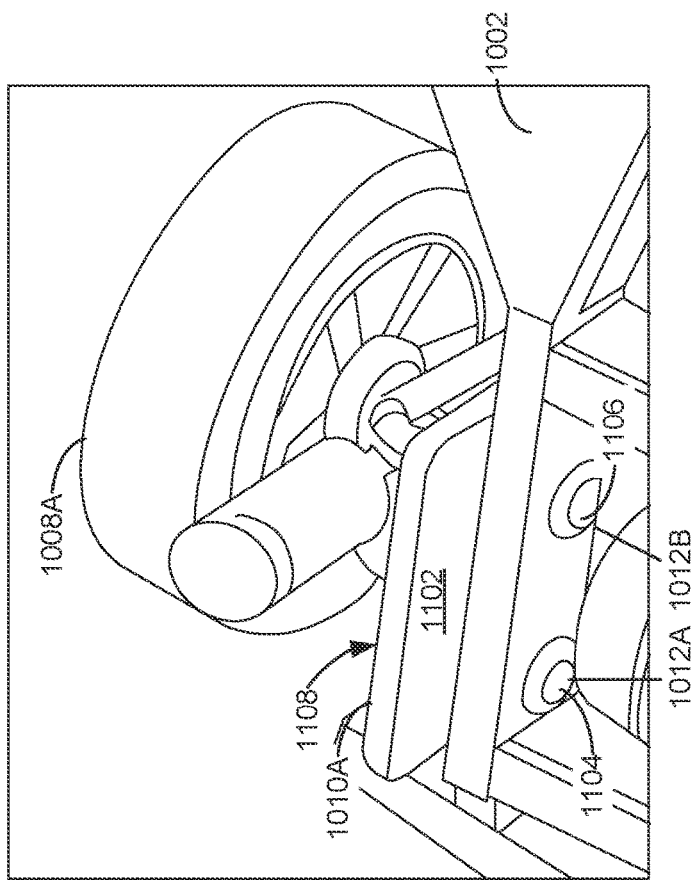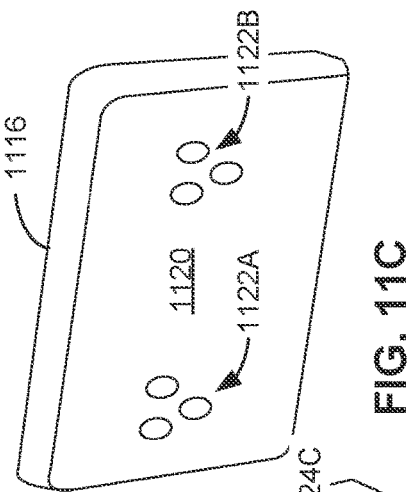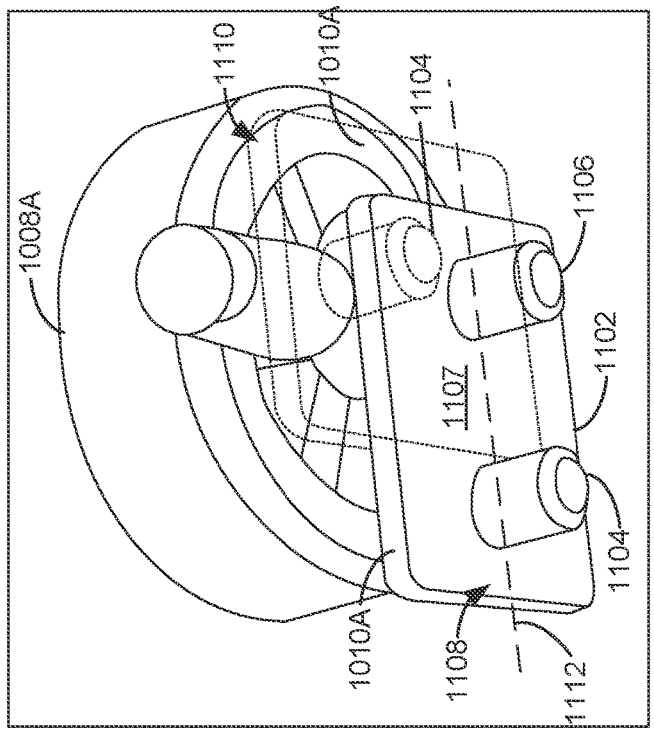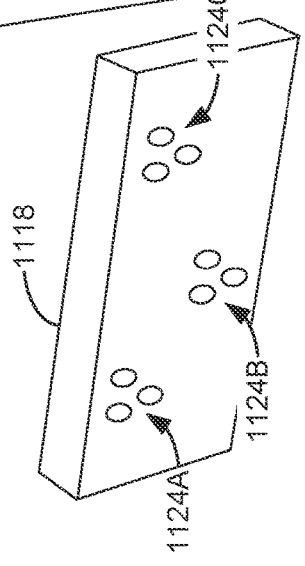
FIG. 11A  FIG. 11B  FIG. 11C

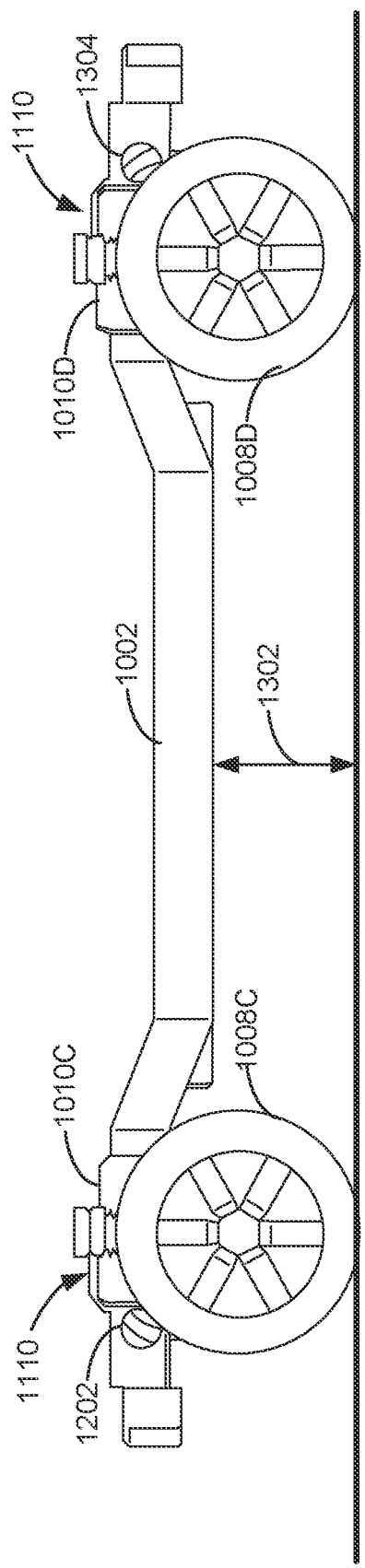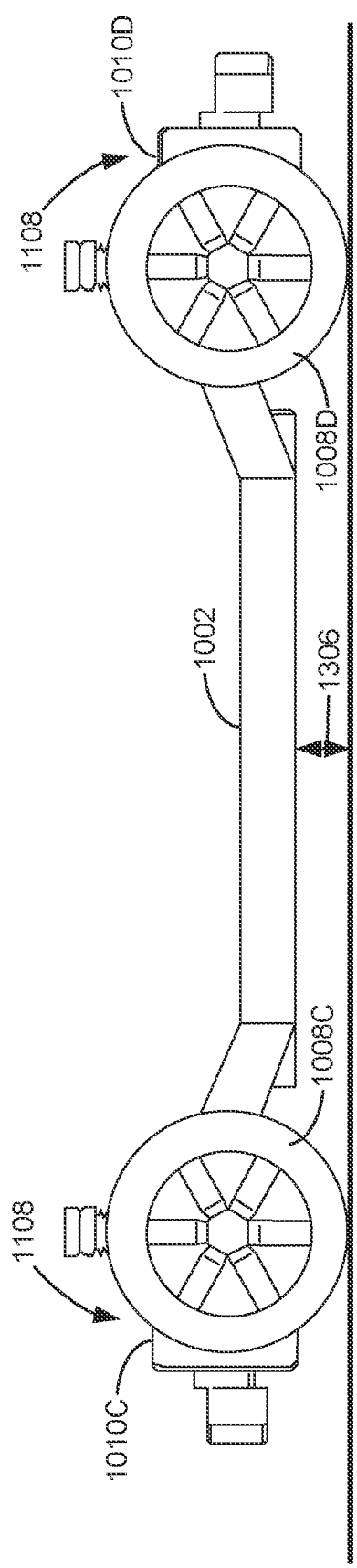
FIG. 13A
FIG. 13B

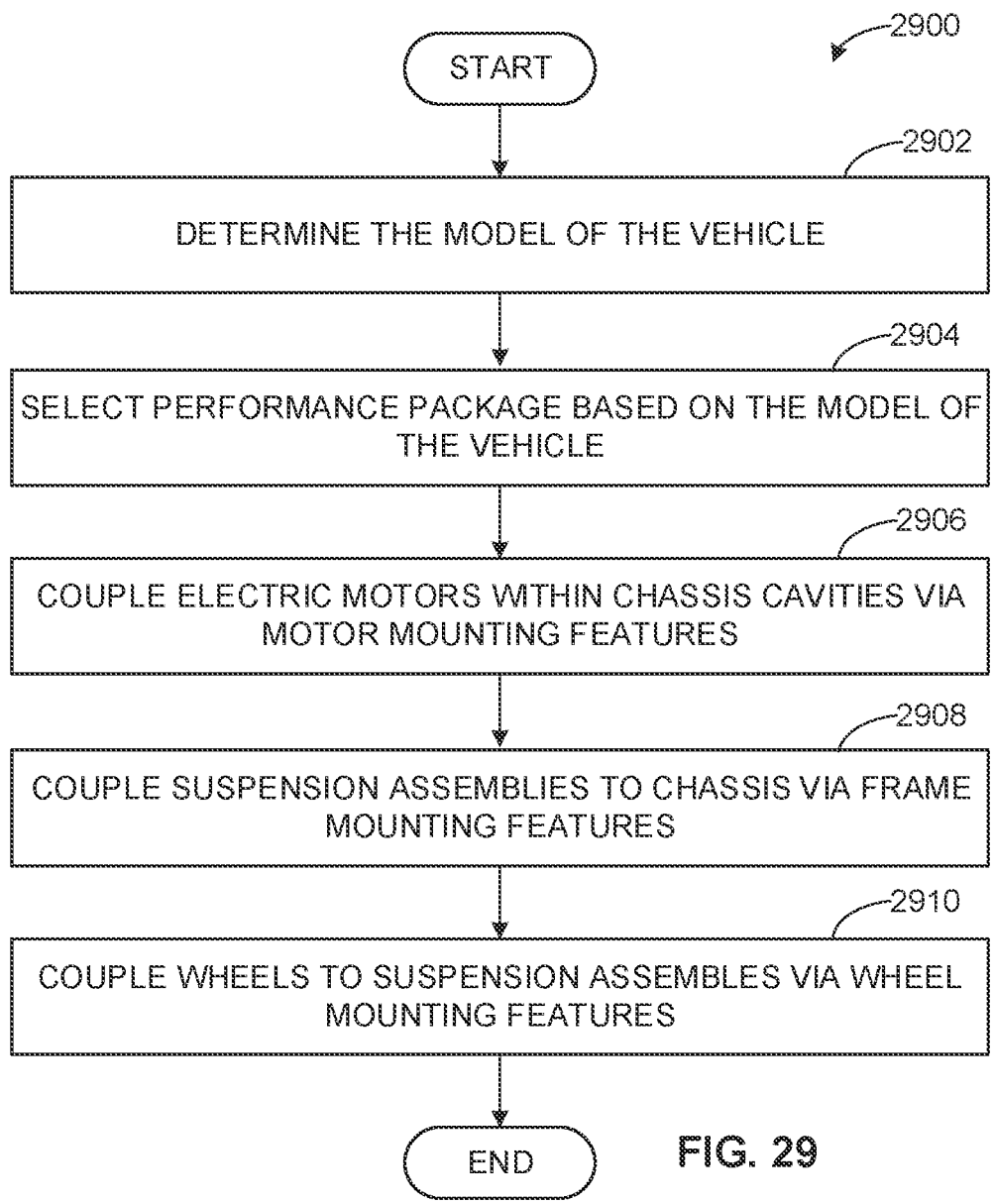

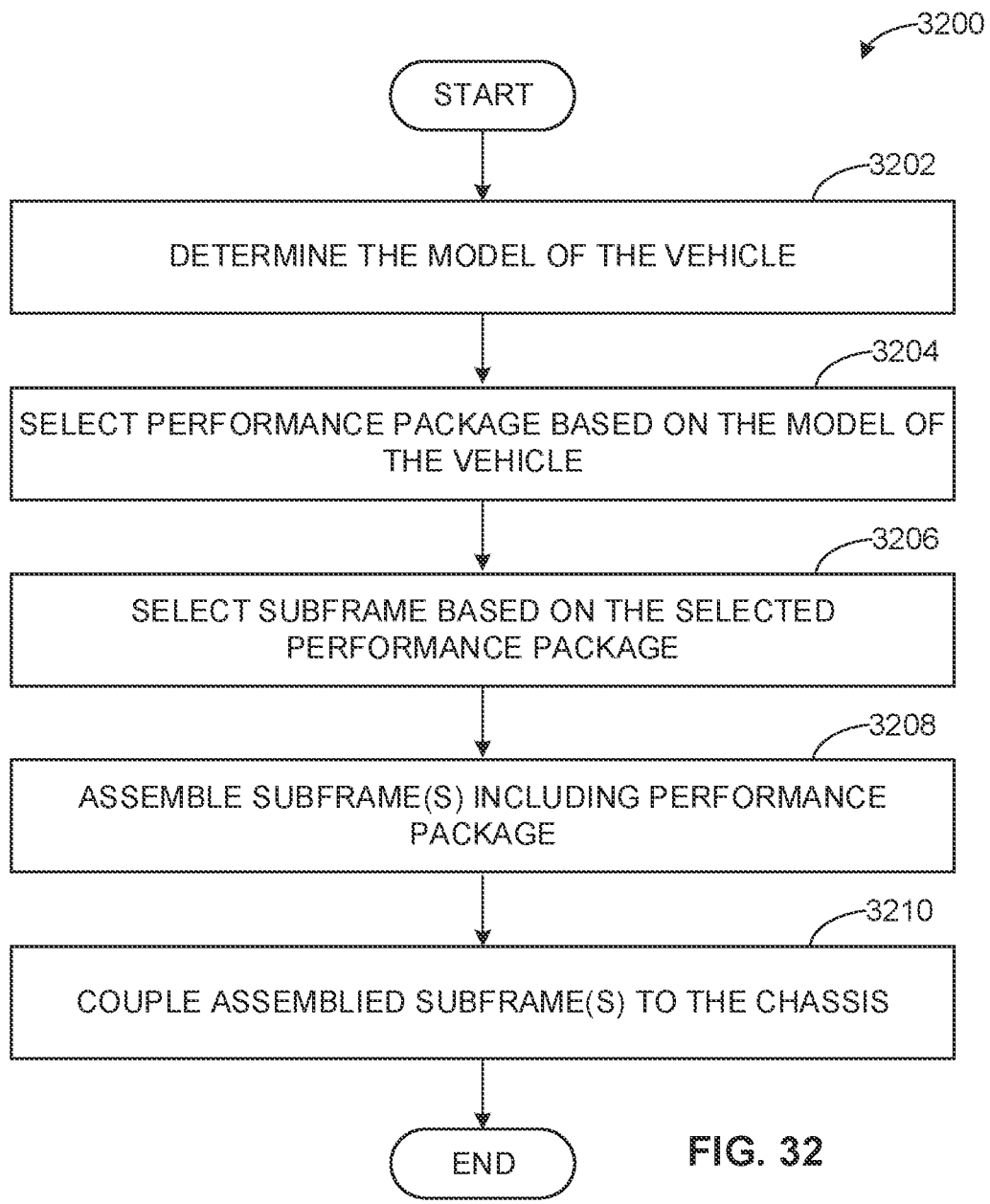

CONFIGURABLE VEHICLE FRAMES AND ASSOCIATED METHODS

RELATED APPLICATION

This patent arises from a continuation of U.S. patent application Ser. No. 17/243,394, filed on Apr. 28, 2021 and entitled "CONFIGURABLE VEHICLE FRAMES AND ASSOCIATED METHODS," which is incorporated herein by reference in its entirety.

FIELD OF THE DISCLOSURE

This disclosure relates generally to vehicles and, more particularly, to configurable vehicle frames and associated methods.

BACKGROUND

A vehicle frame is the main supporting structure of a vehicle. Vehicle frames can be body-on-frame constructions, where the body of the vehicle is separate from the frame, or unibody constructions, where the frame and the body are integrated. The vehicle frame supports mechanical components of the vehicle and manages the static and dynamic loads on the vehicle (e.g., the weight of passengers and cargo, torsional twisting due to uneven road surfaces, torque from a vehicle engine and/or transmission, etc.). In some examples, vehicle frames include subframes. Subframes are discrete structures within the frame that support specific vehicle structures.

SUMMARY

An example vehicle frame disclosed herein includes end frames and a central frame coupled between the end frames. The central frame is positioned at an offset relative to the end frames, and the vehicle frame is rotatable about a longitudinal axis of the vehicle frame between a first position and a second position. The central frame is at a first distance from the ground when the vehicle frame is in the first position, and the central frame is at a second distance from the ground when the vehicle frame is in the second position, the second distance greater than the first distance.

An example vehicle disclosed herein includes a vehicle frame rotatable about a longitudinal axis between first and second positions. The vehicle frame has a first ride height when the vehicle frame is in the first position, and the vehicle frame has a second ride height when the vehicle frame is in the second position, the second ride height greater than the first ride height. The vehicle includes one of a first type of vehicle body or a second type of vehicle body. The first type of vehicle body is coupled to the vehicle frame when the vehicle frame is in the first position, and the second type of vehicle body coupled to the vehicle frame when the vehicle frame is in the second position, the second type of vehicle body different from the first type of vehicle body.

An example method disclosed herein includes in response to determining that a vehicle is to have a first ride height, rotating a vehicle frame of the vehicle about a longitudinal axis to a first position. The vehicle frame is rotatable between the first position and a second position. The vehicle frame has the first ride height when the vehicle frame is in the first position, and the vehicle frame has a second ride height when the vehicle frame is in the second position, the second ride height greater than the first ride height. One of a first type of vehicle body or a second type of vehicle body is coupled to the vehicle frame. The first type of vehicle body is coupled to the vehicle frame when the vehicle frame is in the first position, and the second type of vehicle body is coupled to the vehicle frame when the vehicle frame is in the second position, the second type of vehicle body different from the first type of vehicle body.

BRIEF DESCRIPTION OF THE DRAWINGS

FIG. 2A illustrates an example reversible frame in accordance with teachings of this disclosure and configured for a low ride height of the example vehicle of FIG. 1.

FIG. 2B illustrates the example reversible frame of FIG. 2A configured for a high ride height of the example vehicle of FIG. 1.

FIG. 8A illustrates the second example configurable vehicle chassis of FIG. 7 configured for a high ride height of the example vehicle of FIG. 1.

FIG. 8B illustrates the second example configurable vehicle chassis of FIGS. 7 and/or 8A configured for a low ride height of the example vehicle of FIG. 1.

FIG. 11A illustrates an example wheel assembly mount of FIG. 10 configured for a low ride height and a high ride height of the example vehicle of FIG. 1.

FIG. 11B illustrates an example wheel assembly mount of FIG. 10 coupled to the example vehicle frame of FIG. 10 for a low ride height of the example vehicle of FIG. 1.

FIG. 11C illustrates an example alternative wheel assembly mount and alternative rail portion of the frame for an adjustable ride height of the example vehicle of FIG. 1.

FIG. 13A illustrates the example vehicle frame of FIG. 10 as configured using the example wheel assembly mounts of FIG. 12B for a high ride height of the example vehicle of FIG. 1.

FIG. 13B illustrates the example vehicle frame of FIG. 10 as configured using the example wheel assembly mounts of FIG. 12A for a low ride height of the example vehicle of FIG. 1.

FIG. 29 is a flowchart representative of an example method to assemble the example chassis of FIG. 28 with one of the interchangeable performance packages of FIGS. 27A-27C.

FIG. 32 is a flowchart representative of an example method to assemble the example chassis of FIG. 31 with one of the interchangeable subframes of FIG. 30A-30C.

Figure 1:
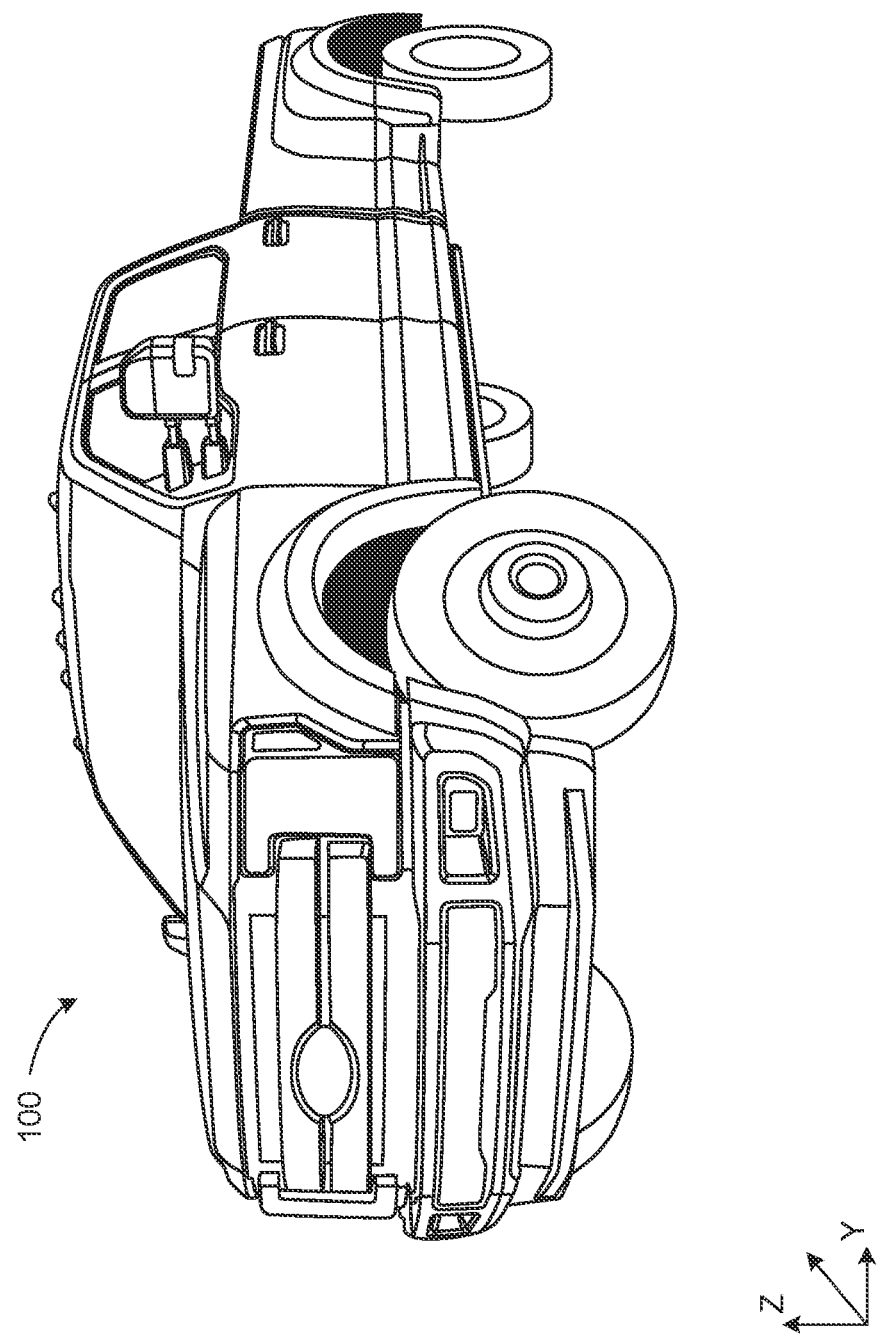
FIG. 1 is a perspective view of a vehicle in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. In general, the attached figures are annotated with a set of axes including the lateral axis (Y), the longitudinal axis (X), and the vertical axis (Z). As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

As used herein, the term "width" refers to the dimension of a vehicle along the lateral axis. As used herein, when referring to a vehicle and/or chassis, the term "length" refers to the dimension of a vehicle along the longitudinal axis. As used herein, when referring to a structural member, the term "length" refers to the dimension of the structural perpendicular to the cross-section of the structural member (e.g., the dimension of a crossmember along the lateral axis, the dimension of a side rail along the longitudinal axis, etc.). As used herein, the term "footprint" refers to the projected area of a vehicle in a plane defined by the lateral and longitudinal axes.

As used herein, the term "chassis" refers to the structural components of a vehicle, and generally includes the frame of the vehicle and one or more of the suspension system(s), the steering components, the powertrain, the drivetrain, the wheels, the brakes, etc. As used herein, the term "frame" refers to the main structural component of the vehicle to which the other components are coupled. As used herein, the term "crossmember" is used to refer to structural members of the frame that extend laterally. As used herein, the term "side rail" is used to refer to structural members of the frame that extend axially.

The examples disclosed herein include structural members that are generally depicted as tubes having rectangular cross-sections. However, the structural members described herein can be of any other suitable shape (e.g., circular, ovoid, polygonal, etc.). Additionally, the structural members described herein can be solid or have walls of any suitable thickness.

In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.).

Vehicles (e.g., cars, trucks, vans, etc.) typically include a vehicle chassis including a vehicle frame with wheels coupled thereto. In battery-powered electric vehicles, one or more battery packs are positioned on the vehicle frame and are used to power one or more electric motors operatively coupled to the wheels. In some instances, a ride height of the vehicle is selected based on a type and/or function of the vehicle, where the ride height of the vehicle corresponds to a clearance or distance between the vehicle frame and the ground. In some known vehicles, different vehicle frames are implemented on the vehicles to configure the vehicles for different ride heights. The selection of the ride height for a vehicle includes trade-offs such as, handling, ride quality, and practicality. For example, a higher ride height allows the wheels to absorb larger road displacements (e.g., sudden changes in the road surface) and allows the vehicle to more easily drive on uneven roads without causing significant impacts to the vehicle frame. However, a lower ride height provides a lower center of mass for the vehicle, which improves the handling of the vehicle, particularly at higher speeds. Commonly, multiple vehicle frames are constructed with different structural components and geometries to produce vehicles having various ride heights. While the ride height of a vehicle can be adjusted by making modifications to the vehicle frame, modifications to the vehicle frame to adjust the ride height can be laborious and require numerous additional parts.

Some examples disclosed herein implement a vehicle chassis that can be configured for two different ride heights. A first example vehicle chassis includes an example reversible vehicle frame, which includes an example central frame (e.g., a base frame) coupled between example end frames having wheels coupled thereto. The central frame is positioned at an offset (e.g., a vertical offset) from the end frames. The reversible vehicle frame is rotatable about an example longitudinal axis between a first position and a second position. The central frame is at a first distance from the ground when the reversible frame is in the first position, and the central frame is at a second distance from the ground when the reversible frame is in the second position, where the first distance is greater than the second distance. Stated differently, the reversible frame in the first position is configured for a high ride height, and the reversible frame in the second position is configured for a low ride height. Advantageously, by providing a reversible frame that is configurable for different ride heights, a number of parts required and/or manufacturing complexity of the vehicle is significantly reduced.

Another example configurable vehicle chassis disclosed herein includes an example central frame (e.g., a base frame) couplable between first example frame subassemblies and second example frame subassemblies, where each of the first and second frame subassemblies defines a wheel axle. The first frame subassemblies include first bridge portions that are oriented generally upward relative to the wheel axles, and the second frame subassemblies include second bridge portions oriented generally downward relative to the wheel axles. The central frame is at a first distance from the ground when coupled between the first frame subassemblies, and the central frame is at a second distance from the ground when the central frame is coupled between the second frame subassemblies, where the first distance is greater than the second distance. Stated differently, the configurable vehicle chassis is configured for a high ride height when the central frame is coupled between the first frame subassemblies, and the configurable vehicle chassis is configured for a low ride height when the central frame is coupled between the second frame subassemblies.

Another example configurable vehicle chassis disclosed herein includes example upward and downward bridge portions (e.g., first and second bridge portions) couplable between the central frame and subassemblies defining wheel axles, where the central frame and subassemblies are the same for vehicles having different ride height requirements. In examples disclosed herein, the third configurable vehicle chassis is configured for a high ride height when the central frame is coupled to the subassemblies via the upward bridge portions, and the second configurable vehicle chassis is configured for a low ride height when the central frame is to the subassemblies via the downward bridge portions. As such, the example configurable vehicle chassis are configurable for different ride heights by selectively coupling different frame subassemblies and/or bridge portions to the central frame. Advantageously, by enabling parts to be interchangeably implemented across different vehicles having different ride height requirements, a number of the parts required and/or manufacturing complexity of the vehicles is reduced.

Some examples disclosed herein implement multi-position wheel assembly mounts that can be configured for at least two different ride heights. An example multi-position wheel assembly mount disclosed herein includes a plate including protrusions extending away from a surface of the plate and toward the vehicle frame. In some examples disclosed herein, the protrusions are pins that are positionable in apertures of the vehicle frame, where the apertures may be through holes in rail portions of the vehicle frame. In examples disclosed herein, the protrusions are positionable in the apertures of the frame in a first position to provide a first ride height of the vehicle and a second position to provide a second ride height of the vehicle. In some examples, the first right height is a high ride height, and the second ride height is a low ride height. Example disclosed herein do not require additional parts for the frame or body of the vehicle, thereby reducing a number of parts required and/or manufacturing complexity of the vehicles to achieve the desired ride height.

Different types and models of vehicles (e.g., cars, trucks, vans, etc.) generally include different chassis and different performance requirements. That is, different types and models of vehicles have different engine performance requirements (e.g., different torque requirements, different horsepower requirements, different range requirements, etc.) and different suspension requirements (e.g., suspension stiffness requirements, travel requirements, damping requirements, camber control requirements, etc.). These performance requirements are generally related to different design considerations, including the type/class of the vehicle (e.g., pick-up truck, compact car, van, sedan, etc.), the intended role of the vehicle (e.g., everyday driving, sport driving, long-distance transport, short-distance transport, law enforcement, off-road vehicles, etc.), the weight of the vehicle, the size of the vehicle, and/or consumer preferences. These variations in design requirements make reusing parts between the chassis of different vehicle models impractical.

Some examples disclosed herein implement electric motorized wheel assemblies which can be configured for different ride and/or performance needs. The example wheel assemblies disclosed herein includes swappable or interchangeable components that include an in-wheel electric motor, suspension assembly, and a suspension mounting frame (frame mounting interface). In examples disclosed herein, the components of the wheel assemblies that are connected to the vehicle frame via the frame mounting interface to allow for geometric freedom between the vehicle frame and the components without the need for traditional axle connections from the center containing the electric motor. In examples disclosed herein, the wheel assemblies also include mounting points for the suspension links and dampers. Advantageously, by providing an electric motorized wheel assembly that includes interchangeable parts that have common attachment and packaging strategies, ride and performance needs can be met for the vehicle while reducing the number of parts and complexity of manufacturing.

Examples disclosed herein provide vehicle chassis with common features to receive interchangeable performance packages that enable a configurable vehicle chassis to be utilized with different vehicle models with minimal configuration changes. An example vehicle chassis disclosed herein includes cavities with features that enable different performance packages to be coupled thereto. By interchanging the interchangeable performance packages, the engine properties and suspension properties of the example vehicle chassis can be changed. Another example vehicle chassis disclosed herein includes features that enable different subframes to be coupled thereto. In some such examples disclosed herein, the different subframes include different performance packages. By interchanging the interchangeable subframes, the engine properties and suspension properties of the example vehicle chassis can be changed. Another example vehicle chassis disclosed herein includes a common battery platform, an interchangeable front chassis portion, and an interchangeable rear chassis portion. In some such examples disclosed herein, the different chassis portions include different performance packages. By interchanging the interchangeable subframes, the engine properties and suspension properties of the example vehicle chassis can be changed.

Different models of vehicles (e.g., cars, trucks, vans, etc.) generally include differently-sized chassis with differently-sized components. That is, the wheelbase and the track width of a vehicle are generally driven by different design considerations, including the type/class of the vehicle (e.g., pick-up truck, compact car, van, sedan, etc.), the desired spaciousness of the passenger cabin, desired storage space, and/or packaging requirements for vehicle components. These variations in design requirements make reusing parts between the chassis of different vehicle models impractical.

Examples disclosed herein provide vehicle chassis with scalable widths and lengths that enable a configurable vehicle chassis to be utilized with different vehicle models with minimal configuration changes. An example scalable vehicle chassis disclosed herein includes common chassis portions and interchangeable structural members. By interchanging the interchangeable structural members, the width and length of the example scalable vehicle chassis can be changed. Another example scalable chassis disclosed herein includes common chassis portions and adjustable structural members. By adjusting the length of the adjustable structural members, the width and length of the example scalable vehicle chassis can be changed. Another example scalable vehicle chassis disclosed herein includes a common battery platform, an interchangeable front chassis portion, and an interchangeable rear chassis portion. By interchanging the interchangeable chassis portions, the width and length of the example scalable vehicle chassis can be changed.

While example vehicle chassis, frames, and modules described are generally described as distinct examples, the teachings of this disclosure can be combined, rearranged, and omitted in any suitable manner. As such, a vehicle and/or vehicle chassis implemented in accordance with the teachings of this disclosure can include some or all of the features described herein.

FIG. 1 is a perspective view of a vehicle 100. The vehicle 100 is a motorized wheel-driven vehicle. In the illustrated example of FIG. 1, the vehicle 100 is a pick-up truck. In other examples, the vehicle 100 can be any type of wheeled vehicle (e.g., a sedan, a coupe, a van, a pick-up truck, a sports utility vehicle, an all-terrain vehicle (ATV), farming equipment, etc.). In some examples, the vehicle 100 is an EV. In such examples, the vehicle 100 includes one or more electric motors and one or more battery arrays. In other examples, the vehicle 100 includes an internal combustion engine (e.g., a non-electrified vehicle, a partially electrified vehicle, etc.).

FIG. 2A illustrates an example reversible frame 200 (e.g., a vehicle frame, a reversible vehicle frame, a kickflip reversible frame, a chassis) in accordance with teachings of this disclosure. In the illustrated example of FIG. 2A, the reversible frame 200 is configured for a low ride height of the example vehicle 100 of FIG. 1. The example reversible frame 200 includes an example central frame (e.g., a base frame) 202 coupled between example first and second end frames 204, 206. The example of FIG. 2A further includes example wheels 208A, 208B, 208C, 208D coupled to the respective first and second end frames 204, 206. Example battery packs 210 are positioned in the central frame 202. While thirteen of the battery packs 210 are shown in this example, a different number of the battery packs 210 may be used instead. In this example, the first end frame 204 is a front frame proximate a front end of the vehicle 100, and the second end frame 206 is a rear frame proximate a rear end of the vehicle 100. In other examples, the first end frame 204 is proximate the rear end of the vehicle 100, and the second end frame 206 is proximate the front end of the vehicle 100.

In the illustrated example of FIG. 2A, the reversible frame 200 is in a first position. When the reversible frame 200 is in the first position, the central frame 202 is at an example first distance 212 from the ground and the first and second end frames 204, 206 are at an example second distance 214 from the ground. In this example, the first and second end frames 204, 206 are positioned at an offset (e.g., a vertical offset) relative to the central frame 202, where the offset is in an example vertical direction 216. As such, when the reversible frame 200 is in the first position, the second distance 214 between the ground and the first and second end frames 204, 206 is greater than the first distance 212 between the ground and the central frame 202. In this example, when the reversible frame 200 in the first position is implemented in the vehicle 100, the vehicle 100 is configured for a first ride height (e.g., a low ride height). In some examples, a first type of vehicle body (e.g., a van body) is coupled to the reversible frame 200 in the first position to produce a first type of vehicle (e.g., a van).

Turning to FIG. 2B, the example reversible frame 200 of FIG. 2A is configured for a high ride height of the example vehicle 100 of FIG. 1. In the illustrated example of FIG. 2B, the reversible frame 200 is in a second position. When the reversible frame 200 is in the second position, the central frame 202 is at an example third distance 218 from the ground and the first and second end frames 204, 206 are at an example fourth distance 219 from the ground. In this example, the third distance 218 is greater than both the fourth distance 219 and the first distance 212 of FIG. 2A. As such, when the reversible frame 200 in the second position is implemented in the vehicle 100, the vehicle 100 is configured for a second ride height (e.g., a high ride height), where the second ride height is greater than the first ride height. In some examples, a second type of vehicle body (e.g., a truck body) is coupled to the reversible frame 200 in the second position to produce a second type of vehicle (e.g., a truck), where the second type of vehicle is different from the first type of vehicle.

In examples disclosed herein, the reversible frame 200 can be selectively configured for the first ride height or the second ride height by rotating about an example longitudinal axis 220. For example, the reversible frame 200 can move between the first position shown in FIG. 2A and the second position shown in FIG. 2B by rotating 180 degrees about the longitudinal axis 220.

Figure 3:
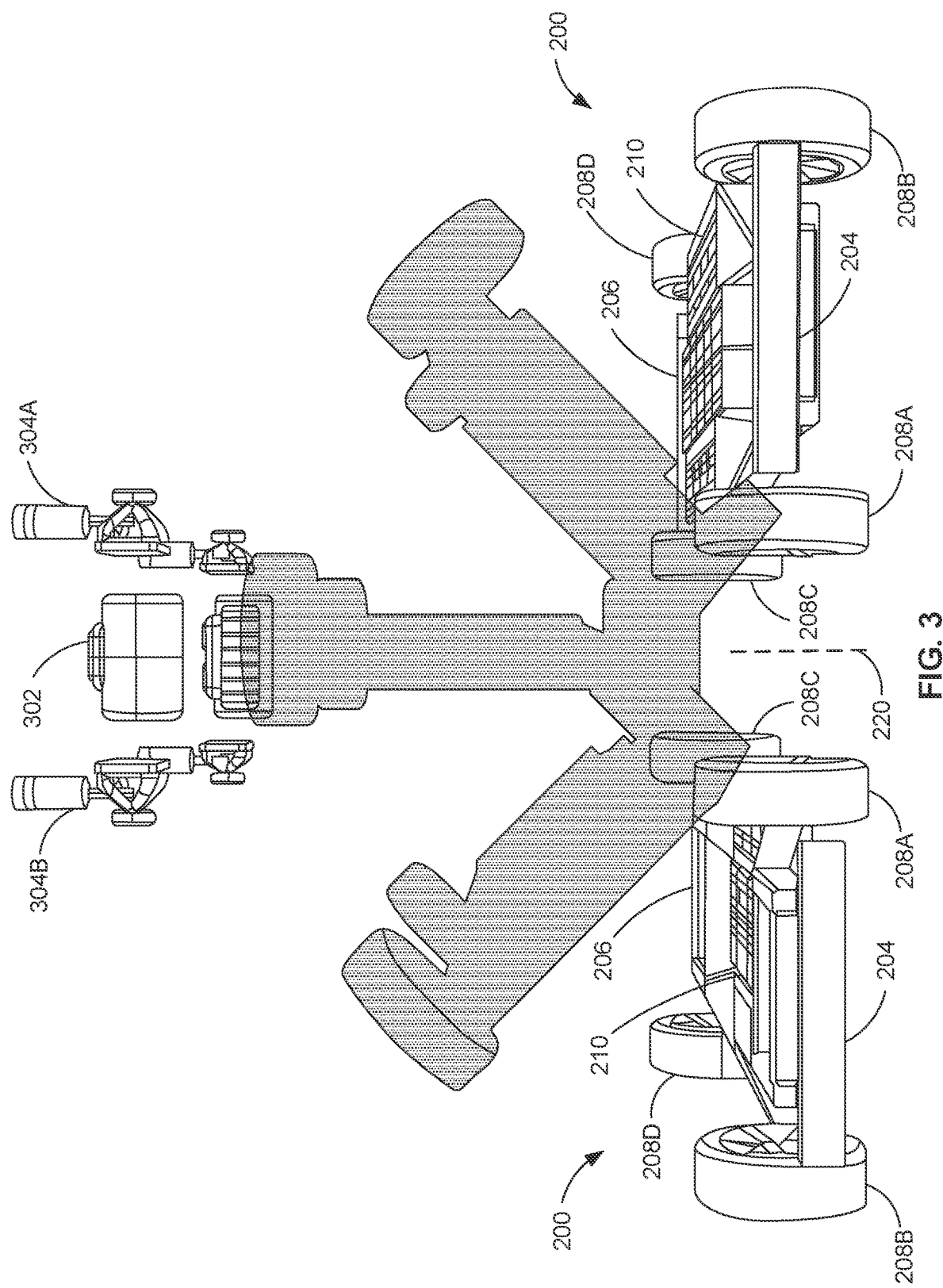
FIG. 3 illustrates the example reversible frame of FIGS. 2A and/or 2B rotated about an example longitudinal axis between first and second positions.

FIG. 3 illustrates the example reversible frame 200 of FIGS. 2A and/or 2B rotated about the example longitudinal axis 220 between the first and second positions. In the illustrated example of FIG. 3, an example motor (e.g., an electric motor) 302 and example first and second suspension systems 304A, 304B are couplable to the reversible frame 200 in both the first and second positions. In some examples, the first and second suspension systems 304A, 304B are coupled to the first end frame 204 and operatively coupled to corresponding ones of the first and second wheels 208A, 208B. Additionally or alternatively, the first and second suspension systems 304A, 304B can be coupled to the second end frame 206 and operatively coupled to corresponding ones of the third and fourth wheels 208C, 208D. In some examples, each of the first and second end frames 204, 206 includes mirrored attachment points positioned thereon. In such examples, the mirrored attachment points enable the first and second suspension systems 304A, 304B to be coupled to at least one of the first or second end frames 204, 206 in a same orientation when the reversible frame 200 is in either one of the first or second positions.

In the illustrated example of FIG. 3, the motor 302 is coupled to the first end frame 204 and operatively coupled to the first and second wheels 208A, 208B. In this example, the motor 302 is powered by the battery packs 210, and operation of the motor 302 causes corresponding rotation of the first and second wheels 208A, 208B. Additionally or alternatively, the motor 302 can be coupled to the second end frame 206 and operatively coupled to the third and fourth wheels 208C, 208D, such that operation of the motor 302 causes corresponding rotation of the third and fourth wheels 208C, 208D. In some examples, multiple ones of the motor 302 are coupled to the reversible frame 200 to operate the wheels 208A, 208B, 208C, 208D.

In some examples, the motor 302 is coupled to at least one of the first or second end frames 204, 206 in a same orientation when the reversible frame 200 is in either one of the first or second positions. In other examples, the motor 302 is in a first orientation when the reversible frame 200 is in the first position, and the motor 302 is in a second orientation different from the first orientation when the reversible frame 200 is in the second position. In some such examples, the motor 302 is configured to rotate in a first direction when the reversible frame 200 is in the first position, and the motor 302 is configured to rotate in a second direction when the reversible frame 200 is in the second position, where the second direction is opposite the first direction.

Figure 4:
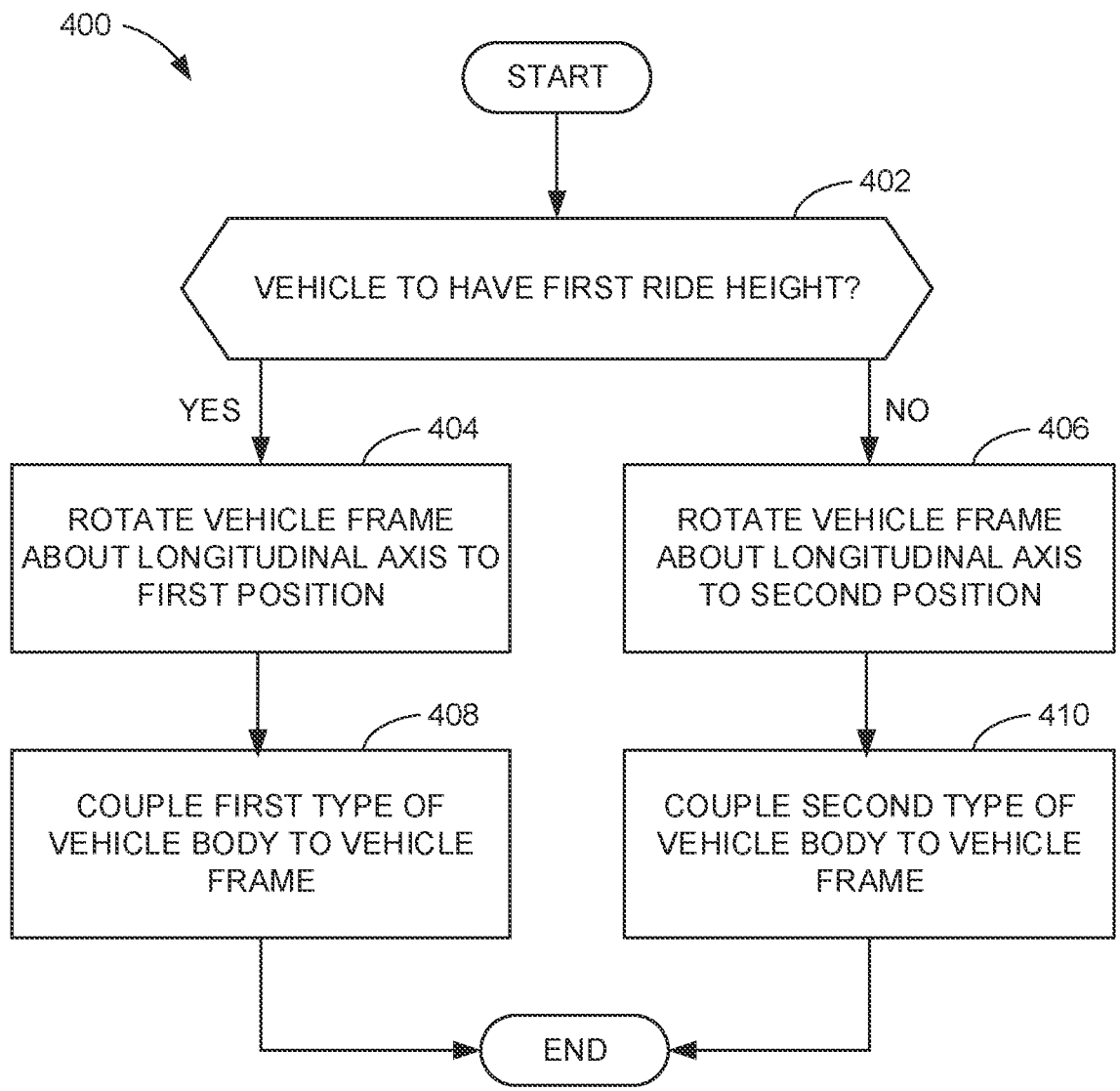
FIG. 4 is a flowchart representative of an example method to produce the example reversible frame of FIGS. 2A, 2B, and/or 3.

FIG. 4 is a flowchart representative of an example method 400 to produce the example reversible frame 200 of FIGS. 2A, 2B, and/or 3. The example method 400 begins at block 402, at which a ride height of the vehicle 100 of FIG. 1 is selected. For example, in response to determining that the vehicle 100 is to have a first ride height (e.g., block 402 returns a result of YES), the process proceeds to block 404. Alternatively, in response to determining that the vehicle 100 does not have the first ride height (e.g., block 402 returns a result of NO), the process proceeds to block 406.

At block 404, the example reversible frame 200 is rotated about the longitudinal axis 220 of FIGS. 2 and/or 3 to a first position. For example, the reversible frame 200 is rotated to the first position shown in FIG. 2A, in which the reversible frame 200 is configured for the first ride height.

At block 406, the example reversible frame 200 is rotated about the longitudinal axis 220 to a second position. For example, the reversible frame 200 is rotated to the second position shown in FIG. 2B, in which the reversible frame 200 is configured for the second ride height greater than the first ride height.

At block 408, a first type of vehicle body is coupled to the reversible frame 200. For example, the first type of vehicle body is coupled to the reversible frame 200 when the reversible frame 200 is in the first position. In some examples, the first type of vehicle body is a van body.

At block 410, a second type of vehicle body is coupled to the reversible frame 200. For example, the second type of vehicle body is coupled to the reversible frame 200 when the reversible frame 200 is in the second position. In this example, the second type of vehicle body (e.g., a truck body) is different from the first type of vehicle body.

Figure 5:
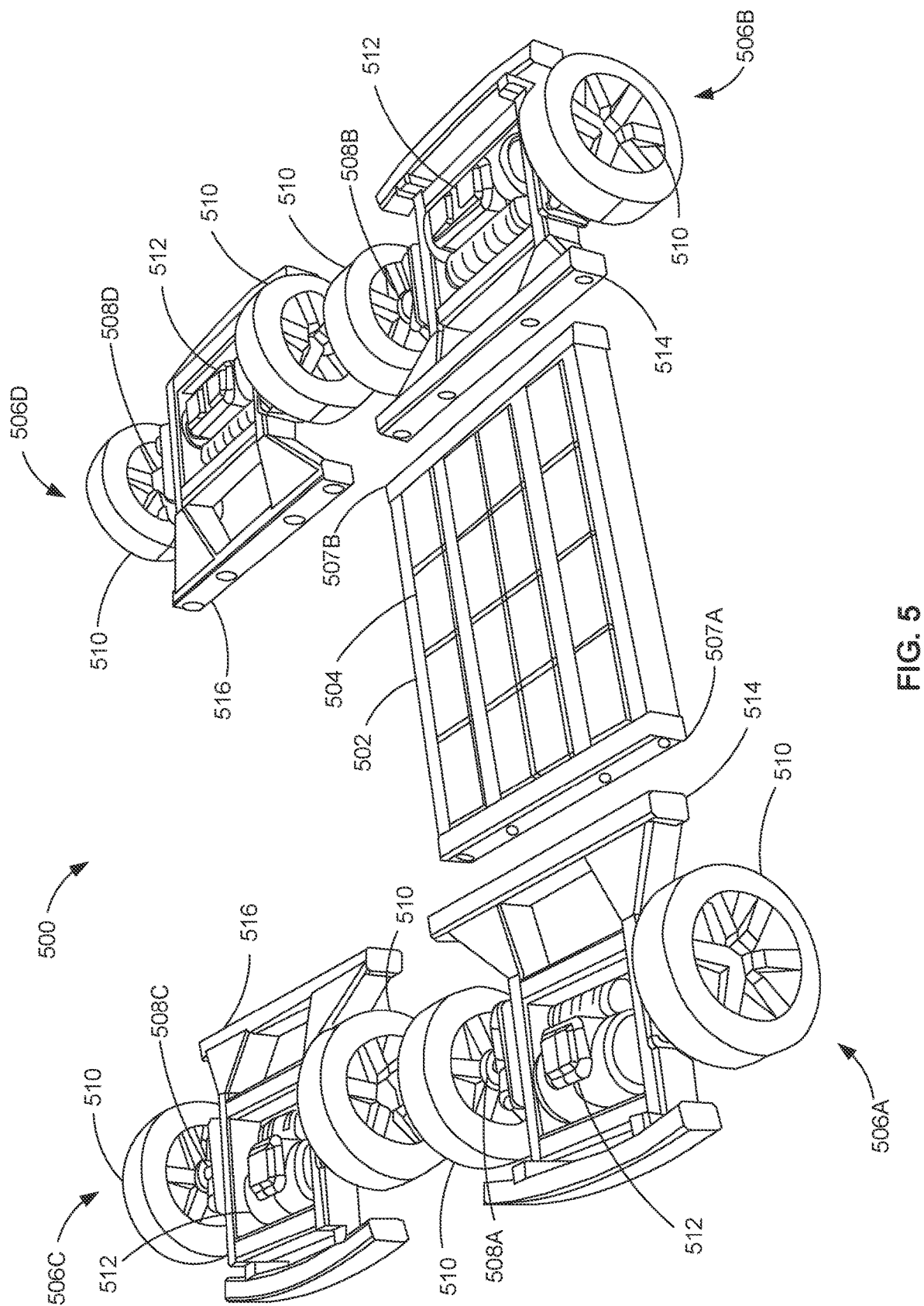
FIG. 5 illustrates a first example configurable vehicle chassis in accordance with teachings of this disclosure.

FIG. 5 illustrates a first example configurable vehicle chassis 500 in accordance with teachings of this disclosure.

In the illustrated example of FIG. 5, the first configurable vehicle chassis 500 includes an example central frame (e.g., a base frame) 502, and example battery packs 504 positioned in the central frame 502. While sixteen of the battery packs 504 are shown in this example, a different number of the battery packs 504 may be used instead. In this example, first and second example frame subassemblies (e.g., first and second subassemblies) 506A, 506B can be coupled to the central frame 502 to configure the first configurable vehicle chassis 500 for a high ride height, and third and fourth example frame subassemblies (e.g., third and fourth subassemblies) 506C, 506D can be coupled to the central frame 502 to configure the configurable central frame 502 for a low ride height. In this example, the first and second frame subassemblies 506A, 506B are substantially the same, and the third and fourth frame subassemblies 506C, 506D are substantially the same. As such, each of the frame subassemblies 506A, 506B, 506C, 506D can be interchangeably coupled to an example front end 507A and/or to an example rear end 507B of the central frame 502.

In the illustrated example of FIG. 5, each of the frame subassemblies 506A, 506B, 506C, 506D defines corresponding example wheel axles 508A, 508B, 508C, 508D having example wheels 510 coupled thereto. In this example, example motors (e.g., electric motors) 512 are coupled on the frame subassemblies 506A, 506B, 506C, 506D and operatively coupled to corresponding ones of the wheels 510. In some examples, operation of the motors 512 causes rotation of the wheel axles 508A, 508B, 508C, 508D and/or the corresponding ones of the wheels 510. In this example, the motors 512 are electrically coupled to and/or otherwise powered by the battery packs 504.

In the illustrated example of FIG. 5, the first and second frame subassemblies 506A, 506B include example first bridge portions (e.g., upward bridge portions, upwardly angled bridge portions) 514, and the third and fourth frame subassemblies 506C, 506D include example second bridge portions (e.g., downward bridge portions, downwardly angled bridge portions) 516. The first and second bridge portions 514, 516 can be fixed (e.g., bolted, riveted, welded, etc.) to the central frame 502 to couple the respective frame subassemblies 506A, 506B, 506C, 506D to the central frame 502. In this example, the first bridge portions 514 are oriented generally upward relative to the first and second wheel axles 508A, 508B, and the second bridge portions 516 are oriented generally downward relative to the third and fourth wheel axles 508C, 508D. As such, when the first and second frame subassemblies 506A, 506B are coupled to the central frame 502, the central frame 502 is at a first distance from the ground. Further, when the third and fourth frame subassemblies 506C, 506D are coupled to the central frame 502, the central frame 502 is at a second distance from the ground, where the first distance is greater than the second distance.

Figure 6A:
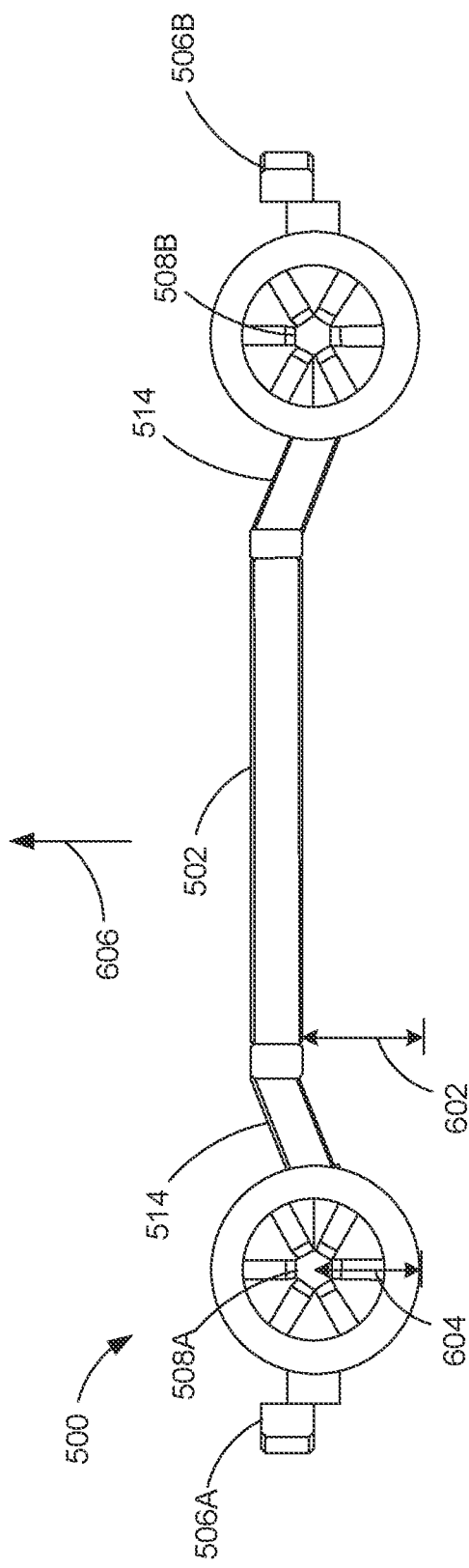
FIG. 6A illustrates the first example configurable vehicle chassis of FIG. 5 configured for a high ride height of the example vehicle of FIG. 1.

FIG. 6A illustrates the first example configurable vehicle chassis 500 of FIG. 5 configured for a high ride height of the example vehicle 100 of FIG. 1. In the illustrated example of FIG. 6A, the first and second frame subassemblies 506A, 506B are coupled to the central frame 502 via the first bridge portions 514. In this example, the central frame 502 is at an example first distance 602 from the ground, and the first and second wheel axles 508A, 508B of the respective first and second frame subassemblies 506A, 506B are at an example second distance 604 from the ground. In this example, the central frame 502 is positioned at a first offset (e.g., a first vertical offset) relative to the first and second wheel axles 508A, 508B, where the first offset is in an example upward direction 606. As such, the first distance 602 between the ground and the central frame 502 is greater than the second distance 604 between the ground and the first and second wheel axles 508A, 508B. In this example, when the first configurable vehicle chassis 500 of the illustrated example of FIG. 6A is implemented in the vehicle 100, the vehicle 100 is configured for a first ride height (e.g., a high ride height). In some examples, a first type of vehicle body (e.g., a truck body) is coupled to the first configurable vehicle chassis 500 to produce a first type of vehicle (e.g., a truck).

Figure 6B:
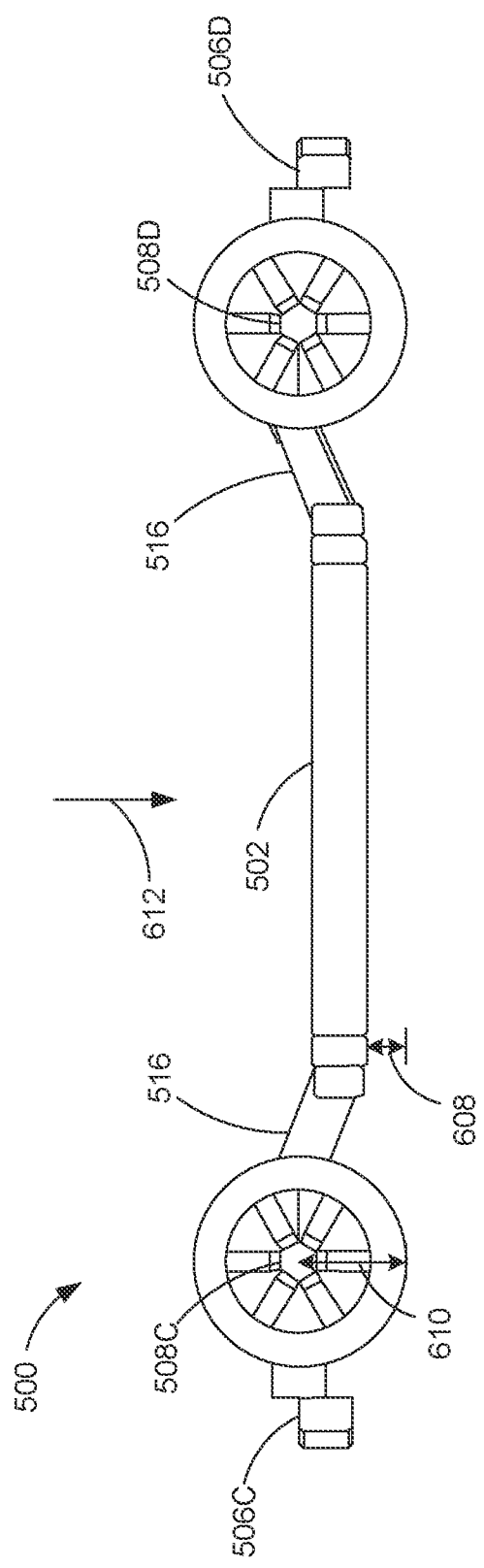
FIG. 6B illustrates the first example configurable vehicle chassis of FIGS. 5 and/or 6A configured for a low ride height of the example vehicle of FIG. 1.

Turning to FIG. 6B, the first example configurable vehicle chassis 500 of FIG. 5 is configured for a low ride height of the example vehicle 100 of FIG. 1. In the illustrated example of FIG. 6B, the third and fourth frame subassemblies 506C, 506D are coupled to the central frame 502 via the second bridge portions 516. In this example, the central frame 502 is at an example third distance 608 from the ground, and the third and fourth wheel axles 508C, 508D of the respective third and fourth frame subassemblies 506C, 506D are at an example fourth distance 610 from the ground. In this example, the central frame 502 is positioned at a second offset (e.g., a second vertical offset) relative to the third and fourth wheel axles 508C, 508D, where the second offset is in an example downward direction 612. As such, the third distance 608 between the ground and the central frame 502 is less than the fourth distance 610 between the ground and the first and second wheel axles 508A, 508B and less than the first distance 602 of FIG. 6A. In this example, when the first configurable vehicle chassis 500 of the illustrated example of FIG. 6B is implemented in the vehicle 100, the vehicle 100 is configured for a second ride height (e.g., a low ride height) less than the first ride height. In some examples, a second type of vehicle body (e.g., a car body) is coupled to the first configurable vehicle chassis 500 to produce a second type of vehicle (e.g., a car). In examples disclosed herein, the first configurable vehicle chassis 500 can be selectively configured for the first ride height or the second ride height based on a selection of the frame subassemblies 506A, 506B, 506C, 506D coupled to the central frame 502.

Figure 7:
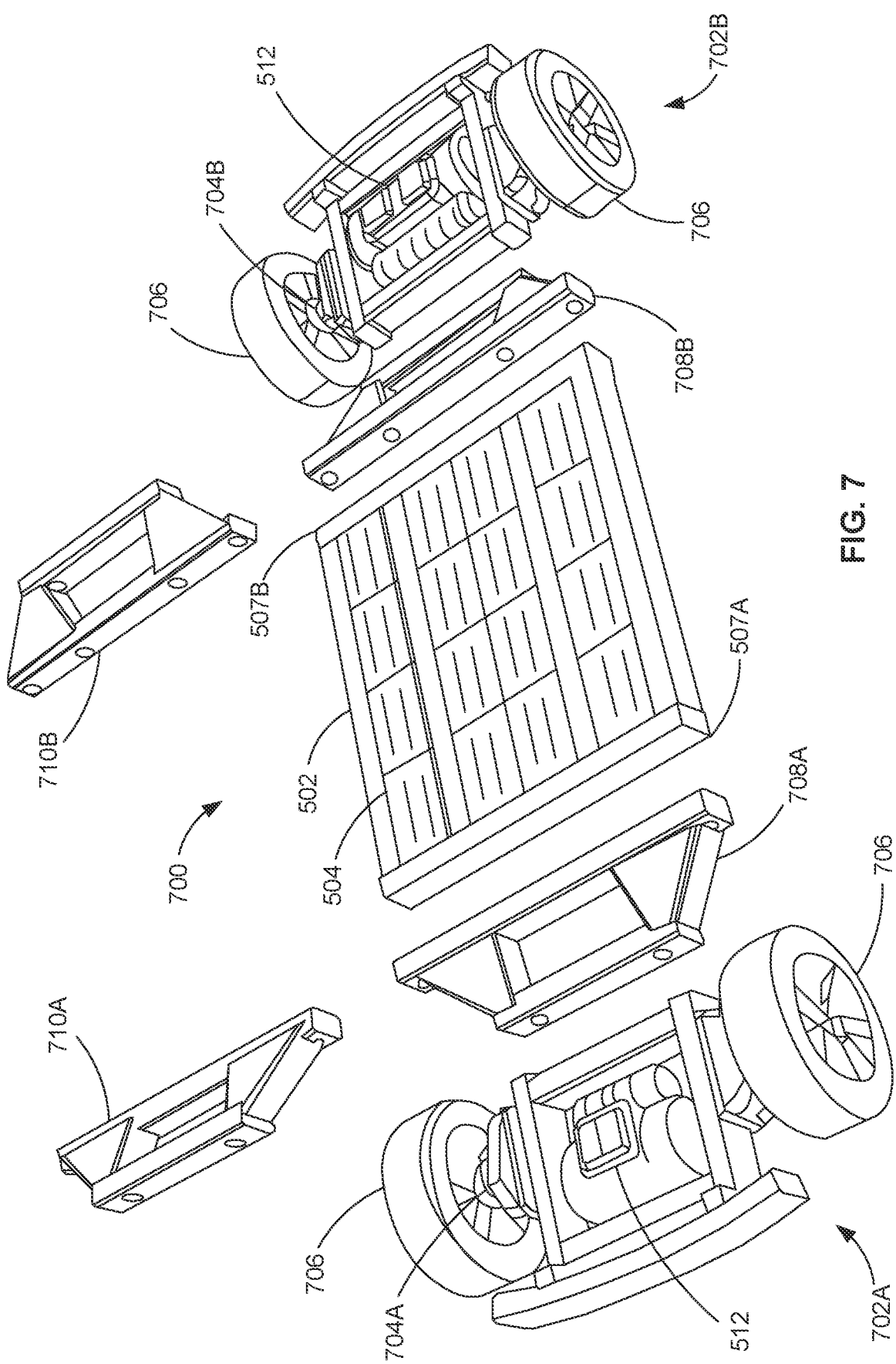
FIG. 7 illustrates a second example configurable vehicle chassis in accordance with teachings of this disclosure.

FIG. 7 illustrates a second example configurable vehicle chassis 700 in accordance with teachings of this disclosure. In the illustrated example of FIG. 7, the second configurable vehicle chassis 700 includes the central frame 502 couplable to example first and second subassemblies 702A, 702B, where the first and second subassemblies 702A, 702B define example axles (e.g., wheel axles) 704A, 704B having example wheels 706 coupled thereto. In this example, the example motors 512 are mounted on the first and second subassemblies 702A, 702B and operatively coupled to corresponding ones of the wheels 706. In some examples, operation of the motors 512 causes rotation of the axles 704A, 704B and/or the corresponding ones of the wheels 706. In this example, the motors 512 are electrically coupled to and/or otherwise powered by the battery packs 504 positioned on the central frame 502. In this example, the first and second subassemblies 702A, 702B are couplable to the central frame 502 via example upwardly angled or upward bridge portions 708A, 708B and/or via example downwardly angled or downward bridge portions 710A, 710B.

In the illustrated example of FIG. 7, the second configurable vehicle chassis 700 is configured for a high ride height when the first and second subassemblies 702A, 702B are coupled to the central frame 502 via the upward bridge portions 708A, 708B, and the second configurable vehicle chassis 700 is configured for a low ride height when the first and second subassemblies 702A, 702B are coupled to the central frame 502 via the downward bridge portions 710A, 710B. In this example, the upward bridge portions 708A, 708B are substantially the same, and the downward bridge portions 710A, 710B are substantially the same. As such, each of the upward and downward bridge portions 708A, 708B, 710A, 710B can be interchangeably coupled to the front end 507A and/or to the rear end 507B of the central frame 502. Each of the upward and downward bridge portions 708A, 708B, 710A, 710B can be fixed (e.g., bolted, riveted, welded, etc.) between the central frame 502 and one of the first or second subassemblies 702A, 702B. In this example, the upward bridge portions 708A, 708B are oriented generally upward relative to the axles 704A, 704B, and the downward bridge portions 710A, 710B are oriented generally downward relative to the axles 704A, 704B.

FIG. 8A illustrates the second example configurable vehicle chassis 700 of FIG. 7 configured for a high ride height of the example vehicle 100 of FIG. 1. In the illustrated example of FIG. 8A, the first and second subassemblies 702A, 702B are coupled to the central frame 502 via the upward bridge portions 708A, 708B. In this example, the central frame 502 is at an example first height 802 relative to the ground, and the axles 704A, 704B of the respective first and second subassemblies 702A, 702B are at an example second height 804 relative to the ground, where the first height 802 is greater than the second height 804. In this example, when the second configurable vehicle chassis 700 of the illustrated example of FIG. 8A is implemented in the vehicle 100, the vehicle 100 is configured for a first ride height (e.g., a high ride height). In some examples, a first type of vehicle body (e.g., a truck body) is coupled to the second configurable vehicle chassis 700 to produce a first type of vehicle (e.g., a truck).

Turning to FIG. 8B, the second example configurable vehicle chassis 700 of FIGS. 7 and/or 8A is shown configured for a low ride height of the example vehicle 100 of FIG. 1. In the illustrated example of FIG. 8B, the first and second subassemblies 702A, 702B are coupled to the central frame 502 via the downward bridge portions 710A, 710B. In this example, the central frame 502 is at an example third height 806 relative to the ground, where the third height 806 is less than the second height 804 of the axles 704A, 704B and, thus, is less than the first height 802 of the illustrated example of FIG. 8B. In this example, when the second configurable vehicle chassis 700 of the illustrated example of FIG. 8B is implemented in the vehicle 100, the vehicle 100 is configured for a second ride height (e.g., a low ride height) less than the first ride height. In some examples, a second type of vehicle body (e.g., a car body) is coupled to the second configurable vehicle chassis 700 to produce a second type of vehicle (e.g., a car).

In examples disclosed herein, the second configurable vehicle chassis 700 can be selectively configured for the first ride height or the second ride height based on a selection of the upward and downward bridge portions 708A, 708B, 710A, 710B coupled to the central frame 502. In the illustrated example of FIG. 8A, the first height 802 can be adjusted by modifying an example first angle 810 of the upward bridge portions 708A, 708B relative to the central frame 502. Similarly, in the illustrated example of FIG. 8B, the second height 806 can be adjusted by modifying an example second angle 812 of the downward bridge portions 710A, 710B relative to the central frame 502. In some examples, the first and second angles 810, 812 are the same (e.g., less than 30 degrees, less than 10 degrees, etc.). In other examples, the first and second angles 810, 812 can be different. In some examples, one or more additional bridge portions (e.g., third bridge portions, fourth bridge portions, etc.) are couplable between the first and second subassemblies 702A, 702B and the central frame 502. In some examples, each of the one or more additional bridge portions can be configured for a different ride height.

Figure 9:
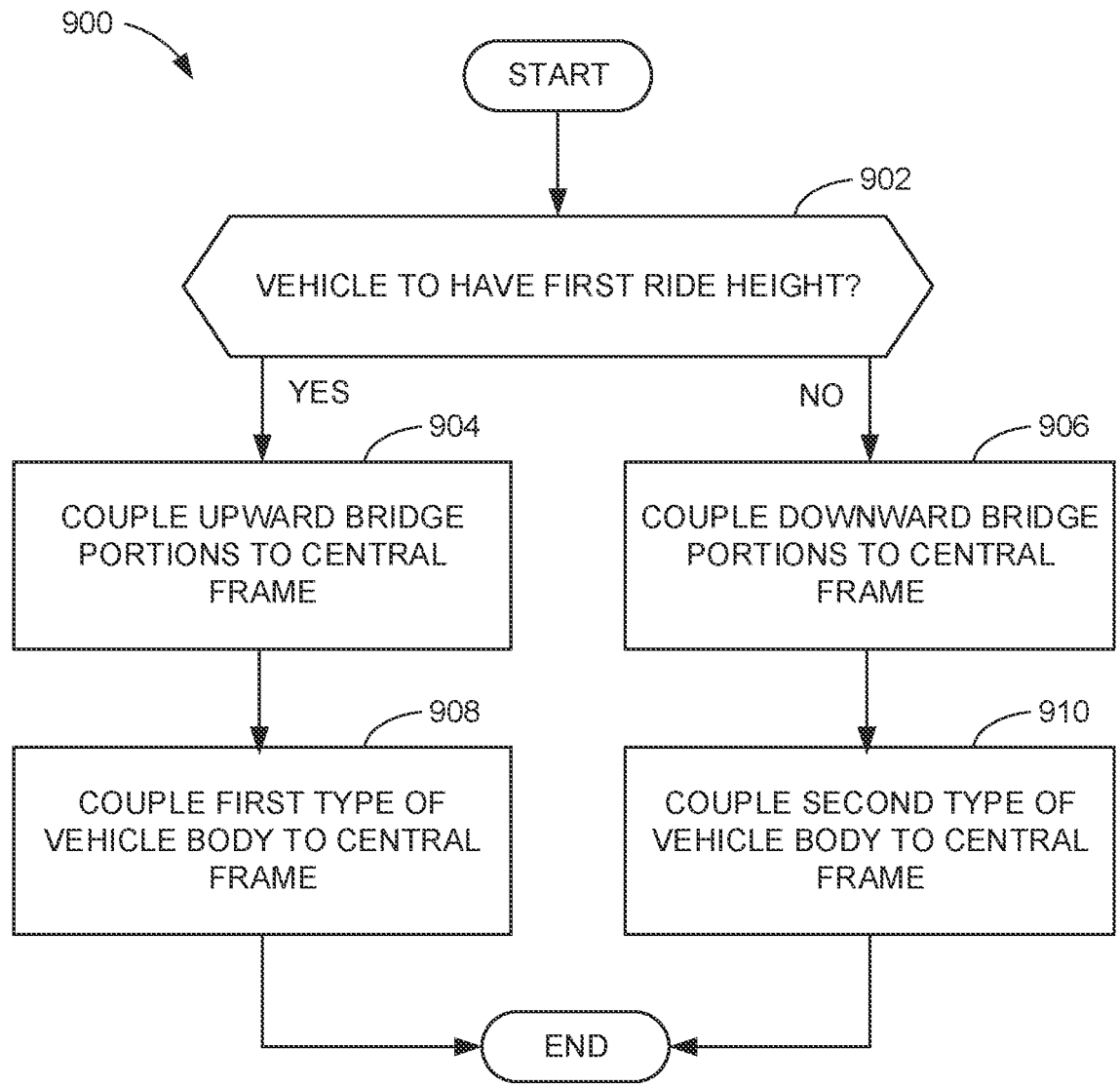
FIG. 9 is a flowchart representative of an example method to produce the first example configurable vehicle chassis of FIGS. 5, 6A, and/or 6B and/or the second example configurable vehicle chassis of FIGS. 7, 8A, and/or 8B.

FIG. 9 is a flowchart representative of an example method 900 to produce the first example configurable vehicle chassis 500 of FIGS. 5, 6A, and/or 6B and/or the second example configurable vehicle chassis 700 of FIGS. 7, 8A, and/or 8B. The example method 900 begins at block 902, at which a ride height of the vehicle 100 of FIG. 1 is selected. For example, in response to determining that the vehicle 100 is to have a first ride height (e.g., block 902 returns a result of YES), the process proceeds to block 904. Alternatively, in response to determining that the vehicle 100 is not to have the first ride height and/or is to have a second ride height less than the first ride height (e.g., block 902 returns a result of NO), the process proceeds to block 906.

At block 904, the example first bridge portions 514 of FIGS. 5, 6A, and/or 6B and/or the example upward bridge portions 708A, 708B of FIGS. 7, 8A, and/or 8B are coupled to the example central frame 502. For example, the first bridge portions 514 of the first and second frame subassemblies 506A, 506B are coupled to (e.g., via one or more fasteners, chemical adhesive, a press-fit, one or more welds, etc.) or otherwise fixed to the central frame 502 to produce the first example configurable vehicle chassis 500, and the upward bridge portions 708A, 708B are coupled to (e.g., via one or more fasteners, chemical adhesive, a press-fit, one or more welds, etc.) or otherwise fixed to the first and second subassemblies 702A, 702B and to the central frame 502 to produce the second configurable vehicle chassis 700. In such examples, the vehicle 100 is configured for the first ride height.

At block 906, the example second bridge portions 516 of FIGS. 5, 6A, and/or 6B and/or the example downward bridge portions 710A, 718B of FIGS. 7, 8A, and/or 8B are coupled to the example central frame 502. For example, the second bridge portions 516 of the third and fourth frame subassemblies 506C, 506D are coupled to (e.g., via one or more fasteners, chemical adhesive, a press-fit, one or more welds, etc.) or otherwise fixed to the central frame 502 to produce the first example configurable vehicle chassis 500, and the downward bridge portions 710A, 710B are coupled to (e.g., via one or more fasteners, chemical adhesive, a press-fit, one or more welds, etc.) or otherwise fixed to the first and second subassemblies 702A, 702B and to the central frame 502 to produce the second configurable vehicle chassis 700. In such examples, the vehicle 100 is configured for the second ride height less than the first ride height.

At block 908, a first type of vehicle body is coupled to the central frame 502. For example, the first type of vehicle body is coupled to the central frame 502 when the vehicle 100 is configured for the first ride height. In some examples, the first type of vehicle body is a car body.

At block 910, a second type of vehicle body is coupled to the central frame 502. For example, the second type of vehicle body is coupled to the central frame 502 when the vehicle 100 is configured for the second ride height. In this example, the second type of vehicle body (e.g., a truck body) is different from the first type of vehicle body.

Figure 10:
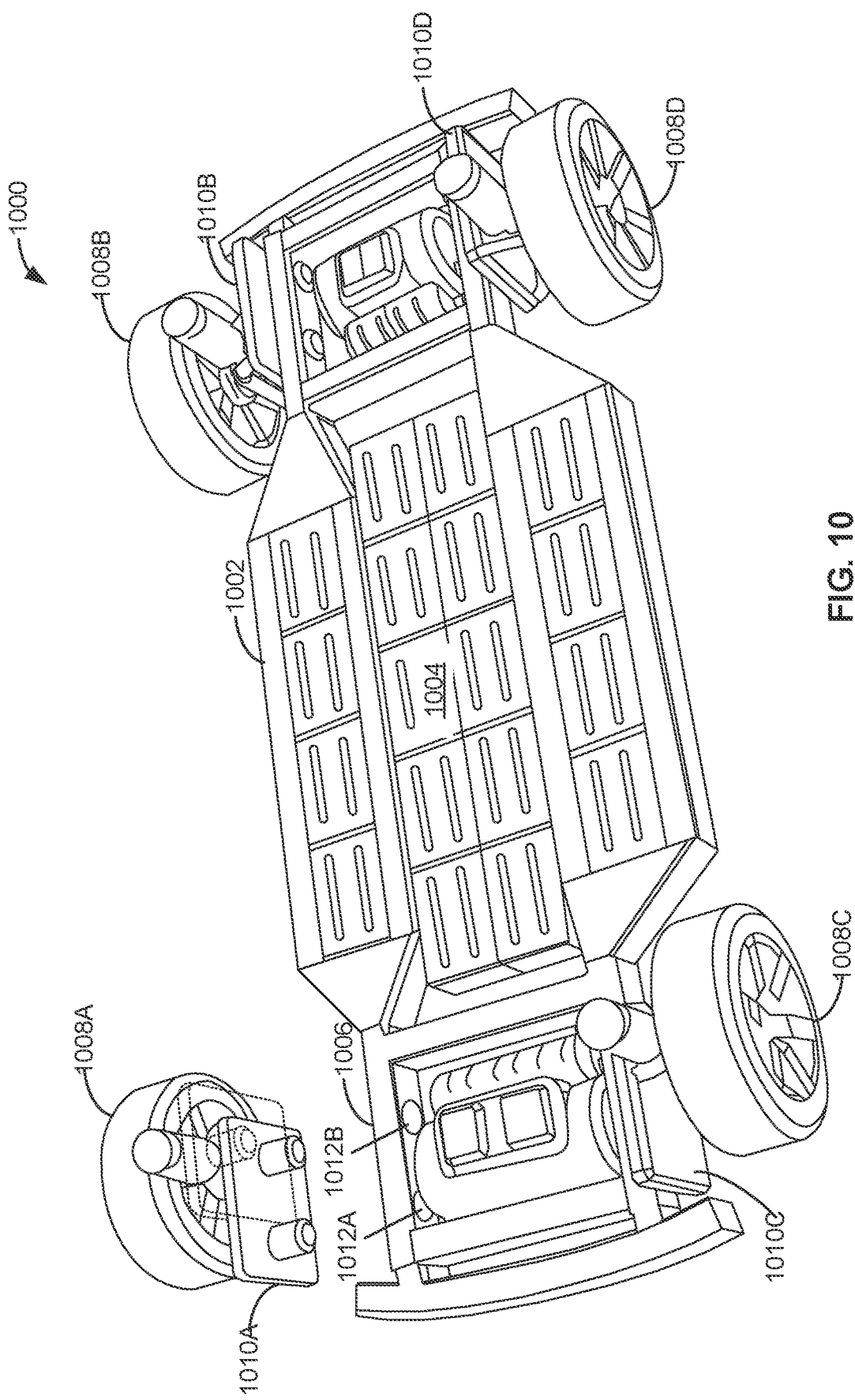
FIG. 10 illustrates example wheel assembly mounts in accordance with the teachings of this disclosure.

FIG. 10 illustrates example wheel assembly mounts 1010A, 1010B, 1010C, 1010D in accordance with the teachings of this disclosure. The example vehicle chassis 1000 of FIG. 10 includes an example vehicle frame 1002, example battery packs 1004, an example rail portion 1006 of the vehicle frame 1002, example wheel assemblies 1008A, 1008B, 1008C, 1008D, the example wheel assembly mounts 1010A, 1010B, 1010C, 1010D, and example apertures 1012A, 1012B. In the illustrated example of FIG. 10, the wheel assembly mounts 1010A, 1010B, 1010C, 1010D are coupled to the wheel assemblies 1008A, 1008B, 1008C, 1008D, respectively. The wheel assemblies 1008A, 1008B, 1008C, 1008D include the wheels, brakes, suspension, wheel bearings, etc. The wheel assembly mounts 1010A, 1010B, 101C, 1010D are coupled to the vehicle frame 1002 via the apertures (e.g., the example apertures 1012A, 1012B) included in the rail portions (e.g., the example rail portion 1006) of the vehicle frame 1002. For example, the wheel assembly mount 1010A is positioned in the apertures 1012A, 1012B included in the rail portion 1006 of the vehicle frame 1002. Each of the wheel assembly mounts 1010A, 1010B, 1010C, 1010D is positionable in any of the wheel assembly locations of the vehicle frame 1002 (e.g., rail portions of the vehicle frame 1002 that include apertures). In the illustrated example, the wheel assembly mounts 1010A, 1010B, 1010C, 1010D are positionable in the wheel assembly locations of the vehicle frame 1002 to raise and lower the ride height of the vehicle 100 of FIG. 1. For example, the wheel assembly mount 1010A can be positioned in a first position in the apertures 1012A, 1012B to raise the ride height and in a second position in the apertures 1012A, 1012B to lower the ride height. The wheel assembly mount 1010A is described in further detail below in connection with FIGS. 11A and 11B.

FIG. 11A illustrates the example wheel assembly mount 1010A of FIG. 10 configured for a low ride height (shown in solid lines) and a high ride height (shown in dashed lines) of the example vehicle 100 of FIG. 1. The wheel assembly mount 1010A of FIG. 11A includes an example plate 1102, an example first protrusion 1104, an example second protrusion 1106, an example first position 1108 corresponding to the low ride height, and an example second position 1110 corresponding to the high ride height. In the illustrated example, the plate 1102 has a rectangular shape. However, the plate 1102 may be any other shape suitable for attaching/coupling to the example vehicle frame 1002 of FIG. 10. The plate 1102 includes the first protrusion 1104 and the second protrusion 1106. The first protrusion 1104 and the second protrusion 1106 extend away from a surface 1107 of the plate 1102 and toward the vehicle frame 1002. In the illustrated example, the first protrusion 1104 and the second protrusion 1106 are pins that are cylindrically shaped. In some examples, the first protrusion 1104 and the second protrusion 1106 are shaped to fit in apertures included in the vehicle frame 1002. However, in other examples, the plate 1102 may include apertures and the vehicle frame 1002 may include the protrusions (e.g., the first protrusion 1104 and the second protrusion 1106).

In the illustrated example of FIG. 11A, the wheel assembly mount 1010A can be positioned in the first position 1108 or the second position 1110. The first position 1108 provides a first ride height of the vehicle frame 1002 and the second position 1110 provides a second ride height of the vehicle frame 1002. In the illustrated example, the first ride height is less than the second ride height. In other words, the first position 1108 provides a low ride height and the second position 1110 provides a high ride height. In the illustrated example, the first position 1108 positions a longitudinal axis 1112 of the wheel assembly mount 1010A horizontally and the second position 1110 positions the longitudinal axis 1112 of the wheel assembly mount 1010A vertically. In the first position 1108, the first protrusion 1104 and the second protrusion 1106 are aligned along a longitudinal axis of the vehicle frame (e.g., horizontally aligned). In the second position 1110, the first protrusion 1104 and the second protrusion 1106 are vertically aligned where the first protrusion 1104 is positioned higher than the second protrusion 1106.

FIG. 11B illustrates the example wheel assembly mount 1010A of FIG. 10 coupled to the example rail portion 1006 of the example vehicle frame 1002 of FIG. 10 for a low ride height of the example vehicle 100 of FIG. 1. In the illustrated example of FIG. 11B, the wheel assembly mount 1010A is positioned in the first position 1108 for a low ride height. The illustrated example of FIG. 11B further includes the example apertures 1012A, 1012B. The apertures 1012A, 1012B are adjacent to the wheel assembly location on the vehicle frame 1002 (e.g., on the rail portion 1006). In the illustrated example, the apertures 1012A, 1012B are through holes in the rail portion 1006. However, in other examples, the apertures 1012A, 1012B may be dead-ended openings in the rail portion 1006. In the illustrated example, the first protrusion 1104 and the second protrusion 1106 are inserted in the corresponding apertures 1012A, 1012B. The wheel assembly mount 1010A (coupled with the wheel assembly 1008A) is coupled to the rail portion 1006 via the first protrusion 1104, the second protrusion 1106, and the apertures 1012A, 1012B in the first position 1108 to provide a low ride height for the vehicle 100. In some examples, the first protrusion 1104 and the second protrusion 1106 are inserted in the apertures 1012A, 1012B and the protrusions 1104, 1106 are welded to the rail portion 1006 to couple the wheel assembly mount 1010A to the rail portion 1006. In the illustrated examples of FIGS. 11A and 11B, the wheel assembly mount 1010A is illustrated as including two protrusions (e.g., the first protrusion 1104 and the second protrusion 1106) that are coupled to two corresponding apertures (e.g., the apertures 1012A, 1012B). However, the wheel assembly mount 1010A may include any number of protrusions and the rail portion 1006 of the vehicle frame 1002 may include any number of corresponding apertures. In some examples, the wheel assembly mount 1010A may be positioned in more than two positions related to the number of protrusions and corresponding apertures included in the rail portion 1006 of the vehicle frame 1002. In such examples, the wheel assembly mount 1010A may be positioned for two or more different ride heights. For example, the wheel assembly mount 1010A may be positioned in three different positions using the three protrusions to achieve a low ride height, a middle ride height, and a high ride height. In some examples, the rail portion 1006 of the vehicle frame 1002 contains sufficient apertures to engage all protrusions in all positions (e.g., the number of apertures is equal to the number of protrusions multiplied by the number of positions (A=Pr*Po), where A is the number of apertures, Pr is the number of protrusions, and Po is the number of positions). However, in some examples, the rail portion 1006 of the vehicle frame 1002 does not have the number of apertures equal to the number of protrusions multiplied by the number of positions, and apertures may be reused in all or some positions (e.g., low ride height, middle ride height, high ride height, etc.).

FIG. 11C illustrates an example alternative wheel assembly mount 1116 and alternative rail portion 1118 of the frame 1002 for an adjustable ride height of the example vehicle 100 of FIG. 1. FIGS. 11A and 11B illustrate the wheel assembly mount 1010A as including the plate 1102 with discrete protrusions (e.g., first protrusion 1104 and the second protrusion 1106) coupled to discrete apertures (e.g., apertures 1012A, 1012B). The alternative wheel assembly mount 1116 of FIG. 11C includes an example plate 1120 and example mount through hole groups 1122A, 1122B, and the example alternative rail portion 1118 of FIG. 11C includes example frame through hole groups 1124A, 1124B, 1124C. The plate 1120 includes the mount through hole groups 1122A, 1122B, which are each illustrated as three through holes positioned near each other. However, the mount through hole groups 1122A, 1122B can include any number of through holes and be positioned in any appropriate pattern. Although the plate 1120 of the alternative wheel assembly mount 1116 is illustrated as including two through hole groups (e.g., the mount through hole groups 1122A, 1122B), the plate 1120 can include any number of through hole groups. In the illustrated example, the alternative rail portion 1118 includes the frame through hole groups 1124A, 1124B, 1124C, which are each illustrated as three through holes positioned near each other. However, the frame through hole groups 1124A, 1124B, 1124C can include any number of through holes and be positioned in any appropriate pattern. Although the alternative rail portion 1118 is illustrated as including three through hole groups (e.g., the frame through hole groups 1124A, 1124B, 1124C), alternative rail portion 1118 can include any number of through hole groups.

In the illustrated example of FIG. 11C, the alternative wheel assembly mount 1116 is coupled to the alternative rail portion 1118 via the mount through hole groups 1122A, 1122B and the frame through hole groups 1124A, 1124B, 1124C. In the illustrated example, at least one of the mount through hole groups 1122A, 1122B can be aligned with any one of the corresponding frame through hole groups 1124A, 1124B, 1124C to provide different right heights for the vehicle 100. For example, the mount through hole groups 1122A, 1122B can be aligned with the frame through hole groups 1124A, 1124C to provide a first ride height for the vehicle 100, and the mount through hole groups 1122A, 1122B can be aligned with the frame through hole groups 1124A, 1124B to provide a second ride height for the vehicle 100. In some examples, once the desired mount through hole groups 1122A, 1122B are aligned with the desired frame through hole groups 1124A, 1124B, 1124C, the plate 1120 of the alternative wheel assembly mount 1116 and the alternative rail portion 1118 are coupled via mechanical, non-permanent attachment methods (e.g., bolts, fasteners, etc.). In the illustrated examples of FIGS. 11A, 11B, and 11C, the connections between the wheel assembly mounts (e.g., the wheel assembly mount 1010A and the alternative wheel assembly mount 1116) and the rail portions (e.g., the rail portion 1006 and the alternative rail portion 1118) of the frame 1002 are independent of axel connections from a motor in the wheel assembly (e.g., the wheel assembly 1008A) to a hub of the vehicle 100.

Figure 12B:
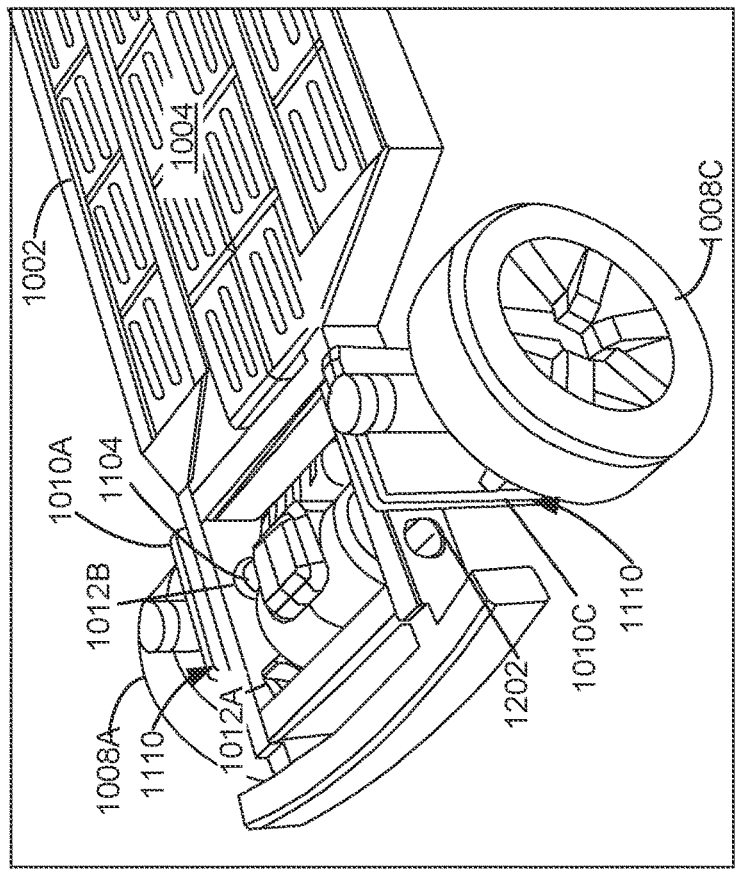
FIG. 12B illustrates example wheel assembly mounts coupled to the example vehicle frame of FIG. 10 for a high ride height of the example vehicle of FIG. 1.
Figure 12A:
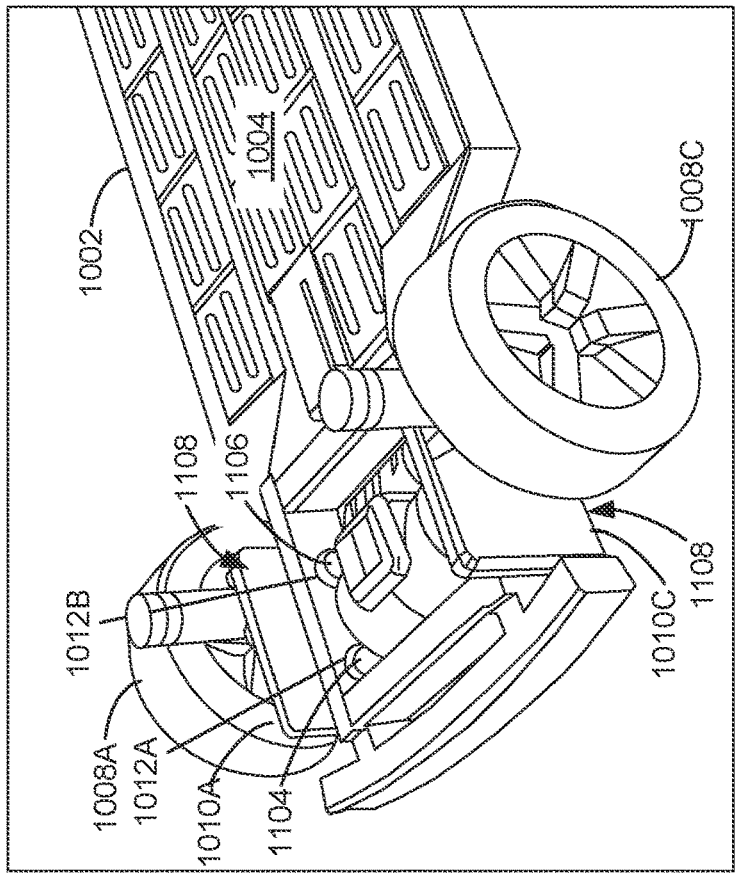
FIG. 12A illustrates example wheel assembly mounts coupled to the example vehicle frame of FIG. 10 for a low ride height of the example vehicle of FIG. 1.

FIG. 12A illustrates example wheel assembly mounts coupled to the example vehicle frame 1002 of FIG. 10 for a low ride height of the example vehicle 100 of FIG. 1. The illustrated example of FIG. 12A includes the example wheel assembly mount 1010A of FIGS. 10, 11A, and 11B and the example wheel assembly mount 1010C of FIG. 10 in the example first position 1108 for a low ride height. The illustrated example of FIG. 12A includes the example wheel assembly 1008A and the example wheel assembly 1008C coupled to the wheel assembly mount 1010A and the wheel assembly mount 1010C, respectively. In the illustrated example, the wheel assembly mount 1010A and the wheel assembly mount 1010C are coupled to the vehicle frame 1002 via apertures. For example, the first protrusion 1104 and the second protrusion 1106 of the wheel assembly mount 1010A are inserted through the apertures 1012A, 1012B, respectively, and the first protrusion 1104 and the second protrusion 1106 are welded to the apertures 1012A, 1012B. In FIG. 12A, the wheel assembly mount 1010C also includes protrusions inserted in corresponding apertures, however these protrusions and apertures are not illustrated in the perspective view of FIG. 12A. In the illustrated example, the first protrusion 1104 and the second protrusion 1106 lie along a first axis that is substantially parallel to a longitudinal axis of the vehicle frame 1002. The first protrusion 1104 and the second protrusion 1106 extend toward the vehicle frame 1002 and are positioned in the apertures 1012A, 1012B in the first position 1108 to provide a first ride height (e.g., low ride height) of the vehicle frame 1002.

FIG. 12B illustrates example wheel assembly mounts coupled to the example vehicle frame 1002 of FIG. 10 for a high ride height of the example vehicle 100 of FIG. 1. The illustrated example of FIG. 12B includes the example wheel assembly mount 1010A and the example wheel assembly mount 1010C in the example second position 1110 for a high ride height. The illustrated example of FIG. 12B includes the example wheel assembly 1008A and the example wheel assembly 1008C coupled to the wheel assembly mount 1010A and the wheel assembly mount 1010C, respectively. In the illustrated example, the wheel assembly mount 1010A and the wheel assembly mount 1010C are coupled to the vehicle frame 1002 via apertures. For example, the first protrusion 1104 of the wheel assembly mount 1010A is inserted through the aperture 1012B, and the first protrusion 1104 and the aperture 1012B are welded together to couple the wheel assembly mount 1010A to the rail portion 1006 of the vehicle frame 1002.

In the illustrated example, the first protrusion 1104 and the second protrusion 1106 (not visible in the perspective view of FIG. 12B) lie along a second axis that is substantially perpendicular to a longitudinal axis of the vehicle frame 1002. The first protrusion 1104 and the second protrusion 1106 extend toward the vehicle frame 1002, and the first protrusion 1104 is positioned in the aperture 1012B (the aperture 1012A is left empty) in the second position 1110 to provide a second ride height (e.g., high ride height) of the vehicle frame 1002. In the illustrated example, the first protrusion 1104 and the aperture 1012B are coupled in the second position 1110 to prevent rotation of the wheel assembly mount 1010A. However, the vehicle frame 1002 can include any number of apertures to be used to couple the wheel assembly mount 1010A to the vehicle frame 1002 in the second position 1110. For example, the vehicle frame 1002 can include an additional aperture that is aligned with a longitudinal axis of the aperture 1012B, and the second protrusion 1106 can be positioned in the additional aperture in the second position 1110. In FIG. 12B, the wheel assembly mount 1010C also includes protrusions where one protrusion is inserted in a corresponding aperture (leaving the aperture 1202 empty) or more than one protrusion is inserted in more than one corresponding aperture, however these protrusions and aperture(s) are not illustrated in the perspective view of FIG. 12B.

FIG. 13A illustrates the example vehicle frame 1002 of FIG. 10 as configured using the example wheel assembly mount 1010C of FIG. 12B for a high ride height of the example vehicle 100 of FIG. 1. The illustrated example of FIG. 13A includes the example wheel assembly mount 1010C and the example wheel assembly mount 1010D in the second position 1110 for a high ride height, as illustrated in FIG. 12B. The illustrated example of FIG. 13A includes the example wheel assembly 1008C and the example wheel assembly 1008D coupled to the wheel assembly mount 1010C and the wheel assembly mount 1010D, respectively. In the illustrated example, one aperture is used for coupling the wheel assembly mount 101C and the wheel assembly mount 1010D to the vehicle frame 1002 (e.g., the example aperture 1202 and an example aperture 1304 are empty). However, in some examples, any number of apertures can be used for coupling the wheel assembly mount 1010C and the wheel assembly mount 1010D to the vehicle frame 1002 in the second position 1110. The illustrated example of FIG. 13A includes an example first distance 1302 that illustrates the high ride height achieved by having the wheel assembly mount 1010C and the wheel assembly mount 1010D in the second position 1110. The first distance 1302 illustrates the distance between the base of the vehicle frame 1002 and the ground at the second position 1110.

FIG. 13B illustrates the example vehicle frame 1002 of FIG. 10 as configured using the example wheel assembly mount 1010C of FIG. 12A for a low ride height of the example vehicle of FIG. 1. The illustrated example of FIG. 13B includes the example wheel assembly mount 1010C and the example wheel assembly mount 1010D in the first position 1108 for a high ride height, as illustrated in FIG. 12A. The illustrated example of FIG. 13B includes the example wheel assembly 1008C and the example wheel assembly 1008D coupled to the wheel assembly mount 1010C and the wheel assembly mount 1010D, respectively. In the illustrated example, both corresponding apertures are used for coupling the wheel assembly mount 1010C and the wheel assembly mount 1010D to the vehicle frame 1002 (no apertures are visible in the perspective view of FIG. 13B). The illustrated example of FIG. 13B includes an example second distance 1306 that illustrates the low ride height achieved by having the wheel assembly mount 1010C and the wheel assembly mount 1010D in the first position 1108. The second distance 1306 illustrates the distance between the base of the vehicle frame 1002 and the ground at the first position 1108. In the illustrated examples of FIGS. 13A and 13B, the first distance 1302 is greater than the second distance 1306.

Figure 14:
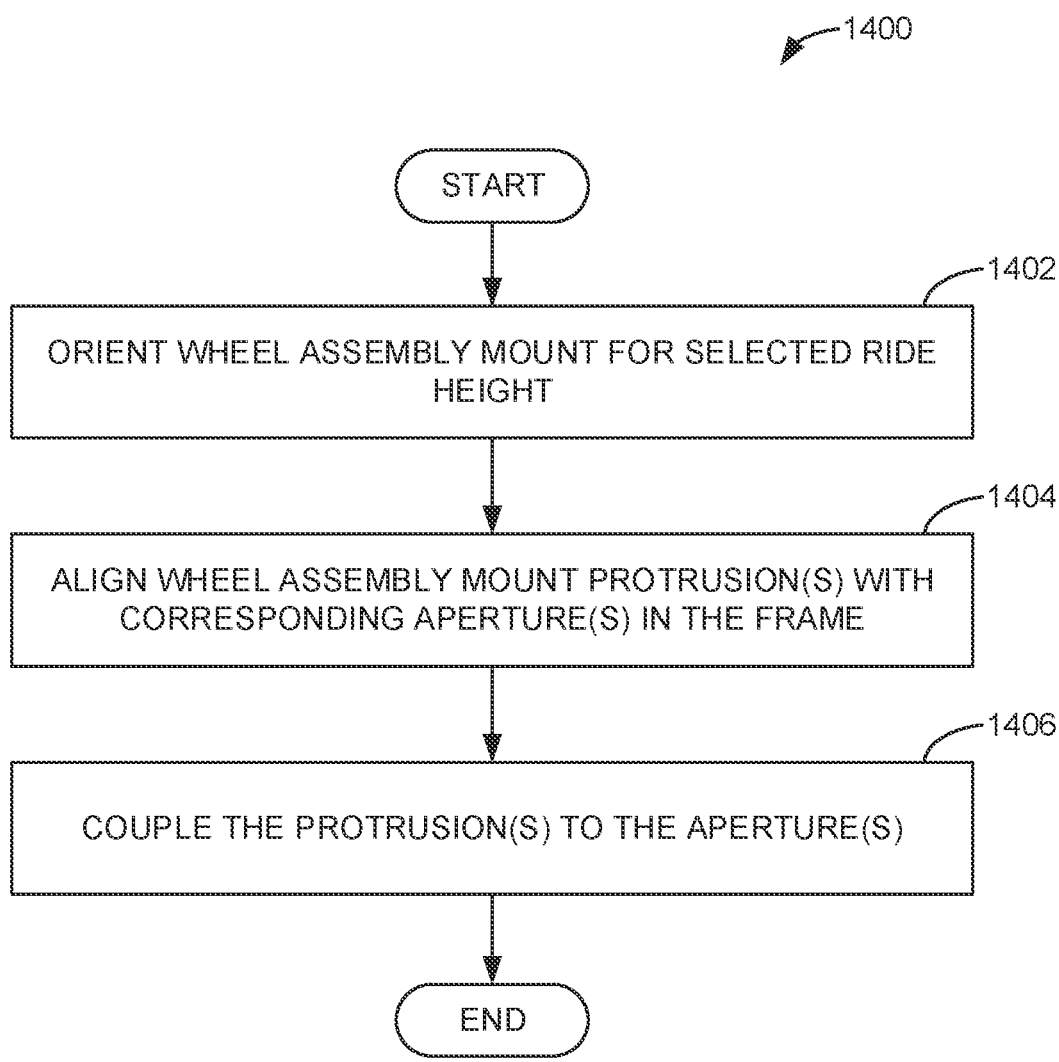
FIG. 14 is a flowchart representative of an example method to configure a ride height of a vehicle using the example wheel assembly mounts of FIGS. 10, 11A, 11B, 12A, 12B, 13A and/or 13B.

FIG. 14 is a flowchart representative of an example method 1400 to configure a ride height of a vehicle using the example wheel assembly mounts 1010A, 1010B, 101C, 1010D of FIGS. 10, 11A, 11B, 12A, 12B, 13A and/or 13B. The example method 1400 begins at block 1402 at which the example wheel assembly mount (e.g., the wheel assembly mounts 1010A, 1010B, 101C, 1010D) is oriented for a selected ride height. The wheel assembly mounts 1010A, 1010B, 1010C, 1010D include protrusions (e.g., the example first protrusion 1104 and/or the example second protrusion 1106) that extend toward the vehicle frame. In some examples, the protrusions of the wheel assembly mounts 1010A, 1010B, 1010C, 1010D are oriented for the selected ride height. In examples disclosed herein, the selected ride height can be a first ride height of the vehicle frame (e.g., a low ride height) or a second ride height of the vehicle frame (e.g., a high ride height).

At block 1404, example protrusion(s) (e.g., the example first protrusion 1104 and/or the example second protrusion 1106) of the example wheel assembly mount (e.g., the wheel assembly mounts 1010A, 1010B, 1010C, 1010D) are aligned with corresponding aperture(s) (e.g., the example apertures 1012A, 1012B) in the vehicle frame 1002. In some examples, the protrusion(s) (e.g., the first protrusion 1104 and/or the second protrusion 1106) are aligned with apertures adjacent to each of a plurality of wheel assembly locations on the vehicle frame 1002 (e.g., the apertures 1012A, 1012B). The protrusion(s) (e.g., the first protrusion 1104 and/or the second protrusion 1106) are positionable in the apertures (e.g., the apertures 1012A, 1012B) in a position (e.g., the first position 1108 or the second position 1110) to provide the selected ride height of the vehicle frame 1002. For example, the first protrusion 1104 and the second protrusion 1106 are aligned with the corresponding apertures 1012A, 1012B in the first position 1108 to provide the first ride height (low ride height), and the first protrusion 1104 is aligned with the corresponding aperture 1012B in the second position 1110 to provide the second ride height (high ride height), as illustrated in FIGS. 12A, 12B, 13A, and 13B. For the first position 1108, the protrusion(s) (e.g., the example first protrusion 1104 and/or the example second protrusion 1106) are aligned with the aperture(s) (e.g., the apertures 1012A, 1012B) along a first axis that is substantially parallel to a longitudinal axis of the vehicle frame 1002. For the second position 1110, the protrusion(s) (e.g., the example first protrusion 1104 and/or the example second protrusion 1106) are aligned with the aperture(s) (e.g., the apertures 1012A, 1012B) along a second axis that is substantially perpendicular to the longitudinal axis of the vehicle frame 1002.

At block 1406, the example protrusion(s) (e.g., the example first protrusion 1104 and/or the example second protrusion 1106) are coupled to the aperture(s) (e.g., the example apertures 1012A, 1012B). The wheel assembly mounts 1010A, 1010B, 1010C, 1010D are coupled to the vehicle frame 1002 via the coupling of the protrusion(s) (e.g., the first protrusion 1104 and/or the second protrusion 1106) and the aperture(s) (e.g., the apertures 1012A, 1012B).

Figure 15:
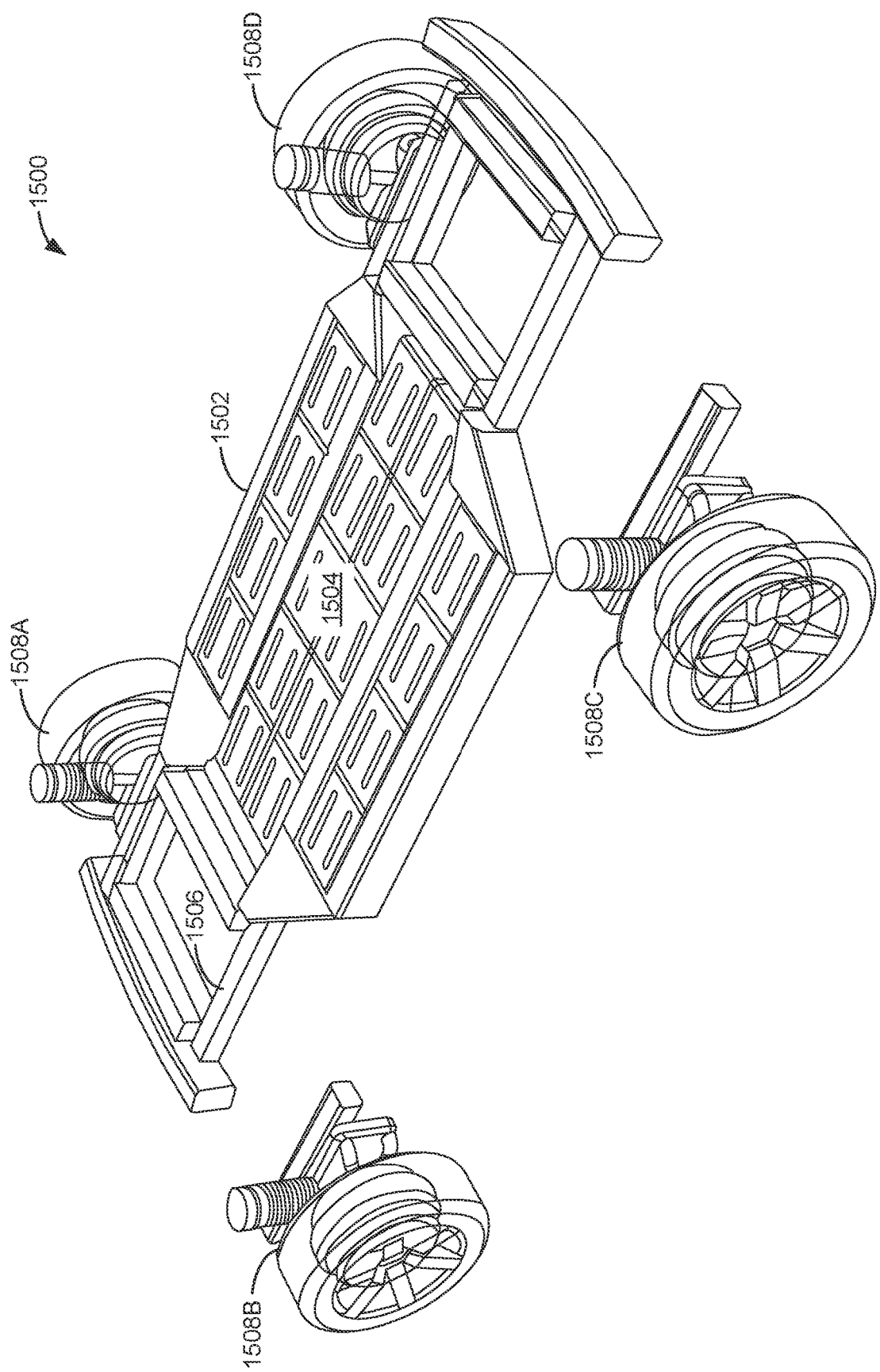
FIG. 15 illustrates an example vehicle chassis including example electric motorized wheel assemblies in accordance with the teachings of this disclosure.

FIG. 15 illustrates an example chassis 1500 having example electric motorized wheel assemblies 1508A, 1508B, 1508C, 1508D in accordance with the teachings of this disclosure. The example vehicle chassis 1500 of FIG. 15 includes an example vehicle frame 1502, example battery packs 1504, an example center subframe 1506, and the example wheel assemblies 1508A, 1508B, 1508C, 1508D. In the illustrated example of FIG. 15, the wheel assemblies 1508A, 1508B, 1508C, 1508D are coupled to the center subframe 1506 of the vehicle frame 1502. In examples disclosed herein, each of the wheel assemblies 1508A, 1508B, 1508C, 1508D includes a wheel, an electric motor, a suspension assembly, and a frame mounting interface, which are discussed in further detail below in connection with FIG. 16A. The wheel assemblies 1508A, 1508B, 1508C, 1508D are couplable to the center subframe 1506 via the frame mounting interface.

In the illustrated example, the vehicle frame 1502 includes the battery packs 1504. In examples disclosed herein, the battery packs 1504 power the electric motor of each of the wheel assemblies 1508A, 1508B, 1508C, 1508D. In the illustrated example, the wheel, the electric motor, the suspension assembly, and the frame mounting interface of the wheel assemblies 1508A, 1508B, 1508C, 1508D are interchangeable for different configurations (e.g., size, geometry, etc.). In the illustrated example, the swappable or interchangeable components (e.g., the wheel, the electric motor, the suspension assembly, and the frame mounting interface) of the wheel assemblies 1508A, 1508B, 1508C, 1508D have common attachment and packaging strategies, which allows ride and performance needs to be met for the vehicle 100 while reducing the number of parts and complexity of manufacturing.

Figure 16A:
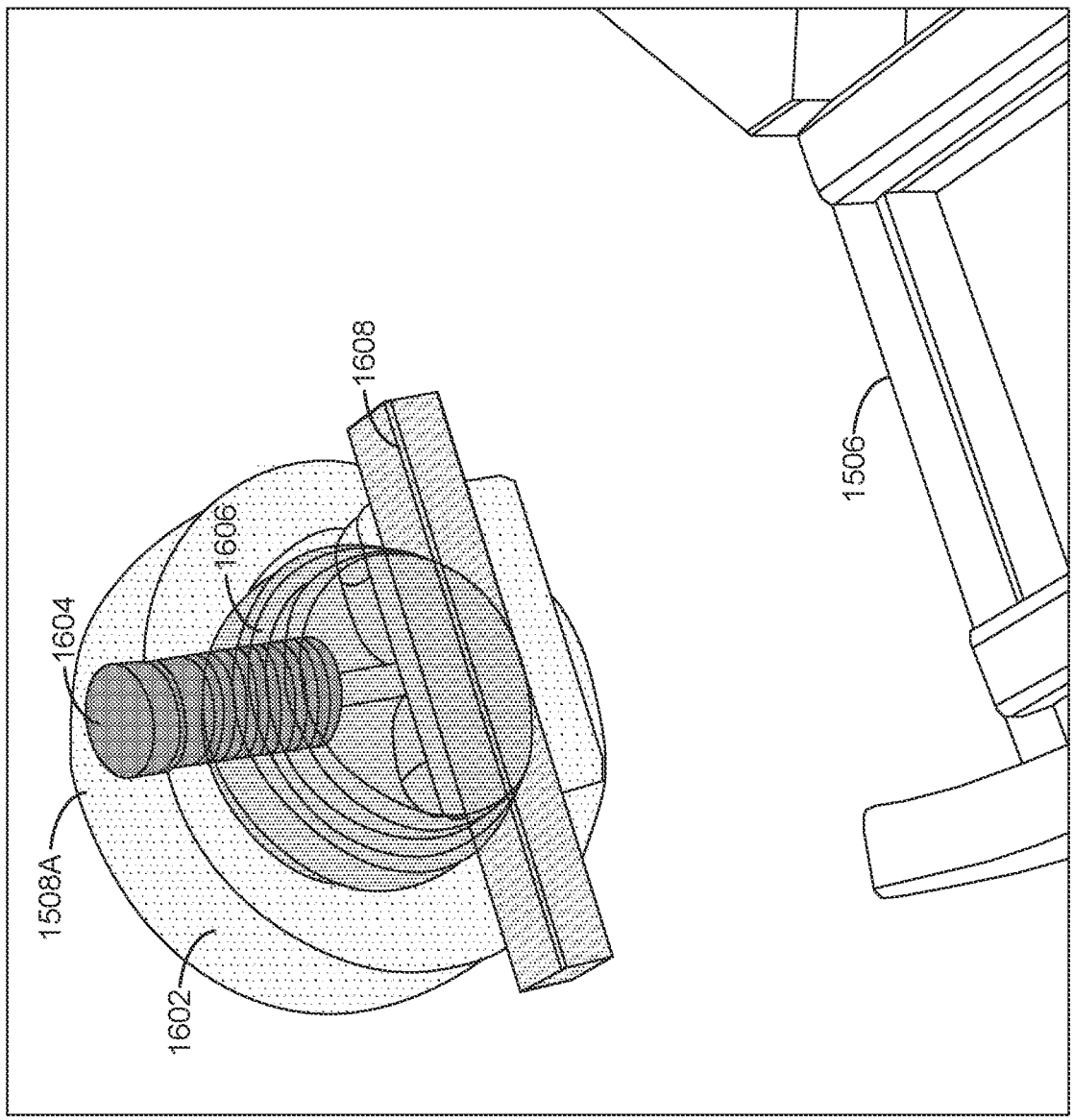
FIG. 16A illustrates an example wheel assembly of FIG. 15 configured for the example vehicle of FIG. 1.

FIG. 16A illustrates the example wheel assembly 1508A of FIG. 15 configured for the example vehicle 100 of FIG.

1. The example wheel assembly 1508A of FIG. 16A includes an example wheel 1602, an example suspension assembly 1604, an example electric motor 1606, and an example frame mounting interface 1608. In the illustrated example, the wheel 1602, the suspension assembly 1604, the electric motor 1606, and the frame mounting interface 1608 are interchangeable with other suspension assemblies, electric motors, and frame mounting interfaces, respectively. For example, each of the wheel 1602, the suspension assembly 1604, the electric motor 1606, and the frame mounting interface 1608 are variable in size and/or geometry. For example, the electric motor 1606 can be interchanged with different sized electric motors, the geometry of the suspension assembly 1604 can be changed to adjust ride height for the vehicle 100, the dampening in the suspension assembly 1604 can be changed for different terrain, etc. In the illustrated example, the wheel assembly 1508A is configured to easily switch out the components (the wheel 1602, the suspension assembly 1604, the electric motor 1606, and the frame mounting interface 1608) to allow for customization of the vehicle 100 to meet performance needs and ride quality expectations.

In the illustrated example of FIG. 16A, the wheel 1602, the suspension assembly 1604, the electric motor 1606, and the frame mounting interface 1608 are coupled in the wheel assembly 1508A. In some examples, the electric motor 1606 is operatively coupled to the wheel 1602. In such examples, the operation of the electric motor 1606 causes rotation of the wheel 1602. In the illustrated example, the wheel assembly 1508A (including the wheel 1602, the suspension assembly 1604, and the electric motor 1606) is connected to the center subframe 1506 via the frame mounting interface 1608, which is described in further detail below in connection with FIG. 16B. In the illustrated example, the frame mounting interface 1608 is illustrated as a beam. However, the frame mounting interface 1608 can be implemented as a bar, a plate, a bracket, etc. In some examples, the frame mounting interface 1608 includes mounting points for suspension links and dampers in the wheel assembly 1508A (not visible in the illustrated example of FIG. 16A).

Figure 16B:
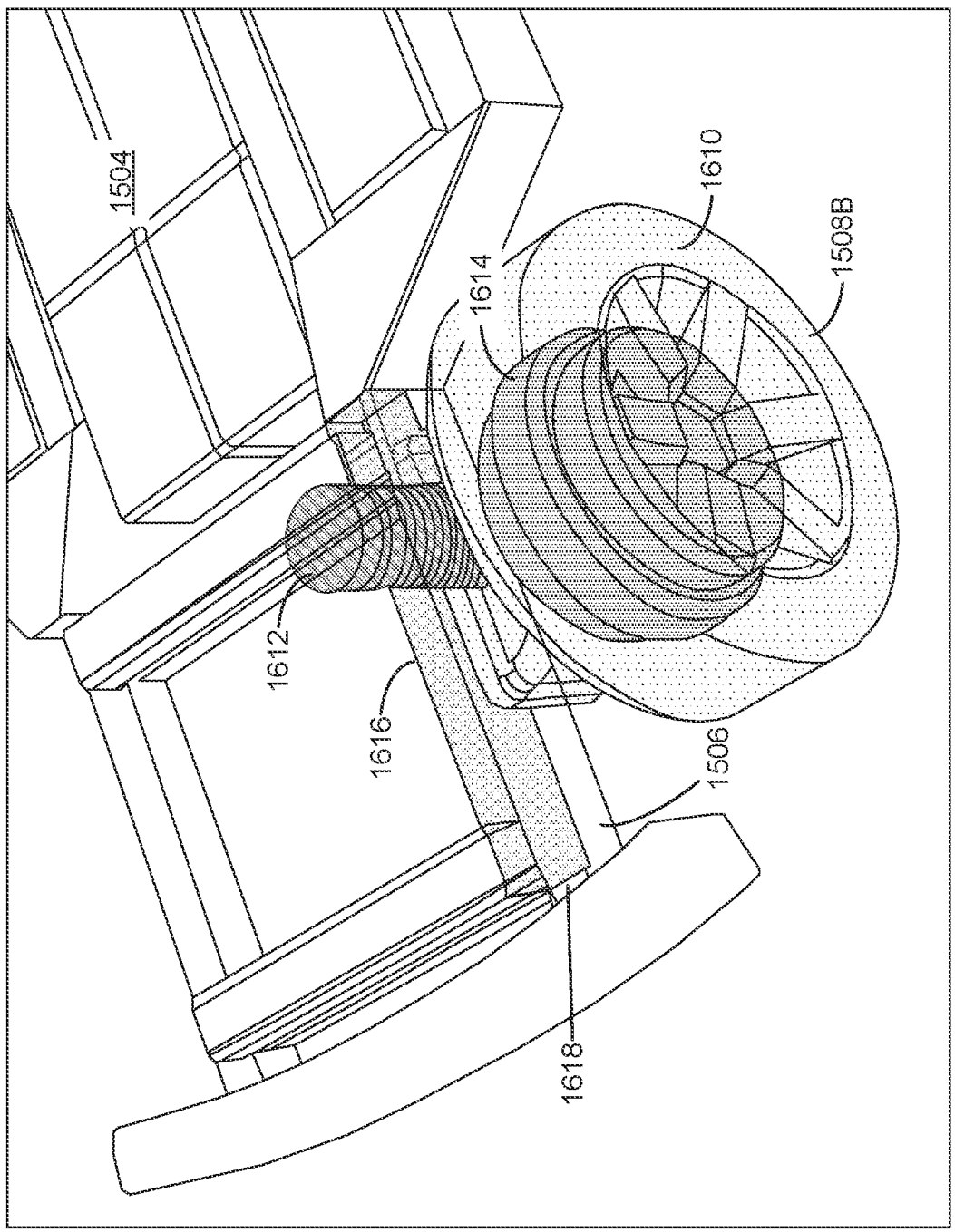
FIG. 16B illustrates an example wheel assembly of FIG. 15 coupled to the example vehicle frame of FIG. 15.

FIG. 16B illustrates the example wheel assembly 1508B of FIG. 15 coupled to the example vehicle frame 1502 of FIG. 15. The example wheel assembly 1508B of FIG. 16B includes an example wheel 1610, an example suspension assembly 1612, an example electric motor 1614, and an example frame mounting interface 1616. In examples disclosed herein, the wheel 1610, the suspension assembly 1612, the electric motor 1614, and the frame mounting interface 1616 are the same as the wheel 1602, the suspension assembly 1604, the electric motor 1606, and the frame mounting interface 1608 of FIG. 16A. In the illustrated example of FIG. 16B, the wheel assembly 1508B (including the wheel 1610, the suspension assembly 1612, and the electric motor 1614) is connected to the center subframe 1506 via the frame mounting interface 1616.

In the illustrated example of FIG. 16B, the frame mounting interface 1616 is coupled to the center subframe 1506 of the vehicle frame 1502 by aligning the frame mounting interface 1616 on an example top surface 1618 of the center subframe 1506. In some examples, the frame mounting interface 1616 is coupled to the center subframe 1506 of the vehicle frame 1502 via welding, bolts, etc. In the illustrated example, the wheel assembly 1508B is connected to the center subframe 1506 via the frame mounting interface 1616 to allow for variability in size, geometry, etc. between the vehicle frame 1502 and the components of the wheel assembly 1508B (the wheel 1610, the suspension assembly 1612, the electric motor 1614, and the frame mounting interface 1616) without the need for traditional axle connections from the center of the wheel assembly 1508B containing the electric motor 1614.

Figure 17:
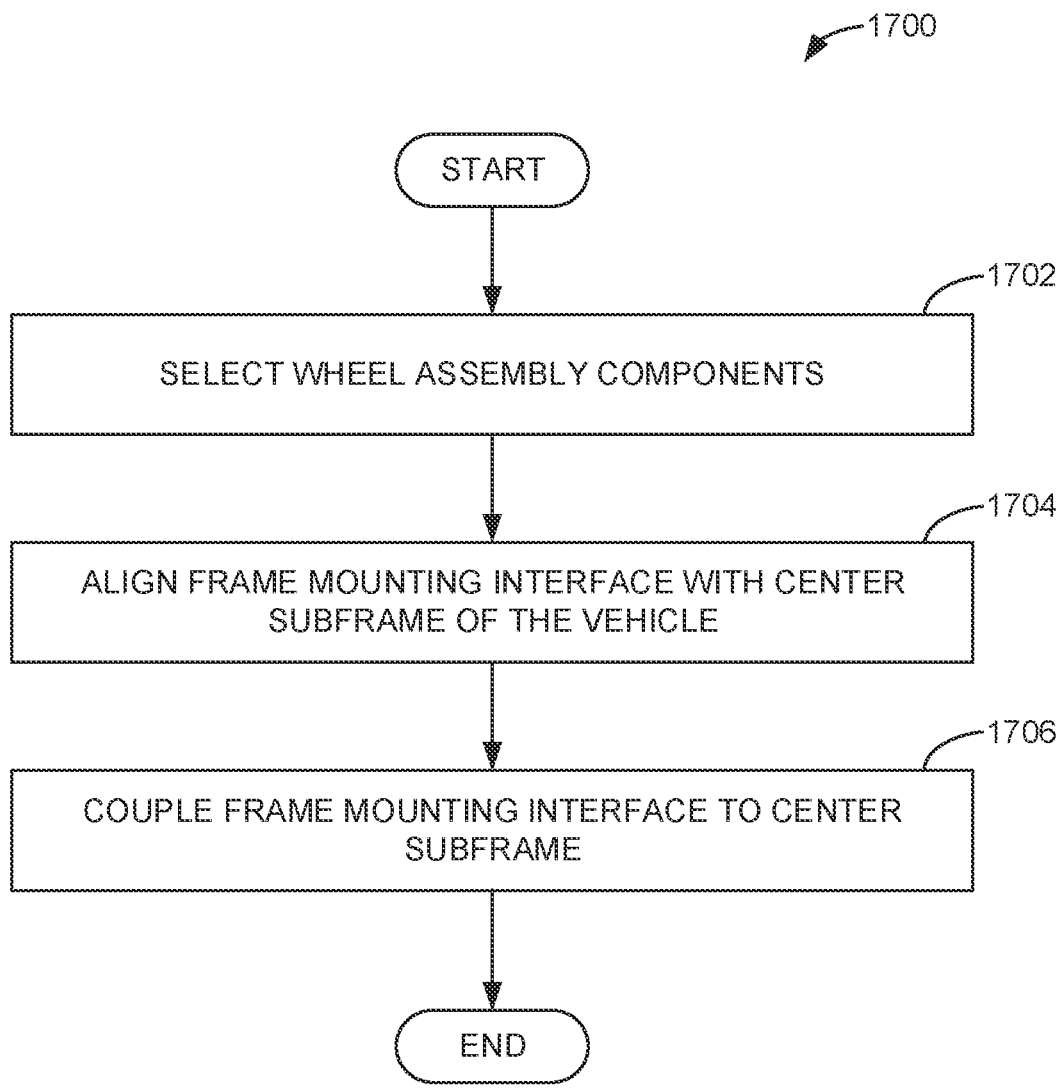
FIG. 17 is a flowchart representative of an example method to configure the example wheel assemblies of FIGS. 15, 16A, and/or 16B.

FIG. 17 is a flowchart representative of an example method 1700 to configure the example wheel assemblies 1508A, 1508B, 1508C, 1508D of FIGS. 15, 16A, and/or 16B. The example method 1700 begins at block 1702 at which the example wheel assembly components are selected. In examples disclosed in, the wheel assembly components include a wheel (e.g., the example wheel 1602 and the example wheel 1610), an electric motor (e.g., the example electric motor 1606 and the example electric motor 1614), a suspension assembly (e.g., the example suspension assembly 1604 and the example suspension assembly 1612), and the frame mounting interface (e.g., the example frame mounting interface 1608 and the example frame mounting interface 1616). In some examples, the wheel assembly components are interchangeable in the wheel assembly (e.g., the wheel assemblies 1508A, 1508B, 1508C, 1508D). In some examples, each of the wheel (e.g., the example wheels 1602, 1610), the electric motor (e.g., the example electric motors 1606, 1614), the suspension assembly (e.g., the example suspension assemblies 1604, 1612), and the frame mounting interface (e.g., the example frame mounting interfaces 1608, 1616) are variable in size and/or geometry. In some examples, the operator of the vehicle 100 can selects the different components for the wheel assembly (e.g., the wheel assemblies 1508A, 1508B, 1508C, 1508D) to meet performance and ride requirements.

At block 1704, the example frame mounting interface (e.g., the example frame mounting interfaces 1608, 1616) of the wheel assembly (e.g., the wheel assemblies 1508A, 1508B, 1508C, 1508D) is aligned with the center subframe (e.g., the center subframe 1506) of the vehicle 100. In some examples, the frame mounting interface (e.g., the example frame mounting interfaces 1608, 1616) is aligned on a top surface (e.g., the example top surface 1618) of the center subframe 1506 of the vehicle frame 1502.

At block 1706, the example frame mounting interface (e.g., the example frame mounting interfaces 1608, 1616) of the wheel assembly (e.g., the wheel assemblies 1508A, 1508B, 1508C, 1508D) is coupled to the center subframe (e.g., the center subframe 1506) of the vehicle 100. In some examples, the frame mounting interface (e.g., the example frame mounting interfaces 1608, 1616) is coupled to the center subframe 1506 of the vehicle frame 1502 via welding, bolts, etc. In some examples, the wheel assembly (e.g. the wheel assemblies 1508A, 1508B, 1508C, 1508D) is connected to the center subframe 1506 via the frame mounting interface (e.g., the example frame mounting interfaces 1608, 1616) to allow for variability in size, geometry, etc. between the vehicle frame 1502 and the components of the wheel assembly (e.g., the wheel assemblies 1508A, 1508B, 1508C, 1508D) without the need for traditional axle connections from the center of the wheel assembly.

Figure 18:
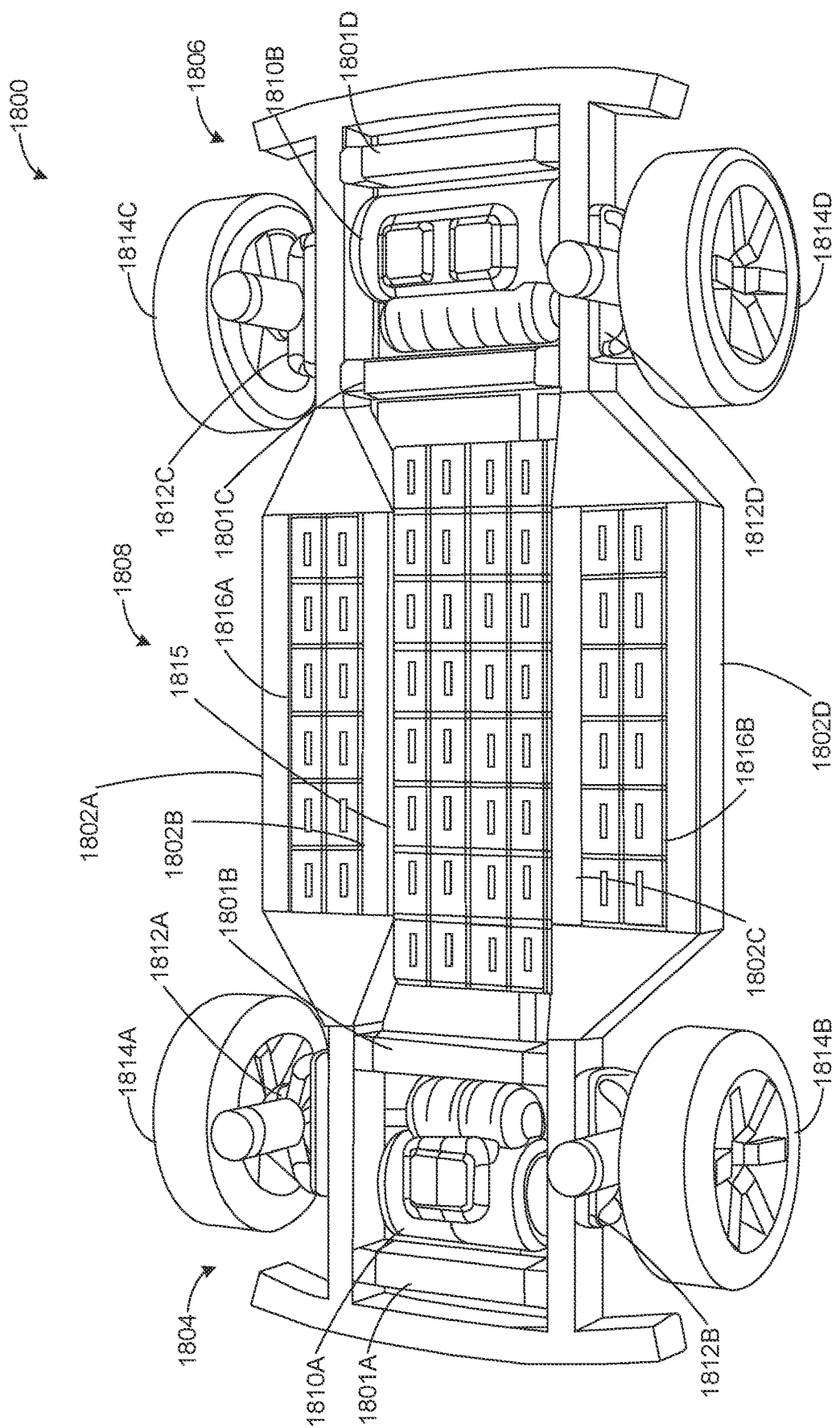
FIG. 18 is a perspective view of an example vehicle chassis in which the teachings of this disclosure can be implemented.

FIG. 18 is an illustration of an example vehicle chassis 1800 in which the teachings of this disclosure can be implemented. The vehicle chassis 1800 includes an example first crossmember 1801A, an example second crossmember 1801B, an example third crossmember 1801C, and an example fourth crossmember 1801D, an example first side rail 1802A, an example second side rail 1802B, an example third side rail 1802C, and an example fourth side rail 1802D. The vehicle chassis 1800 is generally divided into an example front chassis portion 1804, an example rear chassis portion 1806, and an example battery platform 1808. In the illustrated example of FIG. 18, the front chassis portion 1804 is coupled to an example first electric motor 1810A, an example first suspension assembly 1812A, an example second suspension assembly 1812B, an example first wheel 1814A, and an example second wheel 1814B. In the illustrated example of FIG. 18, the rear chassis portion 1806 is coupled to an example second electric motor 1810B, an example third suspension assembly 1812C, an example fourth suspension assembly 1812D, an example third wheel 1814C, and an example fourth wheel 1814D. In the illustrated example of FIG. 18, the battery platform 1808 includes an example central battery array 1815, an example first side battery array 1816A, and an example second battery array 1816B. In the illustrated example of FIG. 18, the vehicle chassis 1800 includes a perimeter frame. In other examples, the teachings of this disclosure can be applied on any other suitable type of vehicle frame (e.g., a ladder frame, a unibody frame, etc.).

The crossmembers 1801A, 1801B, 1801C, 1801D extend generally laterally between the driver and passenger sides of the chassis 1800. The crossmembers 1801A, 1801B, 1801C, 1801D increase the strength of the chassis 1800 and protect vehicle components (e.g., the electric motors 1810A, 1810B, the suspension assemblies 1812A, 1812B, 1812C, 1812D, etc.). In some examples, the crossmembers 1801A, 1801B, 1801C, 1801D include additional features (e.g., bolt holes, weld surfaces, etc.) that enable additional vehicle components to be coupled thereto. In the illustrated example of FIG. 18, the vehicle chassis 1800 includes four crossmembers (e.g., the crossmembers 1801A, 1801B, 1801C, 1801D, etc.). In other examples, the vehicle chassis 1800 includes a different quantity of crossmembers (e.g., two cross members, four cross members, etc.). The crossmembers 1801A, 1801B, 1801C, 1801D can be composed of steel, aluminum, and/or any other suitable material(s). The coupling of the crossmembers 1801A, 1801B, 1801C, 1801D within the chassis 1800 is described in greater detail below in conjunction with FIG. 19.

The side rails 1802A, 1802B, 1802C, 1802D extend longitudinally between the front chassis portion 1804 and the rear chassis portion 1806. In the illustrated example of FIG. 18, the vehicle chassis 1800 includes four side rails (e.g., the side rails 1802A, 1802B, 1802C, 1802D, etc.). In other examples, the vehicle chassis 1800 includes a different quantity of side rails (e.g., two side rails, four side rails, etc.). The side rails 1802A, 1802B, 1802C, 1802D can be composed of steel, aluminum, and/or any other suitable material(s). The coupling of the side rails 1802A, 1802B, 1802C, 1802D within the chassis 1800 is described in greater detail below in conjunction with FIG. 19.

The crossmembers 1801A, 1801B, 1801C, 1801D, and the side rails 1802A, 1802B, 1802C, 1802D can be of variable size depending on the type and/or model of the vehicle. For example, longer or shorter crossmembers 1801A, 1801B, 1801C, 1801D can be selected to change the lateral size of the vehicle chassis 1800. Similarly, longer or shorter side rails 1802A, 1802B, 1802C, 1802D can be selected to change the longitudinal size of the vehicle chassis 1800. As such, by varying the size of the crossmembers 1801A, 1801B, 1801C, 1801D and side rails 1802A, 1802B, 1802C, 1802D, the footprint of the vehicle chassis 1800 can be scaled without changing the other components of the chassis 1800, which enables shared components to be utilized on differently sized vehicle chassis. The selection of differently sized crossmembers and side rails is described in greater detail below in conjunction with FIG. 19. Example configurations of the vehicle chassis 1800 using differently sized crossmembers and side rails are described below in conjunction with FIG. 20A and FIG. 20B.

In other examples, the crossmembers 1801A, 1801B, 1801C, 1801D and/or the side rails 1802A, 1802B, 1802C, 1802D include features (e.g., slidable rails, telescoping features, etc.) that enable length adjustment (e.g., extension, contraction, etc.) of the crossmembers 1801A, 1801B, 1801C, 1801D and/or the side rails 1802A, 1802B, 1802C, 1802D. An example vehicle chassis including adjustable crossmembers and adjustable side rails is described below in conjunction with FIG. 21. Example structural members including adjustable features are described below in conjunction with FIGS. 22A and 22B.

The front chassis portion 1804 includes the components of the chassis 1800 forward of the battery platform 1808. The rear chassis portion 1806 includes the components of the chassis 1800 rearward of the battery platform 1808. The front and rear chassis portions 1804, 1806 can be composed of smaller chassis portions coupled via the crossmembers 1801A, 1801B, 1801C, 1801D. An example implementation of the chassis portions 1804, 1806 variable size is described below in conjunction with FIGS. 23-24B.

The electric motors 1810A, 1810B are powertrain components that convert electric power provided by the batteries of the battery arrays 1815, 1816A, 1816B into mechanical energy that drives the wheels 1814A, 1814B, 1814C, 1814D. In some examples, the parameters of the electric motors 1810A, 1810B (e.g., horsepower, torque, size, etc.) are chosen based on the configuration of the chassis 1800 (e.g., the length of the crossmembers 1801A, 1801B, 1801C, 1801D and/or the side rails 1802A, 1802B, 1802C, 1802D, etc.) and/or the model of the vehicle associated with the chassis 1800. In other examples, the electric motors 1810A, 1810B are absent. In such examples, other powertrain components (e.g., one or more combustion engine(s), etc.) can be coupled between the crossmembers 1801A, 1801B, 1801C, 1801D.

The batteries of the battery arrays 1815, 1816A, 1816B are EV batteries. The batteries of the battery arrays 1815, 1816A, 1816B provide power to the electric motors 1810A, 1810B. In other examples, if the vehicle chassis 1800 is associated with a hybrid vehicle, the batteries of the battery arrays 1815, 1816A, 1816B supplement the power generated by a combustion engine of the vehicle chassis 1800. The central battery array 1815 is disposed between the second side rail 1802B and the third side rail 1802C. The first side battery array 1816A is disposed between the first side rail 1802A and the second side rail 1802B. The second side battery array 1816B is disposed between the third side rail 1802C and the fourth side rail 1802D. In some examples, additional batteries are disposed within the chassis 1800 (e.g., in the front chassis portion 1804, in the rear chassis portion 1806, etc.). In some examples, the side battery arrays 1816A, 1816B are absent (e.g., in examples with two side rails, etc.). Example chassis configurations including additional batteries are described below in conjunction with FIGS. 23, 24A, and 24B.

Figure 19:
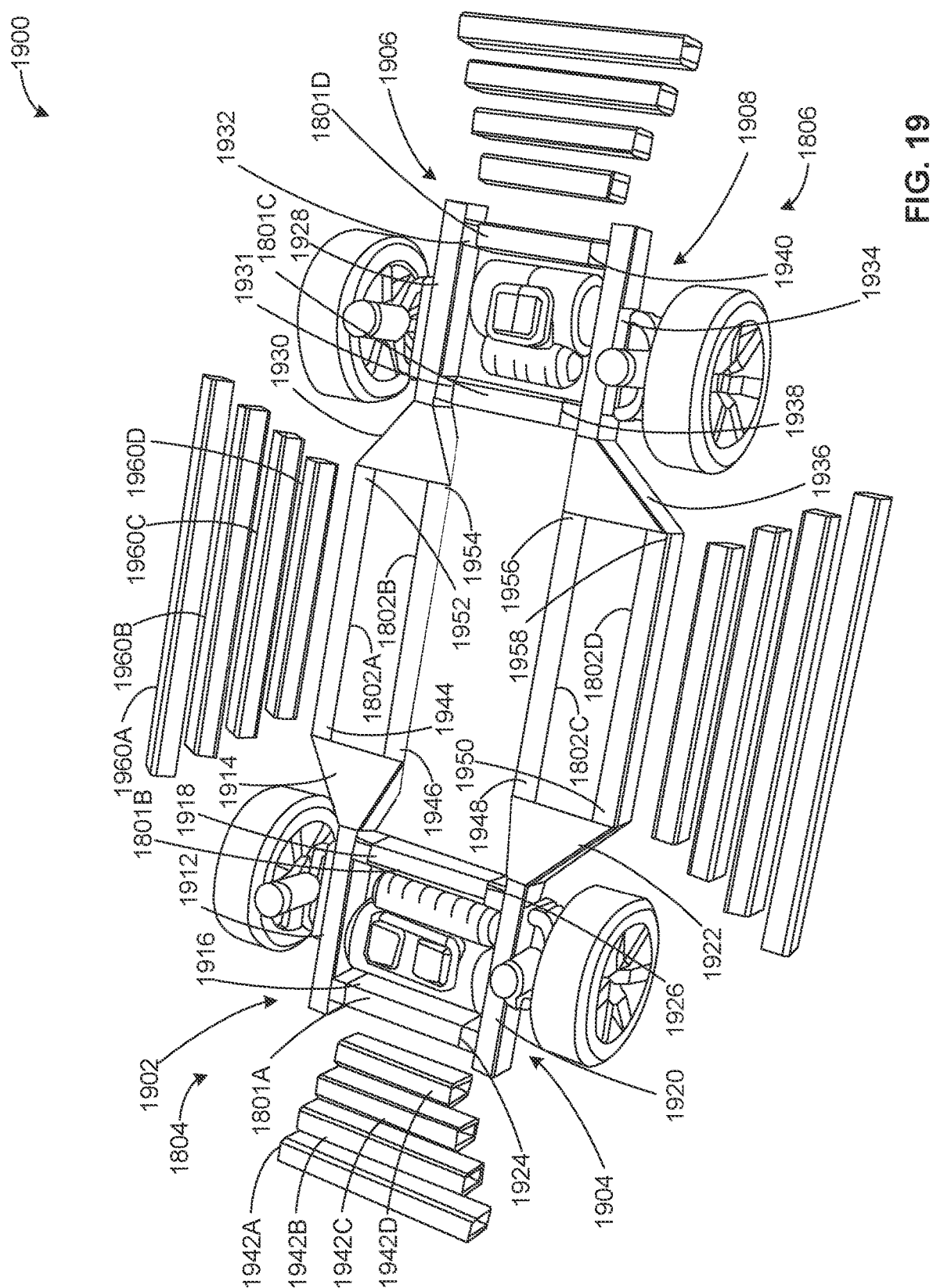
FIG. 19 is a perspective view of an example vehicle chassis with different width and length configurations.

FIG. 19 is a perspective view of an example vehicle chassis 1900 with the different width and length configurations. In the illustrated example of FIG. 19, the front chassis portion 1804 includes an example right front chassis portion 1902 and an example left front chassis portion 1904. In the illustrated example of FIG. 19, the rear chassis portion 1806 includes an example right rear chassis portion 1906 and an example left rear chassis portion 1908. In the illustrated example of FIG. 19, the right front chassis portion 1902 includes an example first longitudinal member 1912, an example first flared portion 1914, an example first crossmember attachment locator 1916, an example second crossmember attachment locator 1918, an example first side rail attachment locator 1944, and an example second side rail attachment locator 1946. In the illustrated example of FIG. 19, the left front chassis portion 1904 includes an example second longitudinal member 1920, an example second flared portion 1922, an example third crossmember attachment locator 1924, an example fourth crossmember attachment locator 1926, an example third side rail attachment locator 1948, and an example fourth side rail attachment locator 1950. In the illustrated example of FIG. 19, the right rear chassis portion 1906 includes an example third longitudinal member 1928, an example third flared portion 1930, an example fifth crossmember attachment locator 1931, an example sixth crossmember attachment locator 1932, an example fifth side rail attachment locator 1952, and an example sixth side rail attachment locator 1954. In the illustrated example of FIG. 19, the left rear chassis portion 1908 includes an example fourth longitudinal member 1934, an example fourth flared portion 1936, an example seventh crossmember attachment locator 1938, an example eighth crossmember attachment locator 1940, an example seventh side rail attachment locator 1956, and an example eighth side rail attachment locator 1958.

The chassis portions 1902, 1904, 1906, 1908 each include a corresponding one of the longitudinal members 1912, 1920, 1928, 1934 and one of the flared portions 1914, 1922, 1930, 1936. The flared portions 1914, 1922, 1930, 1936 can be fully or partially hollow. In other examples, the flared portions 1914, 1922, 1930, 1936 are solid parts. In the illustrated example of FIG. 19, the flared portions 1914, 1922, 1930, 1936 are trapezoidal prisms. In other examples, the flared portions 1914, 1922, 1930, 1936 can have any other suitable shape (e.g., a forked structure, a conical structure, pyramidal structure, a cylindrical structure, etc.).

In the illustrated example of FIG. 19, the flared portions 1914, 1922 are disposed at the respective rearward ends of the longitudinal members 1912, 1920. In the illustrated example of FIG. 19, the flared portions 1930, 1936 are disposed at the respective forward ends of the longitudinal members 1928, 1934. In some examples, each of the flared portions 1914, 1922, 1930, 1936 and the corresponding longitudinal members 1912, 1920, 1928, 1934 (e.g., the first flared portion 1914 and the first longitudinal member 1912, the second flared portion 1922 and the second longitudinal member 1920, etc.) is a unitary structure. In other examples, the flared portions 1914, 1922, 1930, 1936 can be coupled to the corresponding longitudinal members 1912, 1920, 1928, 1934 via any suitable fastening technique(s) (e.g., welds, press-fit, chemical adhesive, one or fasteners, etc.).

In some examples, to minimize cost and to simplify manufacturing/assembly, the longitudinal members 1912, 1920, 1928, 1934 are of the same design and dimensions. Similarly, in some examples, the flared portions 1914, 1922, 1930, 1936 are of the same design and dimensions. In such examples, the chassis portions 1902, 1904, 1906, 1908 include the same parts, which reduces the total number of unique parts of the chassis 1900.

The crossmember attachment locators 1916, 1918, 1924, 1926, 1931, 1932, 1938, 1940 are features of the chassis portions 1902, 1904, 1906, 1908 that enable the coupling of the crossmembers 1801A, 1801B, 1801C, 1801D. That is, the first crossmember attachment locator 1916 and the third crossmember attachment locator 1924 facilitate the coupling of the first crossmember 1801A between the first longitudinal member 1912 of the right front chassis portion 1902 and the second longitudinal member 1920 of the left front chassis portion 1904. The second crossmember attachment locator 1918 and the fourth crossmember attachment locator 1926 facilitate the coupling of the second crossmember 1801B between the first longitudinal member 1912 of the right front chassis portion 1902 and the second longitudinal member 1920 of the left front chassis portion 1904. The fifth crossmember attachment locator 1931 and the seventh crossmember attachment locator 1938 facilitate the coupling of the third crossmember 1801C between the third longitudinal member 1928 of the right rear chassis portion 1906 and the fourth longitudinal member 1934 of the left rear chassis portion 1908. The sixth crossmember attachment locator 1932 and the eighth crossmember attachment locator 1940 facilitate the coupling of the fourth crossmember 1801D between the third longitudinal member 1928 of the right rear chassis portion 1906 and the fourth longitudinal member 1934 of the left rear chassis portion 1908.

The crossmember attachment locators 1916, 1918, 1924, 1926, 1931, 1932, 1938, 1940 include one or more feature(s) that enable the coupling of the crossmembers 1801A, 1801B, 1801C, 1801D therebetween. For example, the crossmember attachment locators 1916, 1918, 1924, 1926, 1931, 1932, 1938, 1940 can include inboard extending protrusions to be coupled within an aperture (e.g., the hollow cross-sections of the crossmembers 1801A, 1801B, 1801C, 1801D, etc.) of the corresponding crossmembers 1801A, 1801B, 1801C, 1801D. In such examples, the protrusions of the crossmember attachment locators 1916, 1916, 1918, 1924, 1926, 1931, 1932, 1938, 1940 may be dimensioned to frictionally engage with the internal surface of the corresponding apertures of the crossmembers 1801A, 1801B, 1801C, 1801D. In other examples, the crossmember attachment locators 1916, 1918, 1924, 1926, 1931, 1932, 1938, 1940 include apertures to receive corresponding outboard extending protrusions of the crossmembers 1801A, 1801B, 1801C, 1801D. At the crossmember attachment locators 1916, 1918, 1924, 1926, 1931, 1932, 1938, 1940, the crossmembers 1801A, 1801B, 1801C, 1801D can be coupled to the corresponding chassis portions 1902, 1904, 1906, 1908 via one or more welds. In other examples, the crossmembers 1801A, 1801B, 1801C, 1801D can be coupled to the corresponding chassis portions 1902, 1904, 1906, 1908 via any fastening technique (e.g., a fastener, a weld, a chemical adhesive, a press-fit, etc.) or combination thereof. Additionally or alternatively, the crossmember attachment locators 1916, 1918, 1924, 1926, 1931, 1932, 1938, 1940 can include a bracket and/or other feature that facilitates the coupling of the crossmembers 1801A, 1801B, 1801C, 1801D.

In the illustrated example of FIG. 19, the crossmembers 1801A, 1801B, 1801C, 1801D are implemented by one of example interchangeable crossmembers 1942A, 1942B, 1942C, 1942D. The interchangeable crossmembers 1942A, 1942B, 1942C, 1942D are structural members of different lengths. That is, the first interchangeable crossmember 1942A is the longest of the interchangeable crossmembers 1942A, 1942B, 1942C, 1942D. The second interchangeable crossmember 1942B is the second longest of the interchangeable crossmembers 1942A, 1942B, 1942C, 1942D. The third interchangeable crossmember 1942C is the third longest of the interchangeable crossmembers 1942A, 1942B, 1942C, 1942D. The fourth interchangeable crossmember 1942D is the shortest of the interchangeable crossmembers 1942A, 1942B, 1942C, 1942D. Depending on which of the interchangeable crossmembers 1942A, 1942B, 1942C, 1942D implements the crossmembers 1801A,

1801B, 1801C, 1801D, the width of the chassis 1900 can be changed. As such, the chassis 1900 supports various width configurations with only the changing of the crossmembers 1801A, 1801B, 1801C, 1801D. Two example configurations of the chassis 1900 illustrating the use of the first interchangeable crossmember 1942A and the fourth interchangeable crossmember 1942D are described below in conjunction with FIGS. 20A and 20B, respectively.

The side rail attachment locators 1944, 1946, 1948, 1950, 1952, 1954, 1956, 1958 are features of the chassis portions 1902, 1904, 1906, 1908 that enable the coupling of the side rails 1802A, 1802B, 1802C, 1802D. That is, the first side rail attachment locator 1944 and the fifth side rail attachment locator 1952 facilitate the coupling of the first side rail 180A between the first flared portion 1914 of the right front chassis portion 1902 and the third flared portion 1930 of the right rear chassis portion 1906. The second side rail attachment locator 1946 and the sixth side rail attachment locator 1954 facilitate the coupling of the second side rail 1802B between the first flared portion 1914 of the right front chassis portion 1902 and the third flared portion 1930 of the right rear chassis portion 1906. The third side rail attachment locator 1948 and the seventh side rail attachment locator 1956 facilitate the coupling of the third side rail 1802C between the second flared portion 1922 of the left front chassis portion 1904 and the fourth flared portion 1936 of the left rear chassis portion 1908. The fourth side rail attachment locator 1950 and the eighth side rail attachment locator 1958 facilitate the coupling of the fourth side rail 1802D between the second flared portion 1922 of the left front chassis portion 1904 and the fourth flared portion 1936 of the left rear chassis portion 1908.

The side rail attachment locators 1944, 1946, 1948, 1950, 1952, 1954, 1956, 1958 include one or more feature(s) that enable the coupling of the side rails 1802A, 1802B, 1802C, 1802D therebetween. For example, the side rail attachment locators 1944, 1946, 1948, 1950, 1952, 1954, 1956, 1958 can include protrusions to be coupled within corresponding apertures (e.g., the hollow cross-sections of the side rails 1802A, 1802B, 1802C, 1802D, etc.) of the corresponding side rails 1802A, 1802B, 1802C, 1802D. In such examples, the protrusions of the side rail attachment locators 1944, 1946, 1948, 1950, 1952, 1954, 1956, 1958 may be dimensioned to frictionally engage with the internal surface of the corresponding apertures of the side rails 1802A, 1802B, 1802C, 1802D. In other examples, the side rail attachment locators 1944, 1946, 1948, 1950, 1952, 1954, 1956, 1958 include apertures to receive a corresponding protrusion of the side rails 1802A, 1802B, 1802C, 1802D. At the side rail attachment locators 1944, 1946, 1948, 1950, 1952, 1954, 1956, 1958, the side rails 1802A, 1802B, 1802C, 1802D can be coupled to the corresponding chassis portions 1902, 1904, 1906, 1908 via one or more welds. In other examples, the side rails 1802A, 1802B, 1802C, 1802D are coupled to the corresponding chassis portions 1902, 1904, 1906, 1908 via any fastening technique (e.g., a fastener, a weld, a chemical adhesive, a press-fit, etc.) or combination thereof. Additionally or alternatively, the side rail attachment locators 1944, 1946, 1948, 1950, 1952, 1954, 1956, 1958 can include a bracket and/or other feature that facilitates the coupling of the side rails 1802A, 1802B, 1802C, 1802D.

In the illustrated example of FIG. 19, the side rails 1802A, 1802B, 1802C, 1802D are implemented by one of example interchangeable side rails 1960A, 1960B, 1960C, 1960D. The interchangeable side rails 1960A, 1960B, 1960C, 1960D are structural members of different lengths. That is, the first interchangeable side rail 1960A is the longest of the interchangeable side rails 1960A, 1960B, 1960C, 1960D. The second interchangeable side rail 1960B is the second longest of the interchangeable side rails 1960A, 1960B, 1960C, 1960D. The third interchangeable side rail 1960C is the third longest of the interchangeable side rails 1960A, 1960B, 1960C, 1960D. The fourth interchangeable side rail 1960D is the shortest of the interchangeable side rails 1960A, 1960B, 1960C, 1960D. Depending on which of the interchangeable side rails 1960A, 1960B, 1960C, 1960D implements the side rails 1802A, 1802B, 1802C, 1802D, the length of the chassis 1900 can be changed. As such, the chassis 1900 supports various length configurations with only the changing of the side rails 1802A, 1802B, 1802C, 1802D. Two example configurations of the chassis 1800 illustrating the use of the first interchangeable side rail 1960A and the fourth interchangeable side rail 1960D are described below in conjunction with FIGS. 20A and 20B, respectively.

Figure 20B:
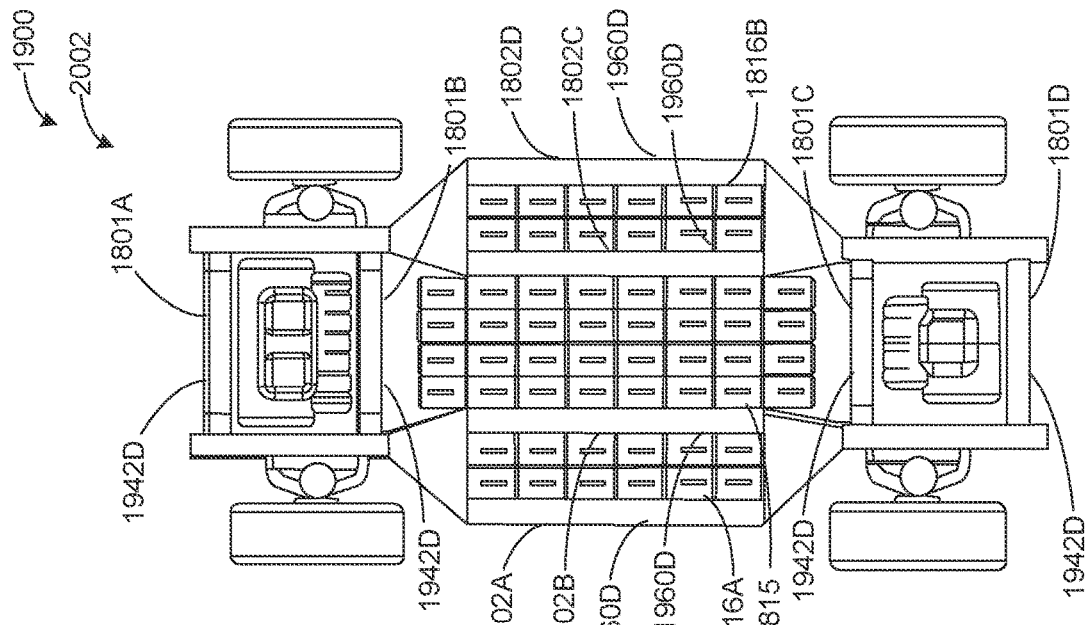
FIG. 20B is a top view of a second configuration of the chassis of FIG. 19.
Figure 20A:
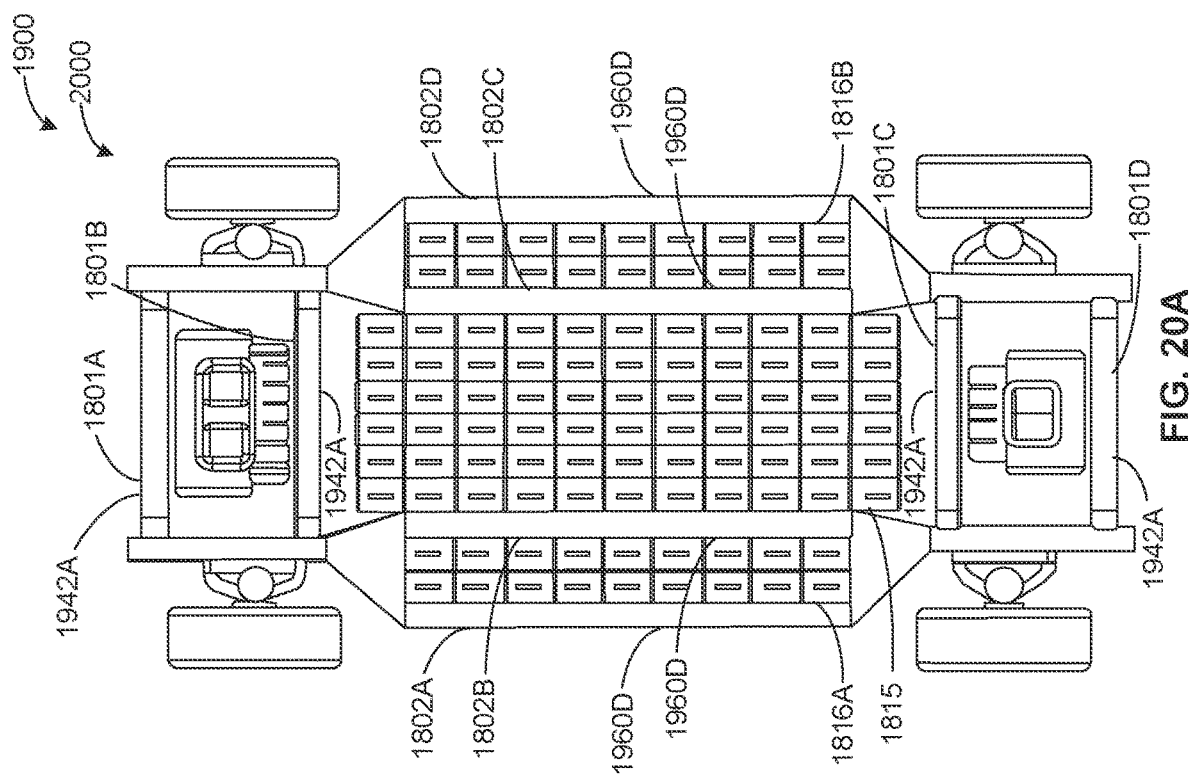
FIG. 20A is a top view of a first configuration of the chassis of FIG. 19.

FIG. 20A is a top view of an example first configuration 2000 of the chassis 1900. In the illustrated example of FIG. 20A, the first configuration 2000 of the chassis 1900 includes the first interchangeable crossmember 1942A implementing each of the crossmembers 1801A, 1801B, 1801C, 1801D and the first interchangeable side rail 1960A implementing each of the side rails 1802A, 1802B, 1802C, 1802D. In the illustrated example of FIG. 20A, the chassis 1800 has a comparatively larger width and length, which makes the first configuration 2000 suitable for larger vehicles (e.g., SUVs, pick-up trucks, etc.).

FIG. 20B is a top view of an example second configuration 2002 of the chassis 1900. In the illustrated example of FIG. 20B, the second configuration 2002 of the chassis 1800 includes the fourth interchangeable crossmember 1942D implementing each of the crossmembers 1801A, 1801B, 1801C, 1801D and the fourth interchangeable side rail 1960D implementing each of the side rails 1802A, 1802B, 1802C, 1802D. In the illustrated example of FIG. 20B, the chassis 1800 has a comparatively smaller footprint, which makes the first configuration 2000 suitable for smaller vehicles (e.g., compact vehicles, crossovers, etc.).

In some examples, the battery arrays 1815, 1816A, 1816B have different numbers of batteries in different configurations of the vehicle chassis 1900. In the illustrated examples of FIGS. 20A and 20B, the first configuration 2000 of the vehicle chassis 1900 includes a comparatively greater number of batteries than the second configuration 2002 of the vehicle chassis 1900. While the configurations 2000, 2002 of FIGS. 20A and 20B include particular combinations of the interchangeable crossmembers 1942A, 1942B, 1942C, 1942D and the interchangeable side rails 1960A, 1960B, 1960C, 1960D (e.g., the comparatively short first interchangeable crossmember 1942A and the comparatively smaller first side rail 1960A of FIG. 20A, the comparatively long fourth crossmember 1942D, and the comparatively longer fourth side rail 1960D of FIG. 20B, etc.), any combination of the interchangeable crossmembers 1942A, 1942B, 1942C, 1942D and the interchangeable side rails 1960A, 1960B, 1960C, 1960D can be used with the vehicle chassis 1900. For example, example configurations of the vehicle chassis 1900 include a comparatively longer interchangeable crossmember (e.g., the interchangeable crossmember 1942A, 1942B, etc.) and a comparatively smaller interchangeable side rail (e.g., the interchangeable side rail 1960C, 1960D, etc.) and vice versa.

FIGS. 21-24 depict alternative vehicle chassis that may be used to implement the teachings of this disclosure that are similar to those described with reference FIGS. 18-20. When the same element number is used in connection with FIGS. 21-24 as used in FIGS. 18-20, it has the same meaning unless indicated otherwise.

Figure 21:
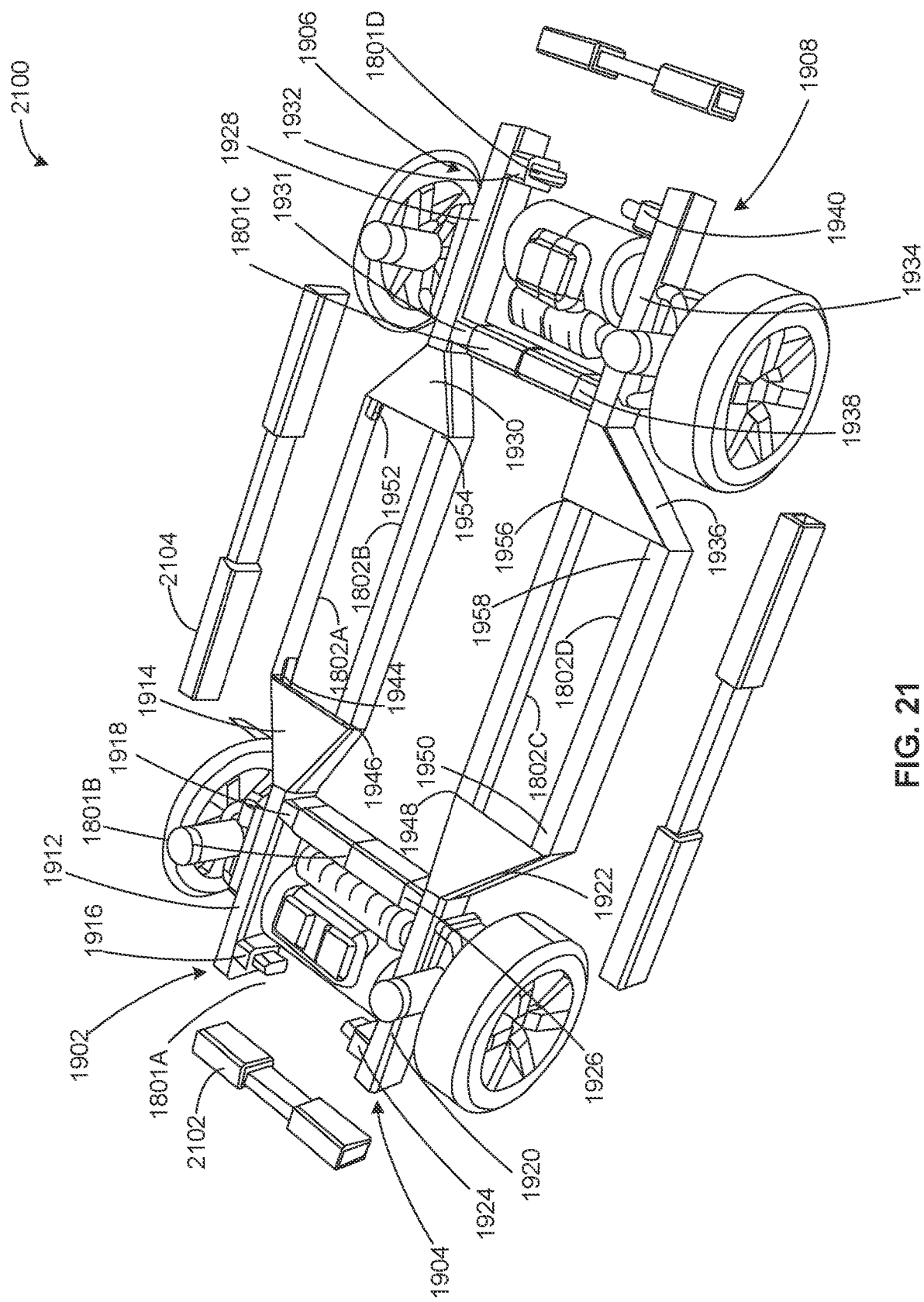
FIG. 21 is a perspective view of a first alternative vehicle chassis including the adjustable structural members.

FIG. 21 is a perspective view of an alternative vehicle chassis 2100 including adjustable crossmember(s) 2102 and side rail(s) 2104. In the illustrated example of FIG. 21, the vehicle chassis 2100 includes the right front chassis portion 1902, the left front chassis portion 1904, the right rear chassis portion 1906, and the left rear chassis portion 1908. In the illustrated example of FIG. 21, the right front chassis portion 1902 includes the example first longitudinal member 1912, the example first flared portion 1914, the example first crossmember attachment locator 1916, the example second crossmember attachment locator 1918, the example first side rail attachment locator 1944, and the example second side rail attachment locator 1946. In the illustrated example of FIG. 21, the left front chassis portion 1904 includes the example second longitudinal member 1920, the example second flared portion 1922, the example third crossmember attachment locator 1924, the example fourth crossmember attachment locator 1926, the example third side rail attachment locator 1948, and the example fourth side rail attachment locator 1950. In the illustrated example of FIG. 21, the right rear chassis portion 1906 includes the example third longitudinal member 1928, the example third flared portion 1930, the example fifth crossmember attachment locator 1931, the example sixth crossmember attachment locator 1932, the example fifth side rail attachment locator 1952, and the example sixth side rail attachment locator 1954. In the illustrated example of FIG. 19, the left rear chassis portion 1908 includes the example fourth longitudinal member 1934, the example fourth flared portion 1936, the example seventh crossmember attachment locator 1938, the example eighth crossmember attachment locator 1940, the example seventh side rail attachment locator 1956, and the example eighth side rail attachment locator 1958. The adjustable structural member that can be used to implement the adjustable crossmember(s) 2102 and/or the adjustable side rail(s) 2104 is described below in conjunction with FIG. 22A. An alternative adjustable structural member that can be used to implement the adjustable crossmember(s) 2102 and/or the adjustable side rail(s) 2104 is described in detail below in conjunction with FIG. 22B.

In the illustrated example of FIG. 21, the crossmembers 1801A, 1801B, 1801C, 1801D can be implemented by the adjustable crossmember 2102. The adjustable crossmember(s) 2102 are structural members with variably adjustable lengths. For example, the adjustable crossmember(s) 2102 can be adjusted to the desired length during the assembly of the chassis 2100. In some examples, the desired length of the adjustable crossmembers(s) 2102 is determined based on the model associated with the chassis 2100 and/or the desired total width of the chassis 2100. That is, depending on the adjusted length of the adjustable crossmember(s) 2102, the width of the chassis 2100 can be changed. As such, the chassis 2100 supports various width configurations based only on the adjustment of the adjustable crossmember(s) 2102.

In some examples, the adjustable crossmember(s) 2102 include one or more feature(s) that enable the adjustable crossmember(s) 2102 to be coupled to the crossmember attachment locators 1916, 1918, 1924, 1926, 1931, 1932, 1938, 1940. For example, the adjustable crossmember(s) 2102 can include apertures (e.g., a hollow cross-section, etc.) to receive corresponding protrusions of the crossmember attachment locators 1916, 1918, 1924, 1926, 1931, 1932, 1938, 1940. In other examples, the adjustable crossmember(s) 2102 includes protrusions to be received by corresponding apertures of the crossmember attachment locators 1916, 1918, 1924, 1926, 1931, 1932, 1938, 1940. At the crossmember attachment locators 1916, 1918, 1924, 1926, 1931, 1932, 1938, 1940, the adjustable crossmember(s) 2102 can be coupled to the corresponding chassis portions 1902, 1904, 1906, 1908 via one or more welds. In other examples, the adjustable crossmember(s) 2102 are coupled to the corresponding chassis portions 1902, 1904, 1906, 1908 via any fastening technique (e.g., a fastener, a weld, a chemical adhesive, a press-fit, etc.) or combination thereof.

In the illustrated example of FIG. 21, the side rails 1802A, 1802B, 1802C, 1802D are implemented by the example adjustable side rail(s) 2104. The adjustable side rail(s) 2104 are structural members with variable lengths. For example, the adjustable side rail(s) 2104 can be adjusted to the desired length during the assembly of the chassis 2100. In some examples, the desired length of the adjustable side rail(s) 2104 is determined based on the model associated with the chassis 2100 and/or the desired total length of the chassis 2100. That is, depending on the adjusted length of the adjustable side rail(s) 2104, the length of the chassis 2100 can be changed. As such, the chassis 2100 supports various length configurations based only on the adjustment of the adjustable side rail(s) 2104.

In some examples, the adjustable side rail(s) 2104 include one or more feature(s) that enable the adjustable side rail(s) 2104 to be coupled to the side rail attachment locators 1944, 1946, 1948, 1950, 1952, 1954, 1956, 1958. For example, the adjustable side rail(s) 2104 can include apertures (e.g., a hollow cross-section, etc.) to receive corresponding protrusions of the side rail attachment locators 1944, 1946, 1948, 1950, 1952, 1954, 1956, 1958. In other examples, the adjustable side rail(s) 2104 can include protrusions to be received by corresponding apertures of the side rail attachment locators 1944, 1946, 1948, 1950, 1952, 1954, 1956, 1958. At side rail attachment locators 1944, 1946, 1948, 1950, 1952, 1954, 1956, 1958, the adjustable side rail(s) 2104 can be coupled to the corresponding chassis portions 1902, 1904, 1906, 1908 via one or more welds. In other examples, the adjustable side rail(s) 2104 can be coupled to the corresponding chassis portions 1902, 1904, 1906, 1908 via any fastening technique (e.g., a fastener, a weld, a chemical adhesive, a press-fit, etc.) or combination thereof.

Figure 22B:
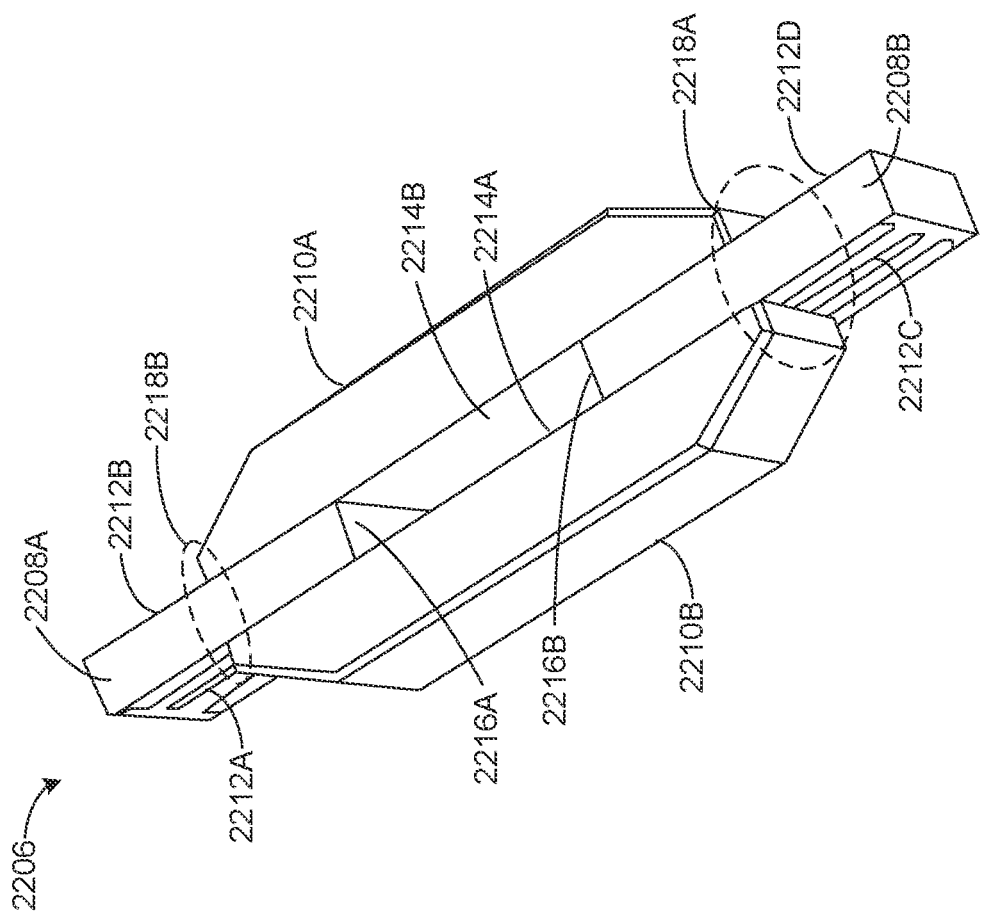
FIG. 22B is a perspective view of an alternative adjustable member that can be used with the alternative vehicle chassis of FIG. 21.
Figure 22A:
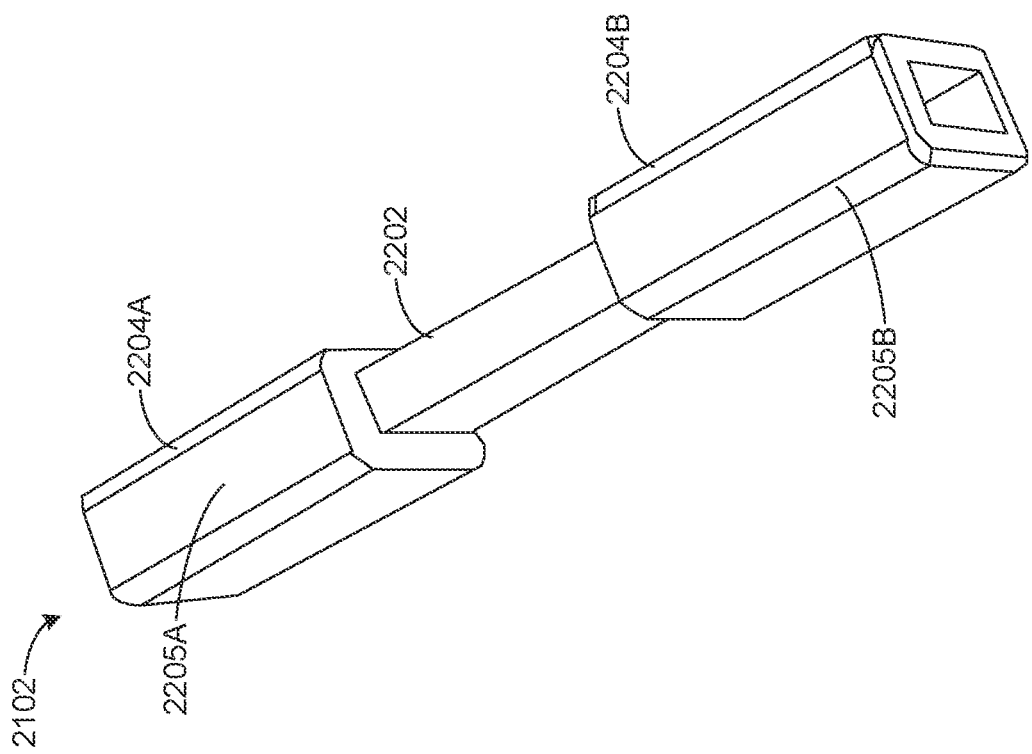
FIG. 22A is a perspective view of an adjustable structural member of FIG. 21.

FIG. 22A is a perspective view of the adjustable structural member 2102 of FIG. 21. In the illustrated example, the adjustable structural member 2102 includes an example inner member 2202, an example first outer sleeve 2204A, and an example second outer sleeve 2204B. The inner member 2202 has an example first end 2205A and an example second end 2205B.

The adjustable structural member 2102 is a telescoping structural member. In the illustrated example of FIG. 22A, the outer sleeves 2204A, 2204B (e.g., telescoping features, etc.) that slide relative to the inner member 2202 such that the adjustable structural member 2102 can be adjusted to the desired length. In the illustrated example of FIG. 22A, the adjustable structural member 2102 is configured to have a relatively longer length by adjusting the outer sleeves 2204A, 2204B such that a portion of the outer sleeves 2204A, 2204B extends past the ends 2205A, 2206A, respectively. In other examples, the adjustable structural member 2102 can be configured to have a relatively shorter length by adjusting the outer sleeves 2204A, 2204B such that the first outer sleeve 2204A abuts the second outer sleeve 2204B.

That is, the total length of the adjustable structural member 2102 can be adjusted by positioning the outer sleeves 2204A, 2204B.

In some examples, after the outer sleeves 2204A, 2204B have been positioned to achieve the desired length of the adjustable structural member 2102, the outer sleeves 2204A, 2204B can be permanently fixed relative to the inner member 2202 via welds and/or another suitable fastening techniques. In other examples, the outer sleeves 2204A, 2204B can be removably fixed relative to the inner member 2202 via a chemical adhesive, a fastener, and/or another suitable example. In some such examples, the adjustable structural member 2200 can be readjusted to have a different length (e.g., for use on a different chassis, etc.). In some examples, the inner member 2202 and/or the outer sleeves 2204A, 2204B can include features (not illustrated) that facilitate fixing the structural member 2200 at the desired length. or more apertures to receive one or more fasteners (e.g., bolts, pins, screws, etc.).

FIG. 22B is a perspective view of an example alternative adjustable structural member 2206 that can be used with the alternative vehicle chassis 2100 of FIG. 21. In the illustrated example of FIG. 22B, the adjustable structural member 2206 includes an example first inner rail 2208A, an example second inner rail 2208B, an example first outer rail 2210A, and an example second outer rail 2210B. In the illustrated example of FIG. 22B, the first inner rail 2208A includes an example first track 2212A and an example second track 2212B. In the illustrated example of FIG. 22B, the second inner rail 2208B includes an example third track 2212C and an example fourth track 2212D. In the illustrated example of FIG. 22B, the outer rails 2210A, 2210B include an example first boss 2214A and an example second boss 2214B, respectively. In the illustrated example of FIG. 22B, the inner rails 2208A, 2208B have an example first inner end 2216A and an example second inner end 2216B, respectively. In the illustrated example of FIG. 22B, the outer rails 2210A, 2210B define an example first outer end 2218A and an example second outer end 2218B.

The adjustable structural member 2206 is a slidably adjustable structural member. The length of the adjustable structural member 2206 can be adjusted by changing the position of the inner rails 2208A, 2208B relative to the outer rails 2210A, 2210B (e.g., slidably adjustable features, etc.). For example, the bosses 2214A, 2214B can slide within the corresponding tracks 2212A, 2212B, 2212C, 2212D (e.g., the first boss 2214A within the first track 2212A and the third track 2212C, the second boss 2214B within the second track 2212B and the fourth track 2212D, etc.). For example, the adjustable structural member 2206 can be adjusted to have a relatively shorter length by adjusting the rails 2208A, 2208B, 2210A, 2210B such that the first inner end 2216A of the first inner rail 2208A abuts the second inner end 2216B of the second inner rail 2208B. The adjustable structural member 2206 can be adjusted to have a relatively longer length by adjusting the rails 2208A, 2208B, 2210A, 2210B such that the first inner end 2216A of the first inner rail 2208A is proximate to the outer end 2218A and the second inner end 2216B of the second inner rail 2208B is proximate to the second outer end 2218B. That is, the total length of the adjustable structural member 2206 can be adjusted by positioning the rails 2208A, 2208B, 2210A, 2210B.

In some examples, after the rails 2208A, 2208B, 2210A, 2210B have been positioned to achieve the desired length of the adjustable structural member 2206, the relative positions of the rails 2208A, 2208B, 2210A, 2210B can be permanently fixed via welds and/or another suitable fastening techniques. For example, the bosses 2214A, 2214B can welded within the corresponding tracks 2212A, 2212B, 2212C, 2212D at the desired location. In other examples, the relative positions of the rails 2208A, 2208B, 2210A, 2210B can be removably fixed via a chemical adhesive, a fastener, and/or another suitable example. In some such examples, the adjustable structural member 2206 can be readjusted to have a different length (e.g., for use on a differently sized chassis, etc.). In some examples, some or all of the rails 2208A, 2208B, 2210A, 2210B include features (not illustrated) that facilitate fixing the adjustable structural member 2206 at the desired length. In some such examples, some or all of the rails 2208A, 2208B, 2210A, 2210B include one or more apertures to receive one or more fasteners (e.g., bolts, pins, screws, etc.).

Figure 23:
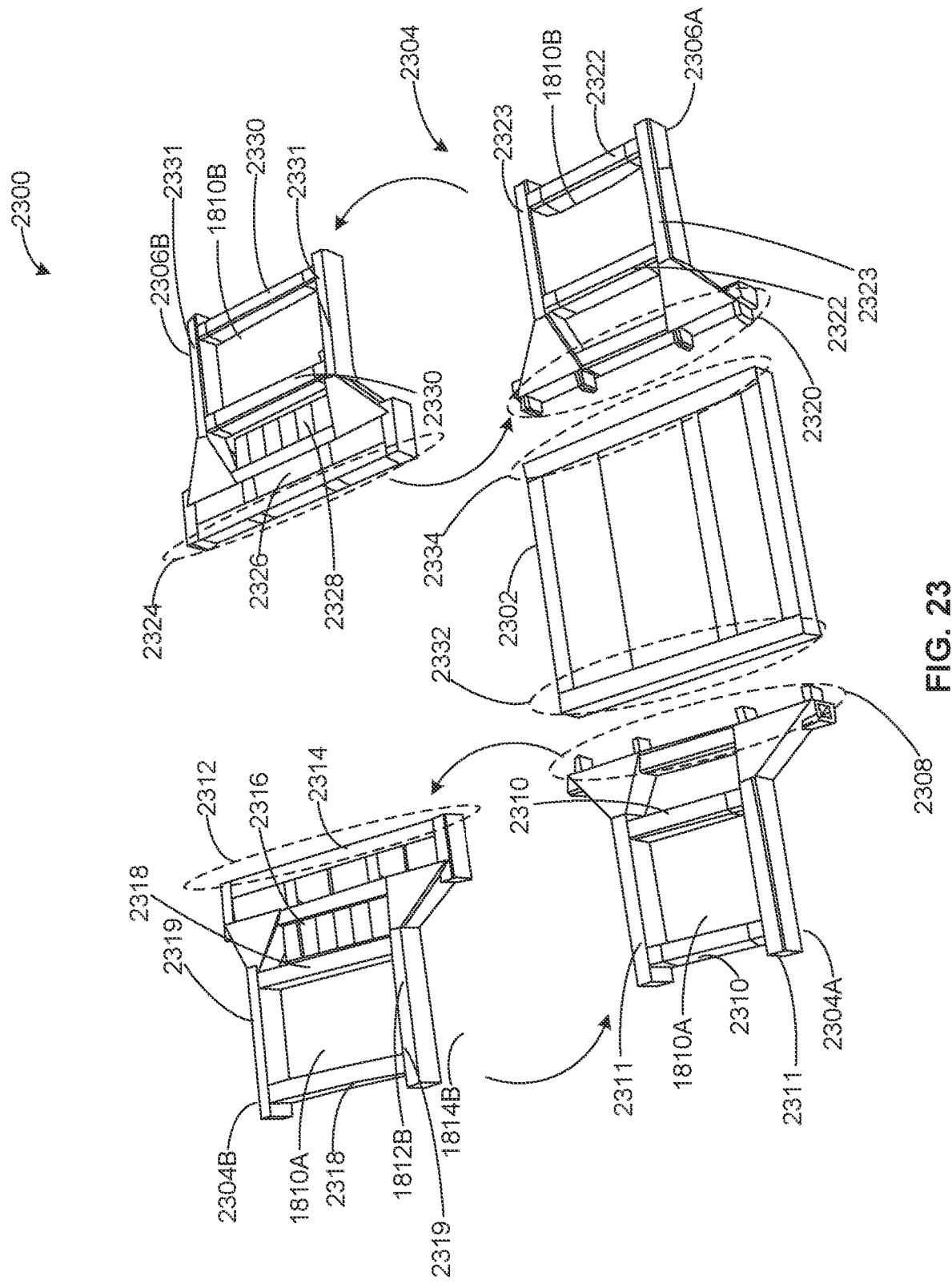
FIG. 23 is a perspective view of a second alternative vehicle chassis including interchangeable chassis portions.

FIG. 23 is a perspective view of an example second alternative vehicle chassis 2300. The example vehicle chassis 2300 includes an example battery platform 2302. The battery platform 2302 can be coupled to one of an example first interchangeable front chassis portion 2304A or an example second interchangeable front chassis portion 2304B. The battery platform 2302 can be coupled to one of an example first interchangeable rear chassis portion 2306A or an example second interchangeable rear chassis portion 2306B. The example first interchangeable front chassis portion 2304A includes example first attachment locators 2308, example first crossmembers 2310, and example first longitudinal members 2311. The example second interchangeable front chassis portion 2304B includes example first attachment locators 2312, an example frame section 2314, an example battery array 2316, example second crossmembers 2318, and example second longitudinal members 2319. The example first interchangeable rear chassis portion 2306A includes example third attachment locators 2320, example third crossmembers 2322, and example third longitudinal members 2323. The example second interchangeable rear chassis portion 2306B includes example fourth attachment locators 2324, an example second frame section 2326, an example second battery array 2328, example fourth crossmembers 2330, and example fourth longitudinal members 2331. The example battery platform 2302 includes example fifth attachment locators 2332 and example sixth attachment locators 2334.

In the illustrated example of FIG. 23, the interchangeable front chassis portions 2304A, 2304B include the example first electric motor 1810A, the example first suspension assembly 1812A, the example second suspension assembly 1812B, the example first wheel 1814A, and the example second wheel 1814B. In the illustrated example of FIG. 23, the interchangeable rear chassis portions 2306A, 2306B include the example second electric motor 1810B, the example third suspension assembly 1812C, the example fourth suspension assembly 1812D, the example third wheel 1814C, and the example fourth wheel 1814D.

The battery platform 2302 is a common component shared between different configurations of the chassis 2300. The example platform 2302 includes a plurality of structural members (e.g., crossmembers, side rails, etc.) and EV batteries. The fifth attachment locators 2332 can be coupled to the corresponding first attachment locators 2308 of the first interchangeable front chassis portion 2304A or the corresponding second attachment locators 2312 of the second interchangeable front chassis portion 2304B. The sixth attachment locators 2334 can be coupled to the corresponding third attachment locators 2320 of the first interchangeable rear chassis portion 2306A or the corresponding fourth attachment locators 2324 of the second interchangeable rear chassis portion 2306B. In the illustrated example of FIG. 23, the attachment locators 2308, 2312, 2320, 2324 include protrusions to be received by corresponding apertures of the attachment locators 2332, 2334 of the battery platform 2302. In other examples, the attachment locators 2332, 2334 of the battery platform 2302 include protrusions to be received by the attachment locators 2308, 2312, 2320, 2324. Additionally or alternatively, the battery platform 2302 can be coupled to a corresponding one of the interchangeable front chassis portions 2304A, 2304B and a corresponding one of the interchangeable rear chassis portions 2306A, 2306B via additional fastening techniques (e.g., welds, press-fits, chemical adhesives, fasteners, etc.).

The second interchangeable front chassis portion 2304B has a comparatively greater width and comparatively greater length than the first interchangeable front chassis portion 2304A. In the illustrated example of FIG. 23, the structural members of the second interchangeable front chassis portion 2304B (e.g., the crossmembers 2318, the longitudinal members 2319, etc.) are longer than the structural members of the first interchangeable front chassis portion 2304A. In the illustrated example of FIG. 23, the second interchangeable front chassis portion 2304B includes the first frame section 2314, which further contributes to the greater length of the second interchangeable front chassis portion 2304B compared to the first interchangeable front chassis portion 2304A. In other examples, the first frame section 2314 is absent.

The second interchangeable rear chassis portion 2306B has a comparatively greater width and comparatively greater length than the first interchangeable rear chassis portion 2306A. In the illustrated example of FIG. 23, the structural members of the second interchangeable rear chassis portion 2306B (e.g., the crossmembers 2322, the longitudinal members 2323, etc.) are longer than the structural members of the first interchangeable rear chassis portion 2306A. In the illustrated example of FIG. 23, the second interchangeable front chassis portion 2304B includes the second frame section 2326, which further contributes to the greater length of the second interchangeable front chassis portion 2304B compared to the first interchangeable rear chassis portion 2306A. In other examples, the second frame section 2314 is absent.

Depending on which of the interchangeable front chassis portions 2304A, 2304B is coupled to battery platform 2302 and which of the interchangeable rear chassis portions 2306A, 2306B is coupled to battery platform 2302, the width and the length of the chassis 2300 can be changed. While only two sizes of chassis portions are depicted in FIG. 23, the width and length of the interchangeable chassis assemblies can be designed and manufactured based on the desired width and length of the chassis 2300. As such, the chassis 2300 supports various width and length configurations depending on which of the interchangeable chassis portions 2304A, 2304B, 2306A, 2306B is utilized. Two example configurations of the chassis 2300 are described below in conjunction with FIGS. 24A and 24B.

Figure 24B:
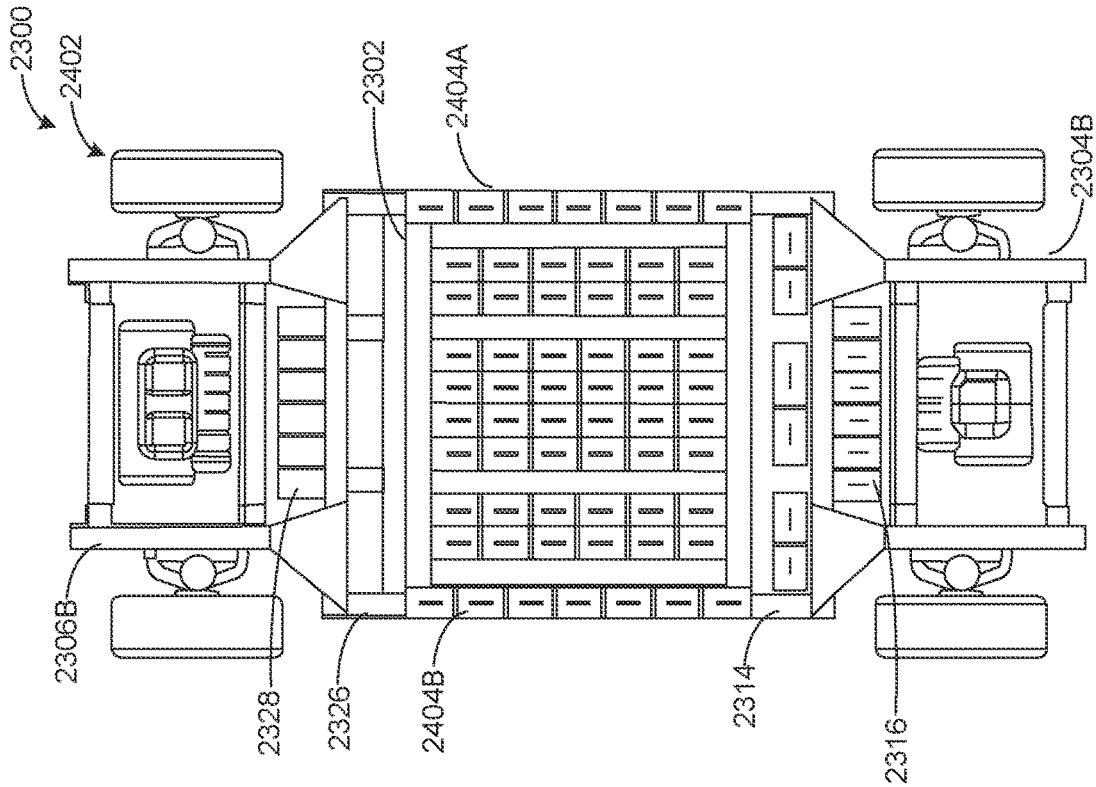
FIG. 24B is a top view of a second configuration of the chassis of FIG. 23 including a second set of the interchangeable chassis portions.
Figure 24A:
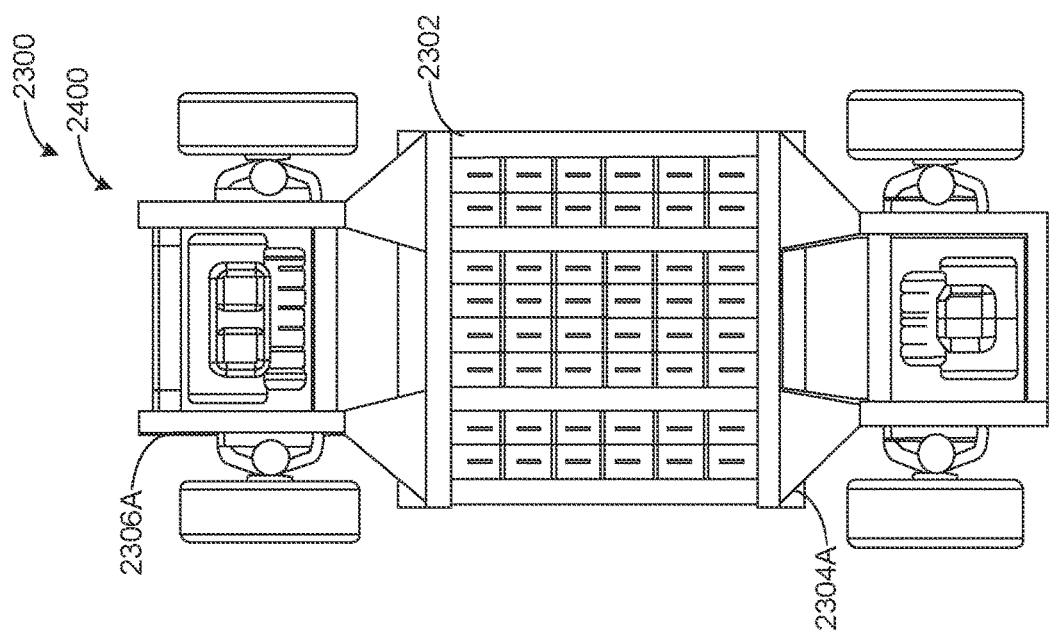
FIG. 24A is a top view of a first configuration of the chassis of FIG. 23 including a first set of the interchangeable chassis portions.

FIG. 24A is a top view of an example first configuration 2400 of the chassis 2300 of FIG. 23 including the relatively smaller interchangeable chassis portions 2304A, 2306A. In the illustrated example of FIG. 24A, the first configuration 2400 includes the battery platform 2302, the first interchangeable front chassis portion 2304A, and the first interchangeable rear chassis portion 2306A. In the illustrated example of FIG. 24A, the chassis 2300 has a comparatively small footprint, which makes the first configuration 2400 suitable for smaller vehicles (e.g., compact vehicles, crossovers, etc.).

FIG. 24B is a top view of an example second configuration 2402 of the chassis 2300 of FIG. 23 including the relatively larger interchangeable chassis portions 2304B, 2306B. In the illustrated example of FIG. 24B, the first configuration 2402 includes the battery platform 2302, the second interchangeable front chassis portion 2304B, and the second interchangeable rear chassis portion 2306B. In the illustrated example of FIG. 24B, the chassis 2300 has a comparatively larger footprint, which makes the first configuration 2402 suitable for larger vehicles (e.g., SUVs, pick-up, etc.). The larger platform of second configuration 2402 enables an additional example first side battery array 2404A and an additional example second side battery array 2404B. In the illustrated examples of FIGS. 24A and 24B, the second configuration 2402 includes additional batteries disposed with the frame sections 2314, 2326 and within the battery arrays 2316, 2328, 2404A, 2404B. That is, comparatively larger configurations (e.g., the second configuration 2402, etc.) of the chassis 2300 enable more batteries to be coupled within the chassis 2300 than comparatively smaller configurations (e.g., the first configuration 2400, etc.).

Figure 25:
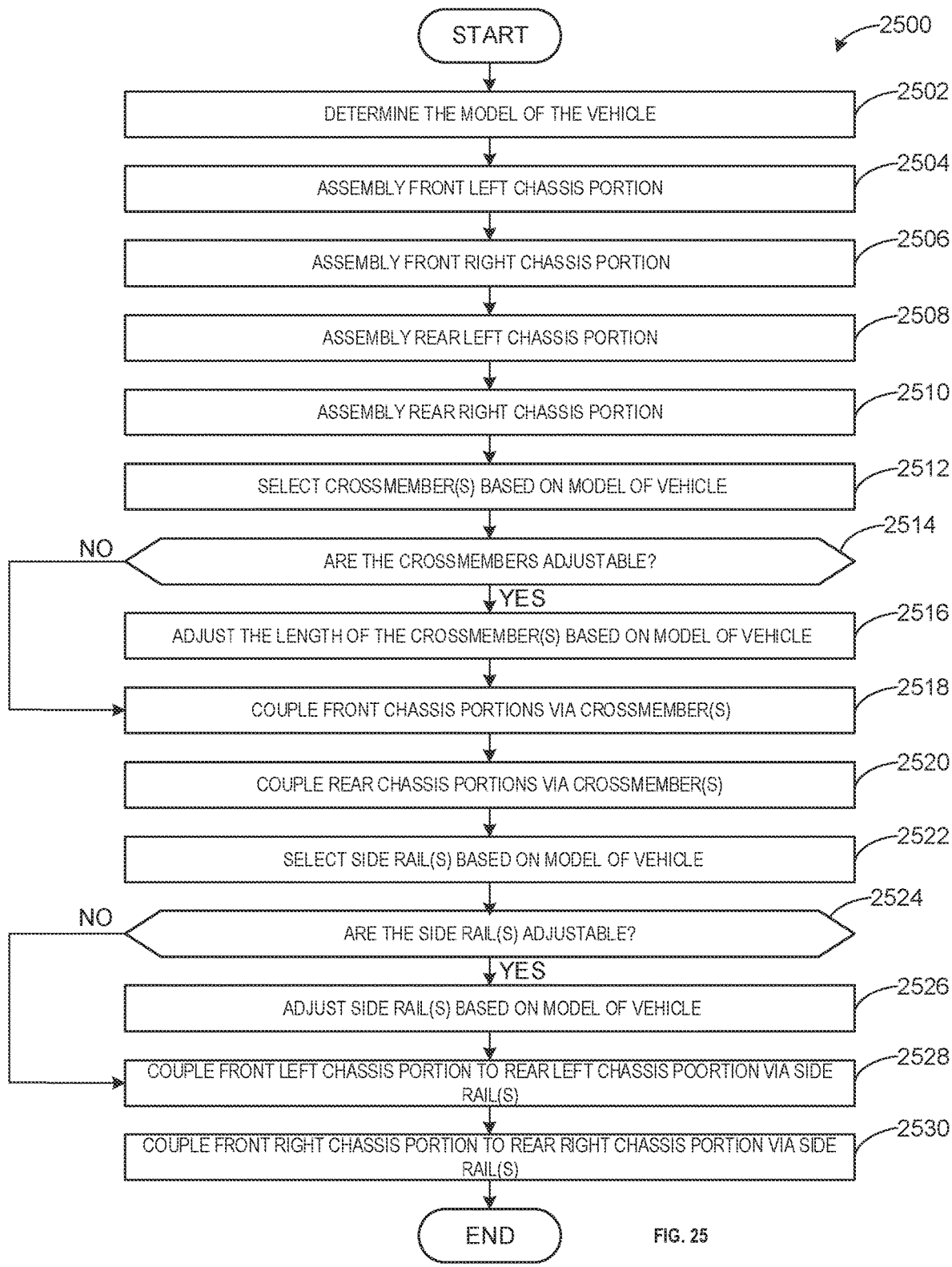
FIG. 25 is a flowchart representative of an example method to assemble the example chassis of FIGS. 19 and 21.

FIG. 25 is a flowchart representative of an example method 2500 to assemble the example chassis 1900, 2100 of FIGS. 19 and 21, respectively. The example method 2500 begins at block 2502, the model of the vehicle associated with the chassis 1900, 2100 is determined. For example, the model of the vehicle can be determined to be a pick-up truck model, a compact car model, an SUV model, a crossover model, a van model, etc. In some examples, the footprint associated with the determined model is determined.

At block 2504, the right front chassis portion 1902 is assembled. For example, the first longitudinal member 1912 (e.g., including the crossmember attachment locators 1916, 1918, etc.) and the first flared portion 1914 are coupled to form the right front chassis portion 1902. In some examples, the first longitudinal member 1912 and the first flared portion 1914 are coupled together via one or more welds. In other examples, the first longitudinal member 1912 and the first flared portion 1914 can be coupled together via any other suitable fastening techniques (e.g., press-fit, a chemical adhesive, etc.). In some examples, the first crossmember attachment locator 1916 and the second crossmember attachment locator 1918 are formed on the first longitudinal member 1912 (e.g., via machining, the fastening on additional parts, etc.). In some examples, the first wheel 1814A and the first suspension assembly 1812A are coupled to the first longitudinal member 1912 and/or the first flared portion 1914. In other examples, the first wheel 1814A and the first suspension assembly 1812A are coupled to the right front chassis portion 1902 after the frame of the chassis 1900, 2100 is assembled.

At block 2506, the left front chassis portion 1904 is assembled. For example, the second longitudinal member 1920 (e.g., including the crossmember attachment locators 1924, 1926, etc.) and the second flared portion 1922 are coupled to form the left front chassis portion 1904. In some examples, the second longitudinal member 1920 and the second flared portion 1922 are coupled together via one or more welds. In other examples, the second longitudinal member 1920 and the second flared portion 1922 can be coupled together via any other suitable fastening techniques (e.g., press-fit, a chemical adhesive, etc.). In some examples, the third crossmember attachment locator 1924 and the fourth crossmember attachment locator 1926 are formed on the second longitudinal member 1920 (e.g., via machining, the fastening on additional parts, etc.). In some examples, the second wheel 1814B and the second suspension assembly 1812B are coupled to the second longitudinal member 1920 and/or the second flared portion 1922. In other examples, the second wheel 1814B and the second suspension assembly 1812B are coupled to the left front chassis portion 1904 after the frame of the chassis 1900, 2100 is assembled.

At block 2508, the right rear chassis portion 1906 is assembled. For example, the third longitudinal member 1928 (e.g., including the crossmember attachment locators 1931, 1932, etc.) and the third flared portion 1930 are coupled to form the right rear chassis portion 1906. In some examples, the third longitudinal member 1928 and the third flared portion 1930 are coupled together via one or more welds. In other examples, the third longitudinal member 1928 and the third flared portion 1930 can be coupled together via any other suitable fastening techniques (e.g., press-fit, a chemical adhesive, etc.). In some examples, the fifth crossmember attachment locator 1931 and the sixth crossmember attachment locator 1932 are formed on the third longitudinal member 1928 (e.g., via machining, the fastening on additional parts, etc.). In some examples, the third wheel 1814C and the third suspension assembly 1812C are coupled to the third longitudinal member 1928 and/or the third flared portion 1930. In other examples, the third wheel 1814C and the third suspension assembly 1812C are coupled to the right rear chassis portion 1906 after the frame of the chassis 1900, 2100 is assembled.

At block 2510, the left rear chassis portion 1908 is assembled. For example, the fourth longitudinal member 1934 (e.g., including the crossmember attachment locators 1938, 1940, etc.) and the fourth flared portion 1936 are coupled to form the left rear chassis portion 1908. In some examples, the fourth longitudinal member 1934 and the fourth flared portion 1936 are coupled together via one or more welds. In other examples, the fourth longitudinal member 1934 and the fourth flared portion 1936 can be coupled together via any other suitable fastening techniques (e.g., press-fit, a chemical adhesive, etc.). In some examples, the seventh crossmember attachment locator 1938 and the eighth crossmember attachment locator 1940 are formed on the fourth longitudinal member 1934 (e.g., via machining, the fastening on additional parts, etc.). In some examples, the fourth wheel 1814D and the fourth suspension assembly 1812D are coupled to the fourth longitudinal member 1934 and/or the fourth flared portion 1936. In other examples, the fourth wheel 1814D and the fourth suspension assembly 1812D are coupled to the left rear chassis portion 1908 after the frame of the chassis 1900, 2100 is assembled.

At block 2512, the appropriate crossmembers are selected based on the chassis 1900, 2100. For example, if the chassis 1900 is being assembled, an appropriately sized crossmember of the interchangeable crossmembers 1942A, 1942B, 1942C, 1942D is selected. For example, if the model of the vehicle is a comparatively larger vehicle, the first interchangeable crossmember 1942A or the second interchangeable crossmember 1942B can be selected. In other examples, if the model of the vehicle is a smaller vehicle, the third interchangeable crossmember 1942C or the fourth interchangeable crossmember 1942D can be selected. If the chassis 2100 is being assembled, the adjustable crossmember(s) 2102 are selected.

At block 2514, it is determined if the crossmembers selected are adjustable. For example, if the adjustable crossmember(s) 2102 is selected, the method 2500 advances to block 2516. If the ones of the interchangeable crossmembers 1942A, 1942B, 1942C, 1942D were selected, the method advances to block 2518.

At block 2516, the length of the adjustable crossmember(s) 2102 is adjusted based on the model of the vehicle. For example, if the adjustable crossmember(s) 2102 are implemented by the adjustable structural member 2200 of FIG. 22A, the position of the outer sleeves 2204A, 2204B relative to the inner rail 2202 can be adjusted such that the adjustable crossmember(s) 2102 has the desired length. In other examples, if the adjustable crossmember(s) 2102 are implemented by the adjustable structural member 2206 of FIG. 22B, the relative position of the inner rails 2208A, 2208B, and outer rails 2210A, 2210B can be adjusted until the adjustable crossmember(s) 2102 has the desired length. Additionally or alternatively, the length of the adjustable crossmember(s) 2102 can be adjusted by any other suitable means.

At block 2518, the front chassis portions 1902, 1904 are coupled together via the selected crossmembers. For example, if the chassis 1900 is being assembled, the selected one(s) of the interchangeable crossmembers 1942A, 1942B, 1942C, 1942D are coupled to the front chassis portions 1902, 1904 via the crossmember attachment locator(s) 1916, 1918, 1924, 1926. For example, if the chassis 2100 is being assembled, the adjustable crossmember(s) 2102 are coupled to the front chassis portions 1902, 1904 via the crossmember attachment locator(s) 1916, 1918, 1924, 1926. In some examples, apertures of the selected crossmembers (e.g., ones of the interchangeable crossmembers 1942A, 1942B, 1942C, 1942D, the adjustable crossmember(s) 2102, etc.) receive corresponding protrusions of the crossmember attachment locator(s) 1916, 1918, 1924, 1926. In such examples, the protrusions of the crossmember attachment locator(s) 1916, 1918, 1924, 1926 frictionally engage the apertures of the selected crossmembers. Additionally or alternatively, the selected crossmembers can be fixedly attached to the front chassis portions 1902, 1904 via one or more fastening techniques (e.g., welds, fasteners, chemical adhesives, etc.).

At block 2520, the rear chassis portions 1906, 1908 are coupled together via the crossmembers 1801C, 1801D. For example, if the chassis 1900 is being assembled, the selected one(s) of the interchangeable crossmembers 1942A, 1942B, 1942C, 1942D are coupled to the rear chassis portions 1906, 1908 via the crossmember attachment locators 1931, 1932, 1938, 1940. For example, if the chassis 2100 is being assembled, the adjustable crossmember(s) 2102 are coupled to the rear chassis portions 1906, 1908 via the crossmember attachment locators 1931, 1932, 1938, 1940. In some examples, apertures of the selected crossmembers (e.g., ones of the interchangeable crossmembers 1942A, 1942B, 1942C, 1942D, the adjustable crossmember(s) 2102, etc.) receive corresponding protrusions of the crossmember attachment locators 1931, 1932, 1938, 1940. In such examples, the protrusions of the crossmember attachment locators 1931, 1932, 1938, 1940 frictionally engage the apertures of the selected crossmembers. Additionally or alternatively, the selected crossmembers can be fixedly attached to the rear chassis portions 1906, 1908 via one or more fastening techniques (e.g., welds, fasteners, chemical adhesives, etc.).

At block 2522, the appropriate side rail(s) are selected based on the chassis 1900, 2100. For example, if the chassis 1900 is being assembled, appropriately sized side rail(s) of the interchangeable side rails 1960A, 1960B, 1960C, 1960D is selected. For example, if the model of the vehicle is a comparatively larger vehicle, the first interchangeable side rail 1960A or the second interchangeable side rail 1960B can be selected. In other examples, if the model of the vehicle is a smaller vehicle, the third interchangeable side rail 1960C or the fourth interchangeable side rail 1960D can be selected. If the chassis 2100 is being assembled, the adjustable side rail(s) 2104 are selected.

At block 2524, it is determined if the side rail(s) selected are adjustable. For example, if the adjustable side rails (s) 2104 is selected, the method 2500 advances to block 2526. If the ones of the interchangeable side rails 1960A, 1960B, 1960C, 1960D are selected, the method advances to block 2530.

At block 2526, the length of the adjustable side rail(s) 2104 is adjusted based on the model of the vehicle. For example, if the adjustable side rail(s) 2104 are implemented by the adjustable structural member 2200 of FIG. 22A, the position of the outer sleeves 2204A, 2204B relative to the inner rail 2202 can be adjusted such that the adjustable side rail(s) 2104 have the desired length. In other examples, if the adjustable side rail(s) 2104 are implemented by the adjustable structural member 2206 of FIG. 22B, the relative position of the inner rails 2208A, 2208B, and outer rails 2210A, 2210B can be adjusted until the adjustable side rail(s) 2104 have the desired length. Additionally or alternatively, the length of the adjustable side rail(s) 2104 can be adjusted by any other suitable means.

At block 2528, the right front chassis portion 1902 is coupled to the right rear chassis portion 1906 via the side rails 1802A, 1802B. For example, if the chassis 1900 is being assembled, the selected one(s) of the interchangeable side rails 1960A, 1960B, 1960C, 1960D are coupled to the right chassis portions 1902, 1906 via the side rail attachment locator(s) 1944, 1946, 1952, 1954. For example, if the chassis 2100 is being assembled, the adjustable side rail(s) 2104 are coupled to the right chassis portions 1902, 1906 via the side rail attachment locator(s) 1944, 1946, 1952, 1954. In some examples, apertures of the selected side rails (e.g., ones of the interchangeable side rails 1960A, 1960B, 1960C, 1960D, the adjustable side rail(s) 2104, etc.) receive corresponding protrusions of the side rail attachment locator(s) 1944, 1946, 1952, 1954. In such examples, the protrusions of the side rail attachment locator(s) 1944, 1946, 1952, 1954 frictionally engage the apertures of the selected side rails. Additionally or alternatively, the selected side rails can be fixedly attached to the right chassis portions 1902, 1906 via one or more fastening techniques (e.g., welds, fasteners, chemical adhesives, etc.).

At block 2530, the left front chassis portion 1904 is coupled to the left rear chassis portion 1908 via the side rails 1802C, 1802D. For example, if the chassis 1900 is being assembled, the selected one(s) of the interchangeable side rails 1960A, 1960B, 1960C, 1960D are coupled to the left chassis portions 1904, 1908 via the side rail attachment locator(s) 1948, 1950, 1956, 1958. For example, if the chassis 2100 is being assembled, the adjustable side rail(s) 2104 are coupled to the left chassis portions 1904, 1908 via the side rail attachment locator(s) 1948, 1950, 1956, 1958. In some examples, apertures of the selected side rails (e.g., ones of the interchangeable side rails 1960A, 1960B, 1960C, 1960D, the adjustable side rail(s) 2104, etc.) receive corresponding protrusions of the side rail attachment locator(s) 1948, 1950, 1956, 1958. In such examples, the protrusions of the side rail attachment locator(s) 1948, 1950, 1956, 1958 frictionally engage the apertures of the selected side rails. Additionally or alternatively, the selected side rails can be fixedly attached to the left chassis portions 1904, 1908 via one or more fastening techniques (e.g., welds, fasteners, chemical adhesives, etc.). The method 2500 ends.

Figure 26:
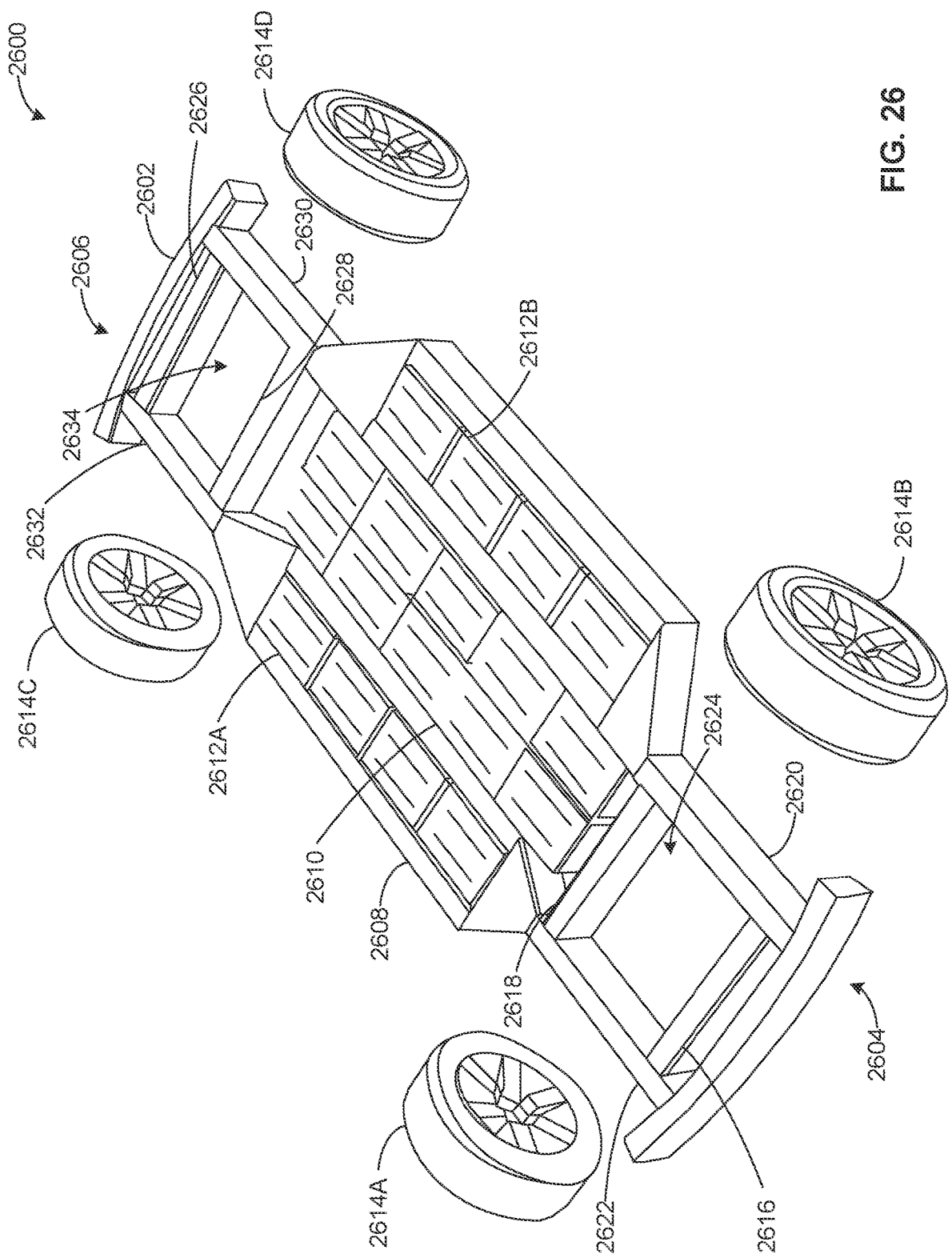
FIG. 26 is a perspective view of an example vehicle chassis in which the teachings of this disclosure can be implemented.

FIG. 26 is a perspective view of an example chassis 2600 in which the teachings of this disclosure can be implemented. The example chassis 2600 includes an example frame 2602. In the illustrated example of FIG. 26, the chassis 2600 includes an example front chassis portion 2404, an example rear chassis portion 2606, and an example battery platform 2608. The example battery platform 2608 includes an example central battery array 2610, an example first side battery array 2612A, and a second side battery array 2612B. The example chassis 2600 includes an example first wheel 2614A, an example second wheel 2614B, an example third wheel 2614C, and an example fourth wheel 2614D. The example front chassis portion 2604 includes an example first crossmember 2616, an example second crossmember 2618, an example first longitudinal member 2620, and an example second longitudinal member 2622, which collectively define an example first cavity 2624. The example rear chassis portion 2606 includes an example third crossmember 2626, an example fourth crossmember 2628, an example third longitudinal member 2630, and an example fourth longitudinal member 2632, which collectively define an example second cavity 2634.

The battery platform 2608 includes the battery arrays 2610, 2612A, 2612B. The batteries of the battery arrays 2610, 2612A, 2612B are EV batteries. The batteries of the battery arrays 2610, 2612A, 2612B provide power to electric motors coupled to the chassis 2600. In other examples, if the chassis 2600 is associated with a hybrid vehicle, the batteries of the battery arrays 2610, 2612A, 2612B supplement the power generated by a combustion engine of the chassis 2600. In some examples, additional batteries are disposed within the chassis 2600 (e.g., in the front chassis portion 2604, in the rear chassis portion 2606, etc.). In such examples, the additional batteries can improve the performance of the vehicle associated with the chassis 2600 (e.g., improved range, greater power available for the engine, etc.). In some examples, the central battery arrays 2610 and/or one or both of the side battery arrays 2612A, 2612 are absent (e.g., in examples with two side rails, etc.).

The wheels 2614A, 2614B, 2614C, 2614D can be coupled to the chassis 2600 after corresponding component(s) (e.g., axles, the suspension assemblies, etc.) of the chassis 2600 are coupled to the frame 2602. In some examples, the type of the wheel 2614A, 2614B, 2614C, 2614D (e.g., tread type, wheel diameter, wheel width, etc.) can be selected based on the type and/or model of the vehicle associated with the chassis 2600. Additionally or alternatively, the type and/or size of the wheels 2614A, 2614B, 2614C, 2614D can be selected based on properties of the chassis 2600 (e.g., the length of the longitudinal members 2620, 2622, 2630, 2632.

The crossmembers 2616, 2618, 2626, 2628 extend generally laterally between the driver and passenger sides of the chassis 2600. The crossmembers 2616, 2618, 2626, 2628 increase the strength of the chassis 2600 and protect vehicle components. In some examples, the crossmembers 2616, 2618, 2626, 2628 include additional features (e.g., bolt holes, weld surfaces, etc.) that enable additional vehicle components to be coupled thereto. In the illustrated example of FIG. 26, the chassis 2600 includes four crossmembers (e.g., the crossmembers 2616, 2618, 2626, 2628, etc.). In other examples, the chassis 2600 includes a different quantity of crossmembers (e.g., two cross members, four cross members, etc.). The crossmembers 2616, 2618, 2626, 2628 can be composed of steel, aluminum, and/or any other suitable material(s). The first longitudinal member 2620 and the second longitudinal member 2622 extend longitudinally between the first crossmember 2616 and second crossmember 2618. The third longitudinal member 2630 and fourth longitudinal members 2632 extend longitudinally between the third crossmember 2626 and fourth crossmember 2628. The longitudinal members 2620, 2622, 2630, 2632 can be composed of steel, aluminum, and/or any other suitable material(s). In some examples, the longitudinal members 2620, 2622, 2630, 2632 can include features that enable suspension components to be coupled thereto.

The cavities 2624, 2634 are areas of the chassis 2600 in which powertrain components, drivetrain components, and/or suspension components can be coupled. In the illustrated example of FIG. 26, the first cavity 2624 is defined by the first crossmember 2616, the second crossmember 2618, the first longitudinal member 2620, and the second longitudinal member 2622. In the illustrated example of FIG. 26, the second cavity 2634 is defined the third crossmember 2626, the fourth crossmember 2628, the third longitudinal member 2630, and the fourth longitudinal member 2632. In some examples, the crossmembers 2616, 2618, 2626, 2628 and/or the longitudinal members 2620, 2622, 2630, 2632 can include features (e.g., weld surfaces, apertures, brackets, brushings, etc.) that enable powertrain components, drivetrain components, and/or suspension components to be coupled with the corresponding one of the cavities 2624, 2634. In the illustrated example of FIG. 26, the cavities 2624, 2634 are of substantially the same size. In other examples, the first cavities 2624 and the second cavity 2634 have different sizes. The coupling of components of the interchangeable performance packages 2700, 2714, 2728 within the first cavity 2624 and/or the second cavity 2634 is described in greater detail below in conjunction with FIG. 28.

Figure 27A:
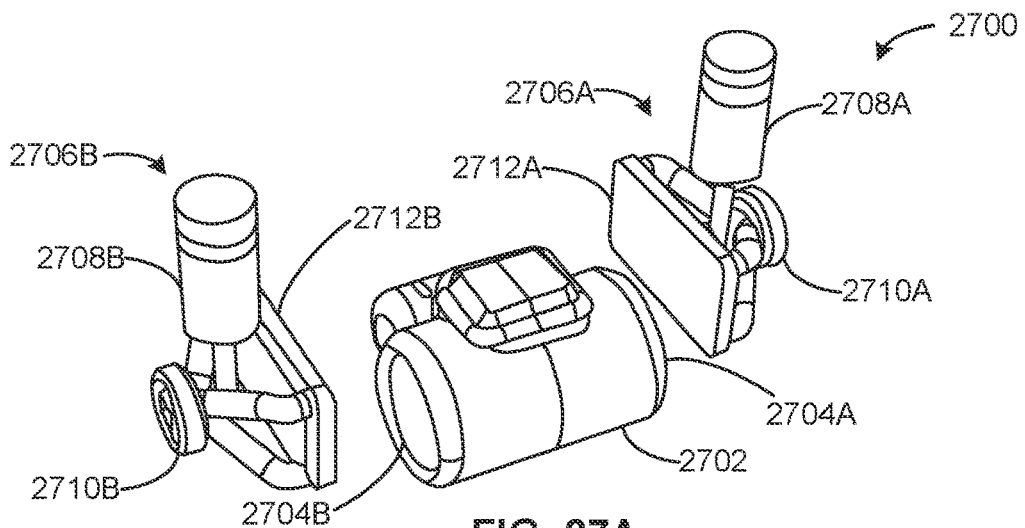
FIGS. 27A-27C are perspective views of interchangeable performance packages.

FIG. 27A is a perspective view of an example first interchangeable performance package 2700. In the illustrated example of FIG. 27A, the first interchangeable performance package 2700 includes an example first electric motor 2702 that includes an example first motor mounting feature 2704A and an example second motor mounting feature 2704B. In the illustrated example of FIG. 27A, the first interchangeable performance package 2700 includes an example first suspension assembly 2706A and an example second suspension assembly 2706B. In the illustrated example of FIG. 27A, the suspension assemblies 2706A, 2706B include an example first elastic member 2708A and an example second elastic member 2708B, respectively. In the illustrated example of FIG. 27A, the suspension assemblies 2706A, 2706B include an example first wheel mounting feature 2710A and an example second wheel mounting feature 2710B, respectively. In the illustrated example of FIG. 27A, the suspension assemblies 2706A, 2706B include an example first frame mounting feature 2712A and an example second frame mounting feature 2712B, respectively.

Figure 27B:
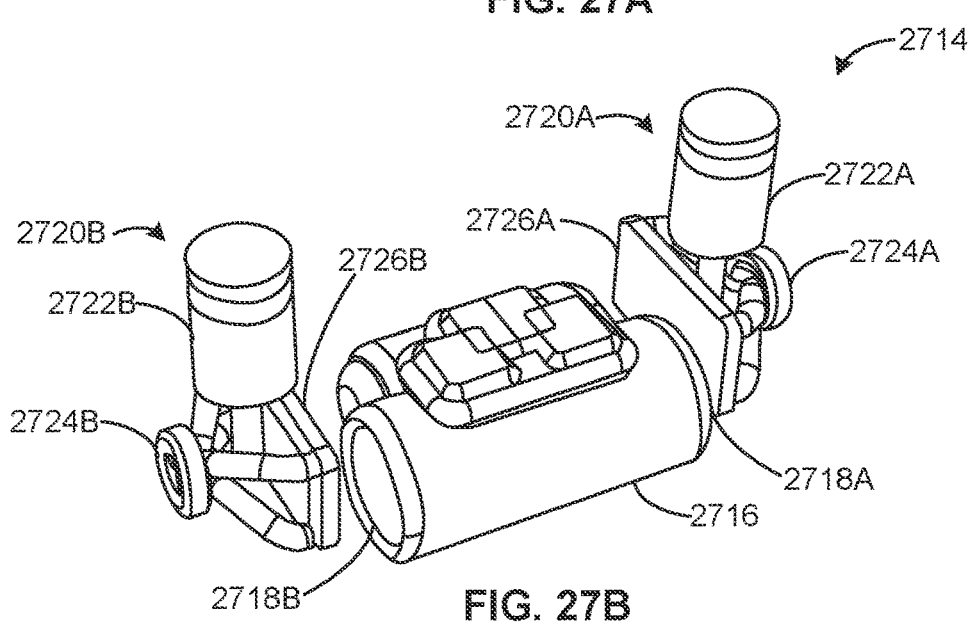

FIG. 27B is a perspective view of an example second interchangeable performance package 2714. In the illustrated example of FIG. 27B, the second interchangeable performance package 2714 includes an example second electric motor 2716 that includes an example third motor mounting feature 2718A and an example fourth motor mounting feature 2718B. In the illustrated example of FIG. 27B, the second interchangeable performance package 2714 includes an example third suspension assembly 2720A and an example fourth suspension assembly 2720B. In the illustrated example of FIG. 27B, the suspension assemblies 2720A, 2720B include an example third elastic member 2722A and an example fourth elastic member 2722B, respectively. In the illustrated example of FIG. 27B, the suspension assemblies 2720A, 2720B include an example third wheel mounting feature 2724A and an example fourth wheel mounting feature 2724B, respectively. In the illustrated example of FIG. 27B, the suspension assemblies 2720A, 2720B include an example third frame mounting feature 2726A and an example fourth frame mounting feature 2726B, respectively.

Figure 27C:
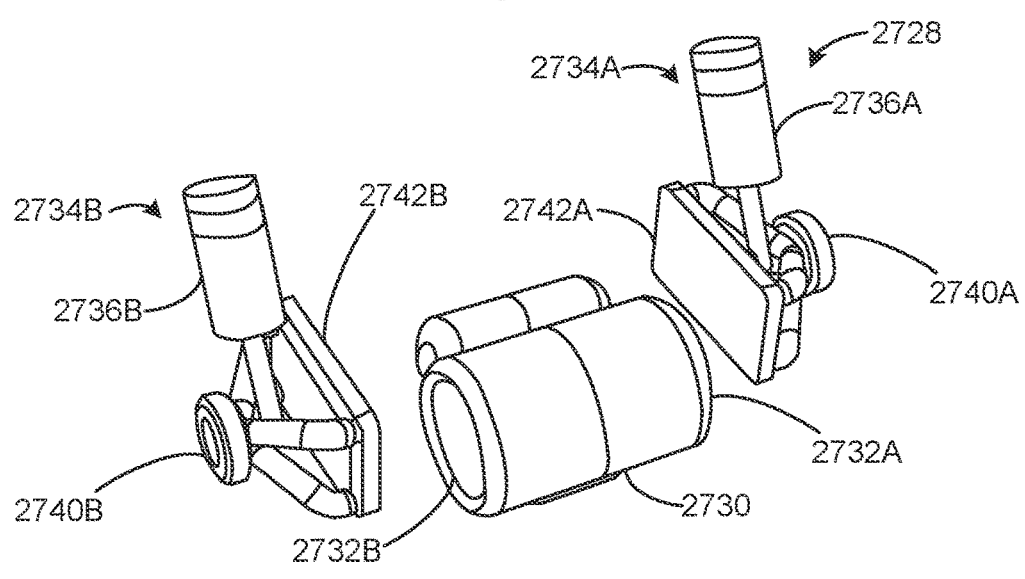

FIG. 27C is a perspective view of an example third interchangeable performance package 2728. In the illustrated example of FIG. 27C, the third interchangeable performance package 2728 includes an example third electric motor 2730 that includes an example fifth motor mounting feature 2732A and an example sixth motor mounting feature 2732B. In the illustrated example of FIG. 27C, the third interchangeable performance package 2728 includes an example fifth suspension assembly 2734A and an example sixth suspension assembly 2734B. In the illustrated example of FIG. 27C, the suspension assemblies 2734A, 2734B include an example fifth elastic member 2736A and an example sixth elastic member 2736B, respectively. In the illustrated example of FIG. 27C, the suspension assemblies 2734A, 2734B include an example fifth wheel mounting feature 2740A and an example sixth wheel mounting feature 2740B, respectively. In the illustrated example of FIG. 27C, the suspension assemblies 2734A, 2734B include an example second frame mounting feature 2742A and an example sixth frame mounting feature 2742B, respectively.

The first interchangeable performance package 2700 includes features that make the first interchangeable performance package 2700 suitable for a passenger vehicle. In the illustrated example of FIG. 27A, the electric motor 2700 has performance characteristics that make the electric motor 2702 suitable for use on streets and/or highways. Similarly, the suspension assemblies 2706A, 2706B have characteristics that make them more suitable for consumer comfort (e.g., comparatively less stiff elastic members, progressive spring rates, neutral camber, neutral caster, etc.).

The second interchangeable performance package 2714 includes features that make the second interchangeable performance package 2714 suitable for heavier consumer and/or commercial vehicles. In the illustrated example of FIG. 27B, the electric motor 2716 has performance characteristics that make the electric motor 2716 suitable for use on rough terrain and/or hauling larger loads (e.g., comparatively high torque, comparative high horsepower, etc.). Similarly, the suspension assemblies 2720A, 2720B have characteristics that make them more suitable for use with comparatively higher loads and/or use on uneven terrain (e.g., comparatively less stiff elastic members, greater travel, greater load capacity, progressive spring rates, positive camber, neutral caster, etc.).

The third interchangeable performance package 2728 includes features that make the performance package 2710 suitable for a sports vehicle. In the illustrated example of FIG. 27C, the electric motor 2716 has performance characteristics that make the electric motor 2716 suitable for use on a smooth uniform surface (e.g., comparatively high horsepower, comparatively high torque, etc.). Similarly, the suspension assemblies 2720A, 2720B have characteristics that make them more suitable for use with a comparatively light vehicle on a smooth surface (e.g., comparatively more stiff elastic members, low travel, linear spring rates, negative camber, positive caster, etc.).

The electric motors 2702, 2716, 2730 are powertrain components that transform electric power from batteries into mechanical energy and can be used to drive the wheels of a vehicle (e.g., the wheels 2614A, 2614B, 2614C, 2614C, etc.). As described above, the electric motors 2702, 2716, 2730 have different performance characteristics. That is, the electric motor 2702 has lower torque and horsepower than the electric motors 2716, 2730. The electric motor 2716 has higher torque than the electric motors 2702, 2730 and similar horsepower to the electric motor 2730. The electric motor 2730 has higher horsepower than the electric motor 2702 and similar horsepower to the electric motor 2730.

The elastic members 2708A, 2708B, 2722A, 2722B, 2736A, 2736B include at least one spring and/or damper to deflect in response to a load (e.g., increased, decreased load on the vehicle, from uneven terrain, etc.) being applied to the corresponding one(s) of the suspension assemblies 2706A, 2706B, 2720A, 2720B, 2734A, 2734B. In some examples, the elastic members 2708B, 2722A, 2722B, 2736A, 2736B can include hydraulic and/or electromagnetic dampers. As described above, the corresponding sets of elastic members 2708A, 2708B, 2722A, 2722B, 2736A, 2736B of the suspension assemblies 2706A, 2706B, 2720A, 2720B, 2734A, 2734B have different stiffnesses, damping properties, and load capacities. That is, the elastic members 2708A, 2708B are generally configured for passenger vehicles (e.g., comparatively less stiff, etc.). The elastic members 2722A, 2722B are generally configured for commercial vehicles (e.g., comparatively less stiffness, comparatively higher damping, comparatively higher travel, comparatively higher capacity, etc.). The elastic members 2736A, 2736B are generally configured for performance vehicles (e.g., comparatively greater stiffness, comparatively lower travel, comparatively lower capacity, etc.). Additionally or alternatively, the elastic members (e.g., the elastic members 2736A, 2736B, etc.) associated with the higher performance packages (e.g., the third interchangeable performance package 2728, etc.) can include linear spring rates and the elastic members associated with passenger and/or commercial vehicles (e.g., the elastic members 2708A, 2708B, 2722A, 2722B, etc.) can include progressive spring rates. The suspension assemblies 2706A, 2706B, 2720A, 2720B, 2734A, 2734B are additionally configured to receive corresponding wheels at different caster angles and camber angles. That is, in the illustrated examples of FIGS. 27A-27C, the suspension assemblies 706A, 2706B, 2720A, 2720B are configured to receive wheels at a positive cambers and neutral camber and the suspension assemblies 2734A, 2734B are configured to receive wheels at a negative camber and a positive caster.

While only the three interchangeable performance packages 2700, 2714, 2728 are described in conjunction with FIGS. 27A-27C, other performance package configurations are possible. For example, another example performance package for lighter off-road vehicles includes a comparatively powerful electric motor (e.g., second electric motor 2716 and/or the third electric motor 2730, etc.) and comparatively less stiff suspension assemblies (e.g., the suspension assemblies 2706A, 2706B). In other examples, other performance packages can include any suitable combination of components.

Figure 28:
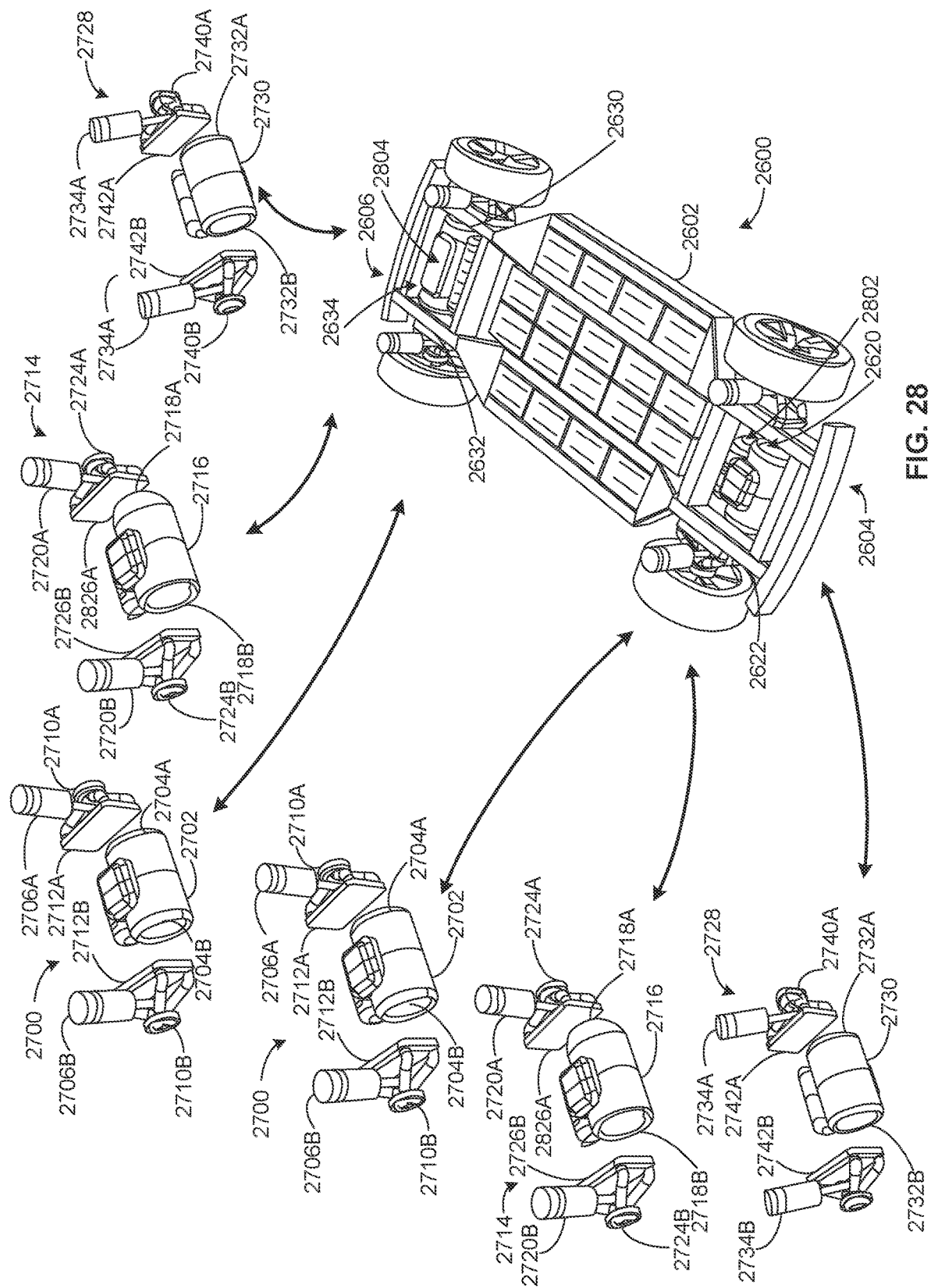
FIG. 28 is a perspective view of the example vehicle chassis of FIG. 26 and the interchangeable performance packages of FIG. 27A-27C.

FIG. 28 is a perspective view of the example chassis 2600 of FIG. 26 and the interchangeable performance packages 2700, 2714, 2728 of FIG. 27A-27C. In the illustrated example of FIG. 28, an example first performance package 2802 is coupled to the front chassis portion 2604, and an example second performance package 2804 is coupled to the rear chassis portion 2606. In the illustrated example of FIG. 28, the first performance package 2802 and the second performance package 2804 can be implemented by the first performance package 2700, the second interchangeable performance package 2714, and/or the third interchangeable performance package 2728.

The corresponding motor mounting features of the interchangeable performance packages 2700, 2714, 2728 (e.g., the motor mounting features 2704A, 2704B of the first performance package 2700, the motor mounting features 2718A, 2718B of the second interchangeable performance package 2714, the motor mounting features 2732A, 2732B of the third interchangeable performance package 2728, etc.) can be coupled to the inboard surfaces of the corresponding ones of the longitudinal members 2620, 2622, 2630, 2632 via one or more of fastening techniques(s), thereby coupling the corresponding electric motors 2702, 2716, 2730 within the corresponding ones of the cavities 2624, 2634. For example, the corresponding mounting features 2704A, 2704B, 2718A, 2718B, 2732A, 2732B can be implemented by one or more bushings that receive corresponding inboard protrusions extending from the longitudinal members 2620, 2622, 2630, 2632, which damp vibration generated by the corresponding electric motors 2702, 2716, 2730. In other examples, the corresponding motor mounting features 2704A, 2704B, 2718A, 2718B, 2732A, 2732B can be implemented by outboard extending features to be received by bushings associated with the longitudinal members 2620, 2622, 2630, 2632, which damp vibration generated by the corresponding electric motors 2702, 2716, 2730. Additionally or alternatively, the motor mounting features 2704A, 2704B, 2718A, 2718B, 2732A, 2732B of the electric motors 2702, 2716, 2730 can be coupled to the corresponding longitudinal members 2620, 2622, 2630, 2632 via any fastening technique (e.g., a fastener, a weld, a chemical adhesive, a press-fit, etc.) or combination thereof.

The corresponding suspension assemblies of the interchangeable performance packages 2700, 2714, 2728 (e.g., the suspension assemblies 2706A, 2706B of the first interchangeable performance package 2700, the suspension assemblies 2720A, 2720B of the second interchangeable performance package 2714, the suspension assemblies 2734A, 2734B of the third interchangeable performance package 2728, etc.) can be coupled to the corresponding outboard surfaces of the longitudinal members 2620, 2622, 2630, 2632 via fastening techniques(s) (e.g., a fastener, a weld, a chemical adhesive, a press-fit, etc.) and via the respective ones of the frame mounting features 2712A, 2712B, 2726A, 2726B, 2742A, 2742B, etc.

The wheels 2614A, 2614B, 2614C, 2614D can be coupled to the corresponding ones of the wheel mounting features of the interchangeable performance packages 2714, 2728 (e.g., the wheel mounting features 2710A, 2710B of the first performance package 2700, the wheel mounting features 2724A, 2724B of the second interchangeable performance package 2714, the wheel mounting features 2740A, 2740B of the third interchangeable performance package 2728, etc.). In some examples, the wheel mounting features 2710A, 2710B, 2724A, 2724B, 2740A, 2740B can be implemented by a wheel hub, which includes protrusions to be received by corresponding apertures of the wheels 2614A, 2614B, 2614C, 2614D. In other examples, the wheel mounting features 2710A, 2710B, 2724A, 2724B, 2740A, 2740B can be implemented by any other suitable means.

Each of the interchangeable performance packages 2700, 2714, 2728 are couplable to the chassis 2600. As such, the chassis 2600 supports various performance configurations with only the changing of the performance packages 2802, 2804 to be different ones of the interchangeable performance packages 2700, 2714, 2728. Accordingly, the chassis 2600 can be easily configured to support different vehicle models and/or types, which increases the ease of manufacturing and assembly by reducing the total number of unique parts used between vehicles. When combined with the other teachings of this disclosure (e.g., the scalable chassis 1900 of FIG. 19, the scalable chassis 2300 of FIG. 23, etc.), disparate vehicle types (e.g., pick-up trucks and compacts, etc.) can be implemented to share chassis with similar designs and a comparatively large number of common parts. In the illustrated example of FIG. 28, the performance packages 2802, 2804 are implemented by a same one of the interchangeable performance packages 2700, 2714, 2728. In other examples, the first performance package 2802 can be implemented by a different one of the second performance package 2804 (e.g., the first performance package 2802 implemented by the first interchangeable performance package 2700 and the second performance package 2804 implemented by the second interchangeable performance 2714, etc.).

FIG. 29 is a flowchart representative of an example method 2900 to assemble the example chassis of FIGS. 26 and 28 with one of the interchangeable performance packages of FIGS. 27A-27C. At block 2902, the model of the vehicle associated with the chassis 2600 is determined. For example, the model of the vehicle can be determined to be a pick-up truck model, a compact model, an SUV model, a crossover model, a van model, etc. In some examples, the desired performance characteristics (e.g., engine torque, engine power, suspension characteristics is determined).

At block 2904, one of the interchangeable performance packages 2700, 2714, 2718 is selected based on the determined model of the vehicle. For example, if the model of the vehicle is a passenger model, the first interchangeable performance package 2700 is selected. If the model of the vehicle is a hauling model, the second interchangeable performance package 2714 is selected. If the model of the vehicle is a performance model, the third interchangeable performance package 2728 is selected. In other examples, other suitable performance packages can be selected based on the model. In some examples, multiple performance packages can be selected. In such examples, the selected performance packages can be coupled to different portions of the chassis 2600 (e.g., the first interchangeable performance package 2700 may be coupled within the first cavity 2624, the second performance package coupled within the second cavity 2634, etc.).

At block 2906, the electric motor(s) of the selected performance package is coupled within the chassis cavity. For example, instances of the corresponding electric motor of the selected performance package (e.g., the first electric motor 2702 of the first interchangeable performance package 2700, the second electric motor 2716 of the second interchangeable performance package 2714, the third electric motor 2730 of the third performance package, etc.) can be coupled within the first cavity 2624 of the chassis 2600 and the second cavity 2634 via the corresponding motor mounting features (e.g., the first motor mounting feature 2704A and the second motor mounting feature 2704B of the first interchangeable performance package 2700, the third motor mounting feature 2718A and the fourth motor mounting feature 2718B of the second interchangeable performance package 2714, the fifth motor mounting feature 2732A and the sixth motor mounting feature 2732B of the third interchangeable performance package 2728, etc.). In some examples, the corresponding motor mounting features 2704A, 2704B, 2718A, 2718B, 2732A, 2732B can be coupled to inboard surfaces of cavities 2624, 2634 via bushing connections. In other examples, the corresponding motor mounting features 2704A, 2704B, 2718A, 2718B, 2732A, 2732B can be coupled to inboard surfaces of the cavities 2624, 2634 via any other suitable fastening technique (e.g., a press-fit, a weld, a chemical adhesive, a fastener, etc.).

At block 2908, the suspension assemblies of the selected performance packages are coupled to chassis 2600 via the corresponding frame mounting features. For example, instances of the corresponding suspension assemblies of the selected performance package (e.g., the first suspension assembly 2706A and the second suspension assembly of the first interchangeable performance package 2700, the third suspension assembly 2720A and the fourth suspension assembly 2720B of the second interchangeable performance package 2714, the fifth suspension assembly 2734A and the sixth suspension assembly 2734B of the third interchangeable performance package 2728, etc.) can be coupled to the chassis 2600 via the corresponding frame mounting features (e.g., the first frame mounting feature 2712A and the second frame mounting feature 2712B of the first interchangeable performance package 2700, the third frame mounting feature 2726A and the fourth frame mounting feature 2726B of the second interchangeable performance package 2714, the fifth frame mounting feature 2742A and the sixth frame mounting feature 2742B of the third interchangeable performance package 2728, etc.). In some examples, the corresponding frame mounting features 2712A, 2712B, 2726A, 2726B, 2742A, 2742B can be coupled to outboard surfaces of corresponding ones of the longitudinal members 2620, 2622, 2630, 2632 via any other suitable fastening technique (e.g., a press-fit, a weld, a chemical adhesive, a fastener, etc.).

At block 2910, the wheels 2614A, 2614B, 2614C, 2614D are coupled to the suspension assemblies. For example, the wheels 2614A, 2614B, 2614C, 2614D can be coupled to the corresponding wheel mounting features (e.g., the first wheel mounting feature 2710A and the second wheel mounting feature 2710B of the first interchangeable performance package 2700, the third wheel mounting feature 2724A and the fourth wheel mounting feature 2724B of the second interchangeable performance package 2714, the fifth wheel mounting feature 2740A and the sixth wheel mounting feature 2740B of the third interchangeable performance package 2728, etc.). In some examples, the corresponding wheel mounting features 2710A, 2710B, 2724A, 2724B, 2740A, 2740B can be implemented via wheel hub, which can receive corresponding apertures of the wheels 2614A, 2614B, 2614C, 2614D. In other examples, the wheels 2614A, 2614B, 2614C, 2614D can be coupled to the corresponding suspension assemblies 2706A, 2706B, 2720A, 2720B, 2734A, 2734B via any other suitable fastening technique. The method 2900 ends.

FIGS. 30A-35 depict alternative vehicle chassis that may be used to implement the teachings of this disclosure that are similar to those described with reference FIGS. 30A-35. When the same reference number is used in connection with FIGS. 30A-35 as used in FIGS. 26-29, it has the same meaning unless indicated otherwise.

Figure 30A:
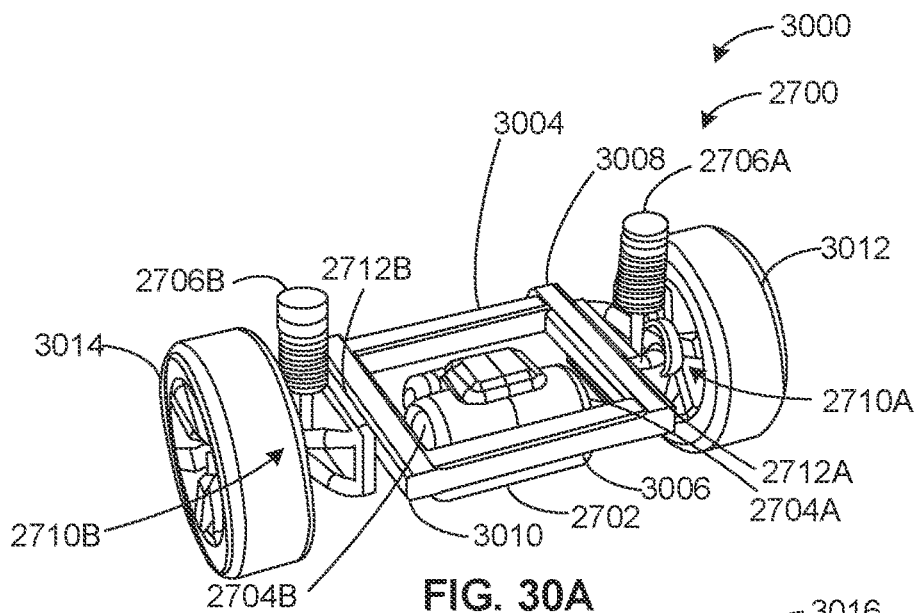
FIGS. 30A-30C are perspective views of interchangeable subframes with the interchangeable performance packages of FIGS. 27A-27C.

FIG. 30A is a perspective view of an example interchangeable first subframe 3000 including the first interchangeable performance package 2700 of FIG. 27A. In the illustrated example of FIG. 30A, the first interchangeable subframe 3000 includes an example first crossmember 3004, an example second crossmember 3006, an example first side rail 3008, and an example second side rail 3010. In the illustrated example of FIG. 30, the first interchangeable performance package 2700 is coupled to the first crossmember 3004, the second crossmember 3006, the first side rail 3008, and the second side rail 3010. For example, the first electric motor 2702 is coupled to an inboard surface of the first side rail 3008 and the second side rail 3010 via the first motor mounting feature 2704A and the second motor mounting feature 2704B, respectively. The example suspension assembly 2706A is coupled to an example first wheel 3012 via the example first wheel mounting feature 2710A and is coupled to an outboard surface of the side rail 3008 via the example first frame mounting feature 2712A. The example suspension assembly 2706B is coupled to an example second wheel 3014 via the example second wheel mounting feature 2710B and is coupled to an outboard surface of the side rail 3008 via the example second frame mounting feature 2712B.

Figure 30B:
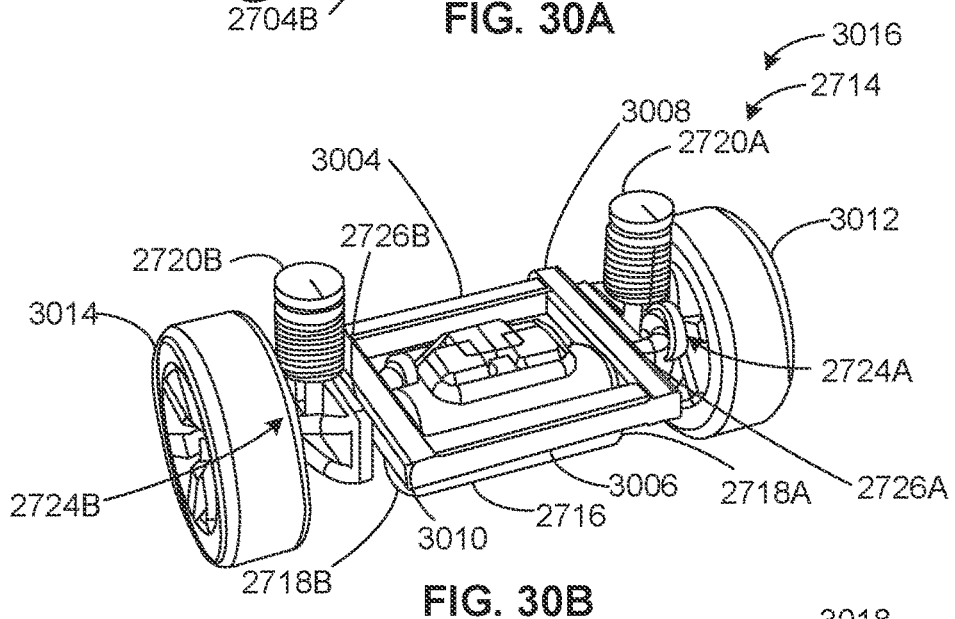

FIG. 30B is a perspective view of an example second interchangeable subframe 3016 including the second interchangeable performance package 2714 of FIG. 27B. The example second interchangeable subframe 3016 includes the example first crossmember 3004 of FIG. 30A, the example second crossmember 3006 of FIG. 30A, the example first side rail 3008 of FIG. 30A, and the example second side rail 3010 of FIG. 30A. In the illustrated example of FIG. 30B, the second interchangeable performance package 2714 is coupled to the first crossmember 3004, the second crossmember 3006, the first side rail 3008, and the second side rail 3010. For example, the second electric motor 2716 is coupled to an inboard surface of the first side rail 3008 and the second side rail 3010 via the third motor mounting feature 2718A and the fourth motor mounting feature 2718B, respectively. The example third suspension assembly 2720A is coupled to the first wheel 3012 of FIG. 30A via the example third wheel mounting feature 2724A and is coupled to an outboard surface of the side rail 3008 via the example third frame mounting feature 2726A. The example fourth suspension assembly 2720B is coupled to the second wheel 3014 of FIG. 30B via the example fourth wheel mounting feature 2724B and is coupled to an outboard surface of the side rail 3008 via the example fourth frame mounting feature 2726B.

Figure 30C:
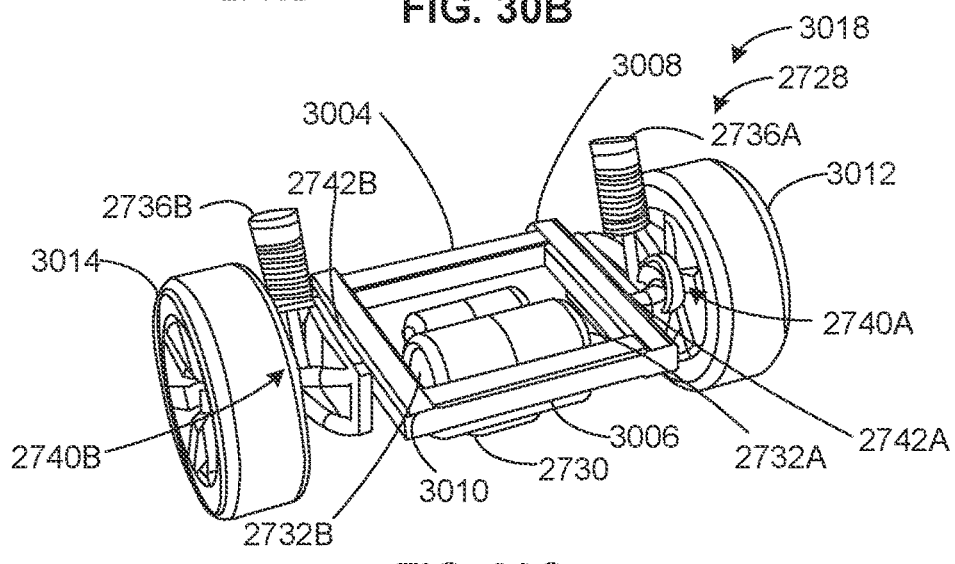

FIG. 30C is a perspective view of an example third interchangeable subframe 3018 including the third interchangeable performance package 2728 of FIG. 27C. The example third interchangeable subframe 3018 includes the example first crossmember 3004 of FIG. 30A, the example second crossmember 3006 of FIG. 30A, the example first side rail 3008 of FIG. 30A, and the example second side rail 3010 of FIG. 30A. In the illustrated example of FIG. 30C, the third interchangeable performance package 2728 is coupled to the first crossmember 3004, the second crossmember 3006, the first side rail 3008, and the second side rail 3010. For example, the third electric motor 2730 is coupled to an inboard surface of the first side rail 3008 and the second side rail 3010 via the fifth motor mounting feature 2732A and the sixth motor mounting feature 2732B, respectively. The example suspension assembly 2734A is coupled to the first wheel 3012 of FIG. 30A via the example fifth wheel mounting feature 2740A and is coupled to an outboard surface of the side rail 3008 via the example frame mounting feature 2742A. The example suspension assembly 2734B is coupled to the second wheel 3014 of FIG. 30B via the example sixth wheel mounting feature 2740B and is coupled to an outboard surface of the side rail 3008 via the example sixth frame mounting feature 2742B.

In the illustrated example of FIGS. 30A-30C, the interchangeable performance packages 2700, 2714, 2728 of FIGS. 27A-27C are components of corresponding interchangeable subframes 3000, 3016, 3018. The interchangeable subframes 3000, 3016, 3018 include common structural members (e.g., the first crossmember 3004, the second crossmember 3006, the first side rail 3008, the second side rail 3010, etc.).

The motor mounting features 2704A, 2704B, 2718A, 2718B, 2732A, 2732B of the corresponding interchangeable performance packages 2700, 2714, 2728 are coupled to internal faces of the side rails 3008, 3010 of the corresponding interchangeable subframes 3000, 3016, 3018. In some examples, the corresponding motor mounting features 2704A, 2704B, 2718A, 2718B, 2732A, 2732B can be implemented by bushings which receive corresponding inboard protrusions extending from the side rails 3008, 3010, which damp vibration generated by the respectively electric motors 2702, 2716, 2730. In other examples, the corresponding motor mounting features 2704A, 2704B, 2718A, 2718B, 2732A, 2732B can be implemented by outboard extending features to be received by bushings associated with the crossmembers 3004, 3006 and/or side rails 3008, 3010 which damp vibration generated by the electric motors 2702, 2716, 2730. In other examples, the corresponding motor mounting features 2704A, 2704B, 2718A, 2718B, 2732A, 2732B can be coupled to the corresponding side rails 3008, 3010 via any fastening technique (e.g., a fastener, a weld, a chemical adhesive, a press-fit, etc.) or combination thereof.

In the illustrated example of FIG. 30A-30C, the suspension assemblies 2706A, 2706B, 2720A, 2720B, 2734A, 2734B are coupled to outboard surfaces of the side rails 3008, 3010 via corresponding ones of the frame mounting features 2712A, 2712B, 2726A, 2726B, 2742A, 2742B. The corresponding frame mounting features 2712A, 2712B, 2726A, 2726B, 2742A, 2742B can be coupled to the corresponding side rails 3008, 3010 via any fastening technique (e.g., a fastener, a weld, a chemical adhesive, a press-fit, etc.) or combination thereof. In the illustrated example of FIG. 30A-30C, the suspension assemblies 2706A, 2706B, 2720A, 2720B, 2734A, 2734B are coupled to the wheels 3012, 3014 via corresponding ones of the wheel mounting features 2710A, 2710B, 2724A, 2724B, 2740A, 2740B. The corresponding wheel mounting features 2710A, 2710B, 2724A, 2724B, 2740A, 2740B can be implemented by a wheel hub, which includes protrusions to be received by corresponding apertures of the wheels 3012, 3014. In other examples, the wheel mounting features 2710A, 2710B, 2724A, 2724B, 2740A, 2740B can be implemented by any other suitable means.

Figure 31:
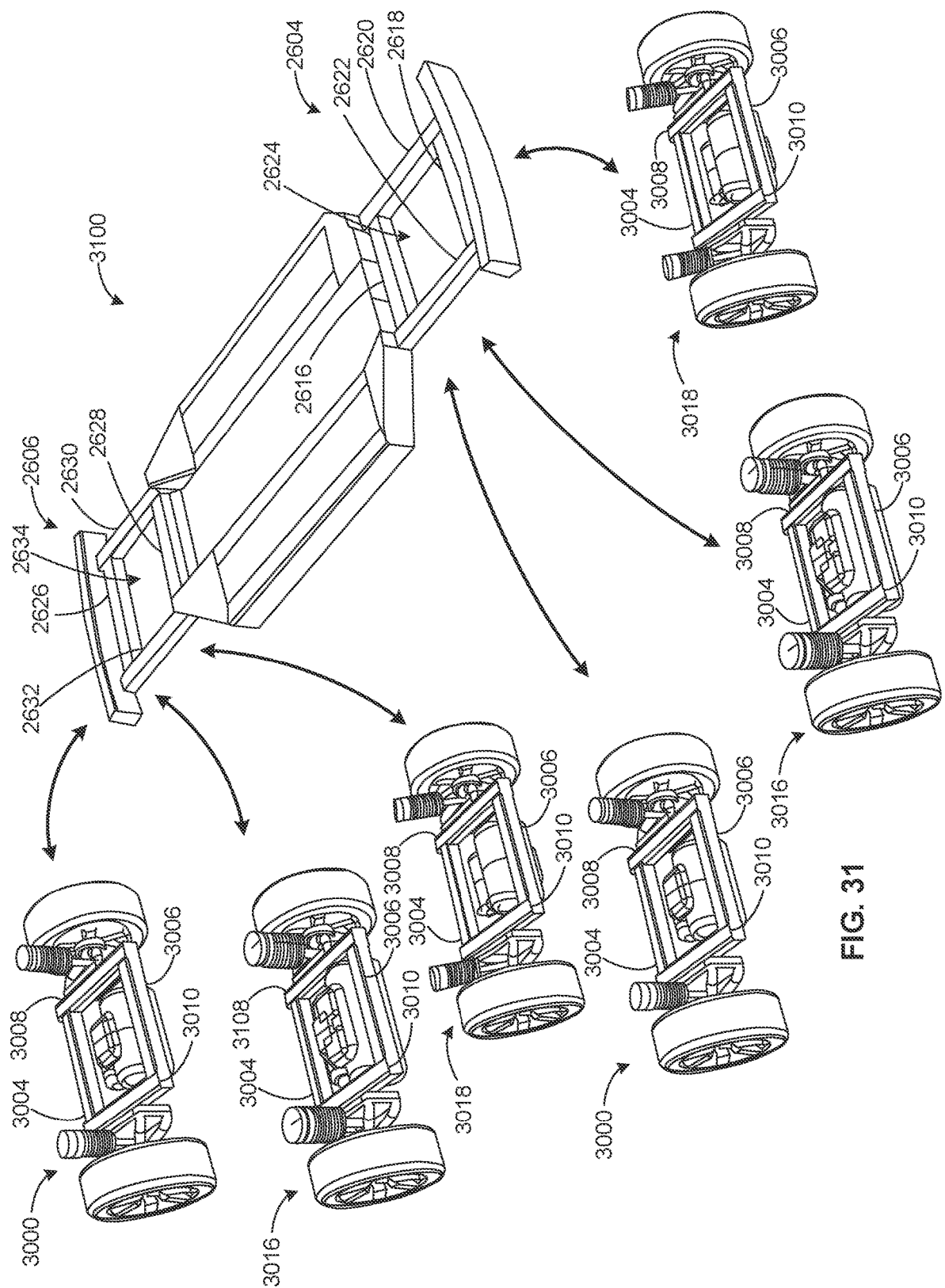
FIG. 31 is a perspective view of the example vehicle chassis of FIG. 26 and the interchangeable subframes of FIG. 30A-30C.

FIG. 31 is a perspective view of an example vehicle chassis 3100 including features to receive the interchangeable subframes 3000, 3016, 3018 of FIG. 30A-30C. The interchangeable subframes 3000, 3016, 3018 are couplable within the first cavity 2624 of the front chassis portion 2604. For example, the first crossmember 3004, the second crossmember 3006, the first side rail 3008, and the second side rail 3010 of one of the interchangeable subframes 3000, 3016, 3018 can be coupled to a corresponding structural member of the chassis 3100. For example, the first crossmember 3004 of one of the interchangeable subframes 3000, 3016, 3018 can be coupled to the crossmember 2616 of the chassis 3100 via one or more fastening techniques (e.g., a fastener, a weld, a chemical adhesive, a press-fit, etc.) or combination thereof. In some examples, the second crossmember 3006 of one of the interchangeable subframes 3000, 3016, 3018 can be coupled the second crossmember 2618 of the chassis 3100 via one or more fastening techniques (e.g., a fastener, a weld, a chemical adhesive, a press-fit, etc.) or combination thereof. In some examples, the first side rail 3008 of one of the interchangeable subframes 3000, 3016, 3018 can be coupled the first longitudinal member 2620 of the chassis 3100 via one or more fastening techniques (e.g., a fastener, a weld, a chemical adhesive, a press-fit, etc.) or combination thereof. In some examples, the second side rail 3010 of one of the interchangeable subframes 3000, 3016, 3018 can be coupled the second longitudinal member 2622 of the chassis 3100 via one or more fastening techniques (e.g., a fastener, a weld, a chemical adhesive, a press-fit, etc.) or combination thereof. Additionally or alternatively, one of the interchangeable subframes 3000, 3016, 3018 can be coupled to the front chassis portion 2604 via one or more bushings and/or brackets.

The interchangeable subframes 3000, 3016, 3018 are couplable within the second cavity 2634 of the rear chassis portion 2606. For example, the common the first crossmember 3004, the second crossmember 3006, the first side rail 3008, and the second side rail 3010 of one of the interchangeable subframes 3000, 3016, 3018 can be coupled to a corresponding structural member of the chassis 3100. For example, the first crossmember 3004 of one of the interchangeable subframes 3000, 3016, 3018 can be coupled to the third crossmember 2626 of the chassis 3100 via one or more fastening techniques (e.g., a fastener, a weld, a chemical adhesive, a press-fit, etc.) or combination thereof. In some examples, the second crossmember 3006 of one of the interchangeable subframes 3000, 3016, 3018 can be coupled the fourth crossmember 2628 of the chassis 3100 via one or more fastening techniques (e.g., a fastener, a weld, a chemical adhesive, a press-fit, etc.) or combination thereof. In some examples, the first side rail 3008 of one of the interchangeable subframes 3000, 3016, 3018 can be coupled the third longitudinal member 2630 of the chassis 3100 via one or more fastening techniques (e.g., a fastener, a weld, a chemical adhesive, a press-fit, etc.) or combination thereof. In some examples, the second side rail 3010 of one of the interchangeable subframes 3000, 3016, 3018 can be coupled the fourth longitudinal member 2632 of the chassis 3100 via one or more fastening techniques (e.g., a fastener, a weld, a chemical adhesive, a press-fit, etc.) or combination thereof. Additionally or alternatively, one of the interchangeable subframes 3000, 3016, 3018 can be coupled to the rear chassis portion 2606 via one or more bushings and/or brackets.

As such, the chassis 3100 can be configured to include different ones of the interchangeable performance packages 2700, 2714, 2728 via the interchanging of the interchangeable subframes 3000, 3016, 3018. Accordingly, the chassis 3100 can be easily configured to support different vehicle models and/or types via of interchanging of the interchangeable subframes 3000, 3016, 3018, which increases the ease manufacturing and assembly by reducing the total number of unique parts used between vehicles. When combined with the other teachings of this disclosure (e.g., the scalable chassis 1900 of FIG. 19, the scalable chassis 2300 of FIG. 23, etc.), disparate vehicle types (e.g., pick-up trucks and compacts, etc.) can be implemented to share a common chassis with similar designs and a comparatively large number of common parts.

FIG. 32 is a flowchart representative of an example method to assemble the example chassis of FIG. 31 with one of the interchangeable subframes of FIG. 30A-30C. At block 3202, the model of the vehicle associated with the chassis 3100 is determined. For example, the model of the vehicle can be determined to be a pick-up truck model, a compact model, an SUV model, a crossover model, a van model, etc. In some examples, the desired performance characteristics (e.g., engine torque, engine power, suspension characteristics is determined).

At block 3204, one of the interchangeable performance packages 2700, 2714, 2718 is selected based on the determined model of the vehicle. For example, if the model of the vehicle is a passenger model, the first interchangeable performance package 2700 is selected. If the model of the vehicle is a hauling model and/or a heavier passenger model, the second interchangeable performance package 2714 is selected. If the model of the vehicle is a performance model, the third interchangeable performance package 2728 is selected. In other examples, other suitable performance packages can be selected based on the model. In some examples, multiple performance packages can be selected. In such examples, the subframes associated with the selected performance packages can be coupled to different portions of the chassis 3100 (e.g., the first interchangeable subframe 3000 coupled within the first cavity 2624, the second interchangeable subframe 3016 coupled within the second cavity 2634, etc.).

At block 3206, the subframe associated with the selected performance package is selected. For example, if the first interchangeable performance package 2700 was selected, the first interchangeable subframe 3000 can be selected. If the second interchangeable performance package 2714 was selected, the second interchangeable subframe 3016 is selected. If the third interchangeable performance package 2728 was selected, the third interchangeable subframe 3018 is selected.

At block 3208, the selected subframe including the selected performance package is assembled. For example, the first crossmember 3004, the second crossmember 3006, the first side rail 3008, and the second side rail 3010 of the selected one of the interchangeable subframes 3000, 3016, 3018 can be assembled via suitable fastening technique(s) (e.g., welds, press-fits, chemical adhesive, fastener(s), etc.). If the first interchangeable subframe 3000 was selected, the first interchangeable performance package 2700 can be coupled to the first crossmember 3004, the second crossmember 3006, the first side rail 3008, and the second side rail 3010 via the first motor mounting feature 2704A, the second motor mounting feature 2704B, the first frame mounting feature 2712A, and the frame mounting feature 2712B. In some examples, the first wheel 3012 and the second wheel 3014 can be coupled to the first interchangeable subframe 3000 via the first wheel mounting feature 2710A and the second wheel mounting feature 2710B, respectively. If the second interchangeable subframe 3016 was selected, the second interchangeable performance package 2714 can be coupled to the first crossmember 3004, the second crossmember 3006, the first side rail 3008, and the second side rail 3010 the third motor mounting feature 2718A, the fourth motor mounting feature 2718B, the third frame mounting feature 2726A, and the fourth frame mounting feature 2726B. In some examples, the first wheel 3012 and the second wheel 3014 can be coupled to the second interchangeable subframe 3016 via the third wheel mounting feature 2724A and the fourth wheel mounting feature 2724B, respectively. If the third interchangeable subframe 3018 was selected, the second interchangeable performance package 2714 can be coupled to the first crossmember 3004, the second crossmember 3006, the first side rail 3008, and the second side rail 3010 the fifth motor mounting feature 2732A, the sixth motor mounting feature 2732B, the fifth frame mounting feature 2742A, and the sixth frame mounting feature 2742B. In some examples, the first wheel 3012 and the second wheel 3014 can be coupled to the third interchangeable subframe 3018 via the fifth wheel mounting feature 2740A and the sixth wheel mounting feature 2740B, respectively.

At block 3210, the assembled subframes are coupled to the chassis 3100. For example, the first crossmember 3004, the second crossmember 3006, the first side rail 3008, and the second side rail 3010 can be coupled to the corresponding structural members of the chassis 3100. For example, the first crossmember 3004 of one of the interchangeable subframes 3000, 3016, 3018 can be coupled to the third crossmember 2626 of the chassis 3100 via one or more fastening techniques (e.g., a fastener, a weld, a chemical adhesive, a press-fit, etc.) or combination thereof. In some examples, the second crossmember 3006 of one of the interchangeable subframes 3000, 3016, 3018 can be coupled the fourth crossmember 2628 of the chassis 3100 via one or more fastening techniques (e.g., a fastener, a weld, a chemical adhesive, a press-fit, etc.) or combination thereof. In some examples, the first side rail 3008 of one of the interchangeable subframes 3000, 3016, 3018 can be coupled the third longitudinal member 2630 of the chassis 3100 via one or more fastening techniques (e.g., a fastener, a weld, a chemical adhesive, a press-fit, etc.) or combination thereof. In some examples, the second side rail 3010 of one of the interchangeable subframes 3000, 3016, 3018 can be coupled the fourth longitudinal member 2632 of the chassis 3100 via one or more fastening techniques (e.g., a fastener, a weld, a chemical adhesive, a press-fit, etc.) or combination thereof. Additionally or alternatively, one of the interchangeable subframes 3000, 3016, 3018 can be coupled to the rear chassis portion 2606 via one or more bushings and/or brackets. The method 3200 ends.

Figure 33A:
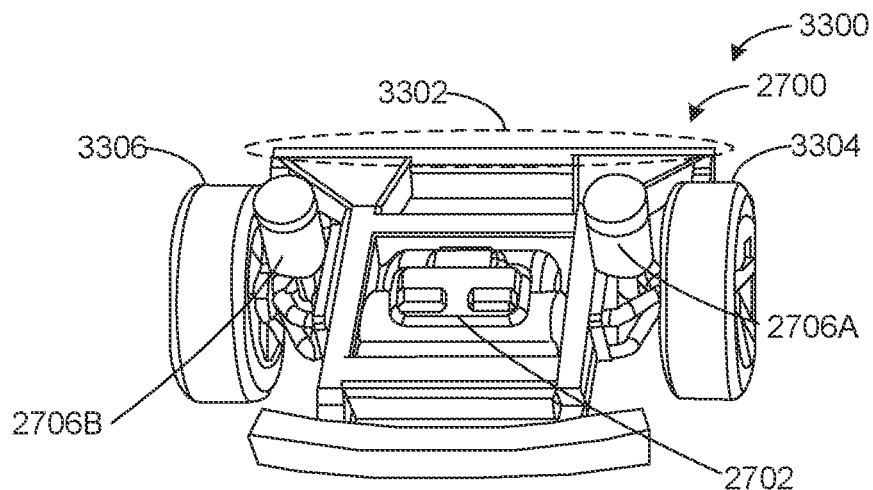
FIGS. 33A-33C are perspective views of interchangeable chassis portions.

FIG. 33A is a perspective view of an example first interchangeable chassis portion 3300 including the first interchangeable performance package 2700 of FIG. 27A. In the illustrated example of FIG. 33A, the elements of the first interchangeable performance package 2700 (e.g., the first electric motor 2702, the first suspension assembly 2706A, the second suspension assembly 2706B, etc.) are coupled within the first interchangeable chassis portion 3300. In the illustrated example of FIG. 33A, the suspension assemblies 2706A, 2706B are coupled to an example first wheel 3304 and an example second wheel 3306, respectively. The example first interchangeable chassis portion 3300 includes example first attachment locators 3302.

Figure 33B:
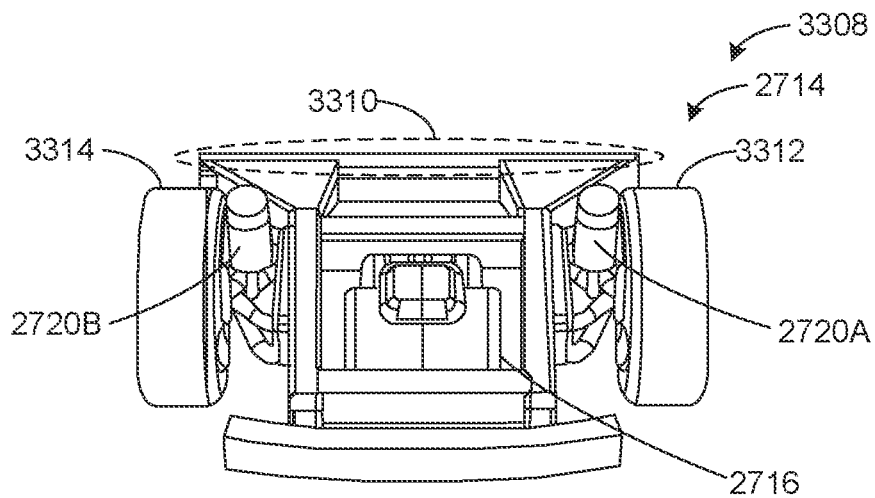

FIG. 33B is a perspective view of an example second interchangeable chassis portion 3308 including the interchangeable performance package 2714 of FIG. 27B. In the illustrated example of FIG. 33B, the elements of the second interchangeable performance package 2714 (e.g., the second electric motor 2716, the third suspension assembly 2720A, the fourth suspension assembly 2720B, etc.) are coupled within the second interchangeable chassis portion 3308. In the illustrated example of FIG. 33B, the suspension assemblies 2720A, 2720B are coupled to an example first wheel 3312 and an example second wheel 3314, respectively. The example second interchangeable chassis portion 3308 includes example second attachment locators 3310.

Figure 33C:
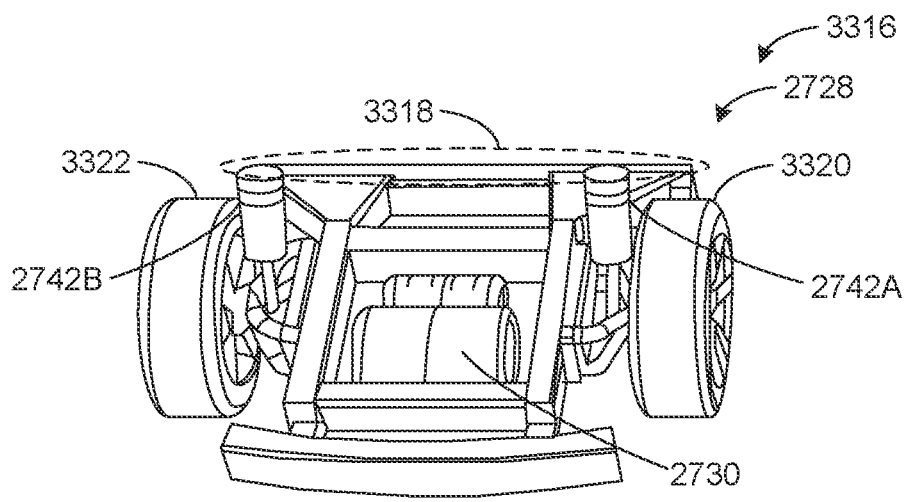

FIG. 33C is a perspective view of an example third interchangeable chassis portion 3316 including the third interchangeable performance package 2728 of FIG. 27C. In the illustrated example of FIG. 33C, the elements of the third interchangeable performance package 2728 (e.g., the third electric motor 2730, the fifth suspension assembly 2734A, the sixth suspension assembly 2734B, etc.) are coupled within the third interchangeable chassis portion 3316. In the illustrated example of FIG. 33C, the suspension assemblies 2734A, 2734B are coupled to an example first wheel 3320 and an example second wheel 3322, respectively. The example third interchangeable chassis portion 3316 includes example third attachment locators 3318.

In the illustrated example of FIGS. 33A-33C, the interchangeable chassis portions 3300, 3308, 3316 can be implemented as both front chassis portions (e.g., the front chassis portion 2604 of FIG. 26, etc.) or rear chassis portions (e.g., the rear chassis portion 2606 of FIG. 26, etc.). In other examples, side-specific chassis portions can be used. In such examples, the interchangeable chassis portions 3300, 3308, 3316 can be divided into corresponding front interchangeable chassis portions and corresponding rear interchangeable chassis portions. In the illustrated example of FIGS. 33A-33C, the interchangeable chassis portions 3300, 3308, 3316 have similar designs and components as the interchangeable chassis portions 2302A, 2302B, 2304A, 2304B of FIG. 23. In other examples, the in the interchangeable chassis portions 3300, 3308, 3316 can have any other suitable design and can include different components.

Figure 34:
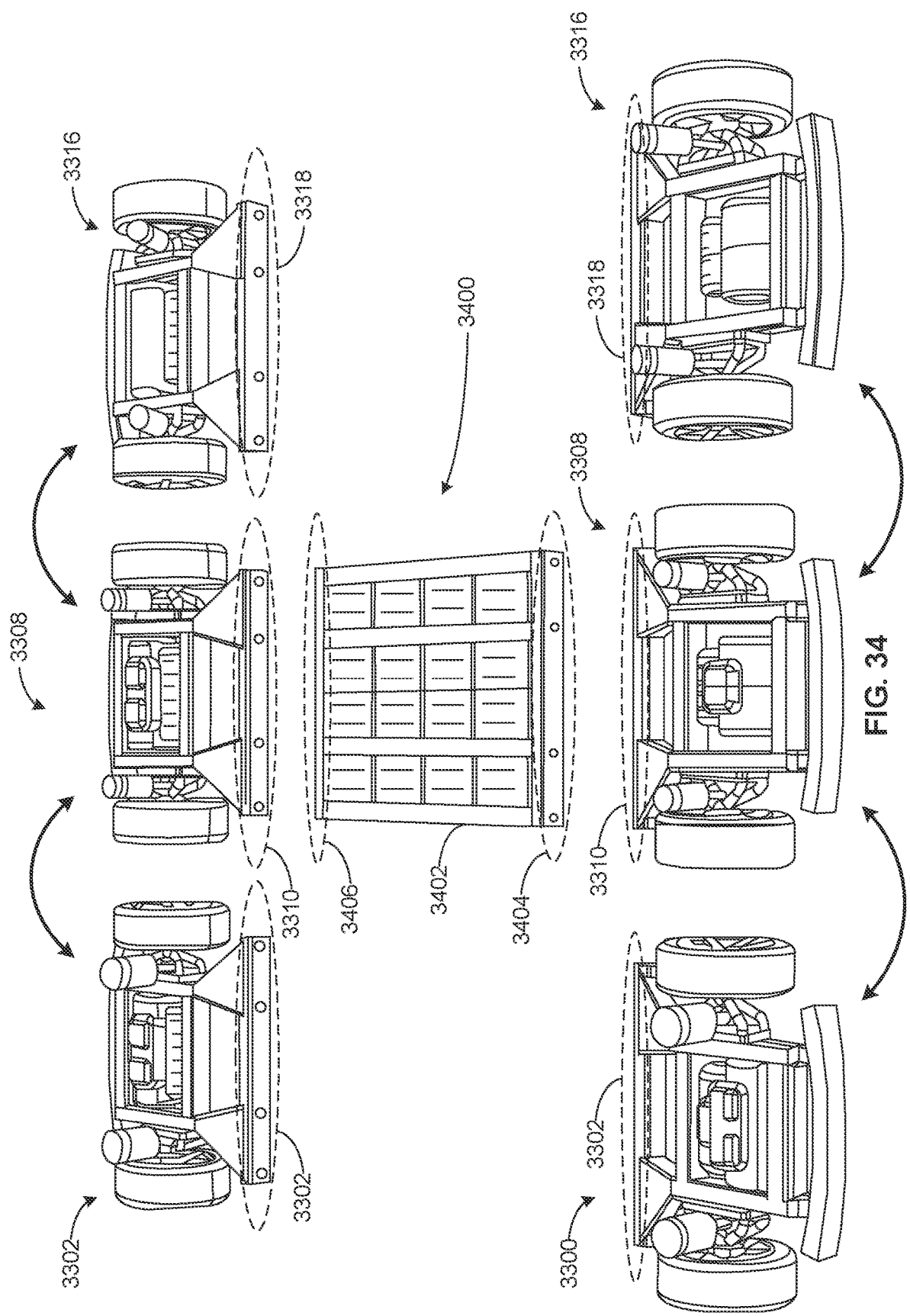
FIG. 34 is a perspective view of another example vehicle chassis and the interchangeable subframes of FIG. 30A-30C.

FIG. 34 is a perspective view of another example vehicle chassis 3400 that includes a plurality of the interchangeable chassis portions 3300, 3308, 3316 of FIG. 33A-32C. The example vehicle chassis 3400 includes an example battery platform 3402, which includes example fourth attachment locators 3404 and example fifth attachment locators 3406.

The battery platform 3402 is a common component shared between different configurations of the chassis 3400. The example battery platform 3402 includes a plurality of structural members (e.g., crossmembers, side rails, etc.) and EV batteries. The fourth attachment locators 3404 can be coupled to the corresponding first attachment locators 3302 of the interchangeable chassis portion 3300, the corresponding second attachment locators 3310 of the second interchangeable chassis portion 3308, or the corresponding third attachment locators 3318 of the third interchangeable chassis portion 3316. The fifth attachment locators 3406 can be coupled to the corresponding first attachment locators 3302 of the first interchangeable chassis portion 3300, the corresponding second attachment locators 3310 of the second interchangeable chassis portion 3308, or the corresponding third attachment locators 3318 of the third interchangeable chassis portion 3316. In the illustrated example of FIG. 34, the attachment locators 3302, 3310, 3318 of the interchangeable chassis portions 3300, 3308, 3316 include protrusions to be received by corresponding apertures of the attachment locators 3404, 3406 of the battery platform 3402. In other examples, the attachment locators 3404, 3406 of the battery platform 3402 include protrusions to be received by the attachment locators 3302, 3310, 3318. Additionally or alternatively, the front of the battery platform 3402 can be coupled to a corresponding one of the interchangeable chassis portions 3300, 3308, 3316, and the rear of the battery platform 3402 can be coupled to a corresponding one of the interchangeable chassis portions 3300, 3308, 3316 via additional fastening techniques (e.g., welds, press-fits, chemical adhesives, fasteners, etc.).

The interchangeable chassis portions 3300, 3308, 3316 are couplable to the front and rear of the battery platform 3402. Depending on which of the interchangeable chassis portions 3300, 3308, 3316 is coupled to the front of the battery platform 3402 and which of the interchangeable chassis portions 3300, 3308, 3316 is coupled to the rear of the battery platform 3402, the performance characteristics of the chassis 3400 can be changed.

Figure 35:
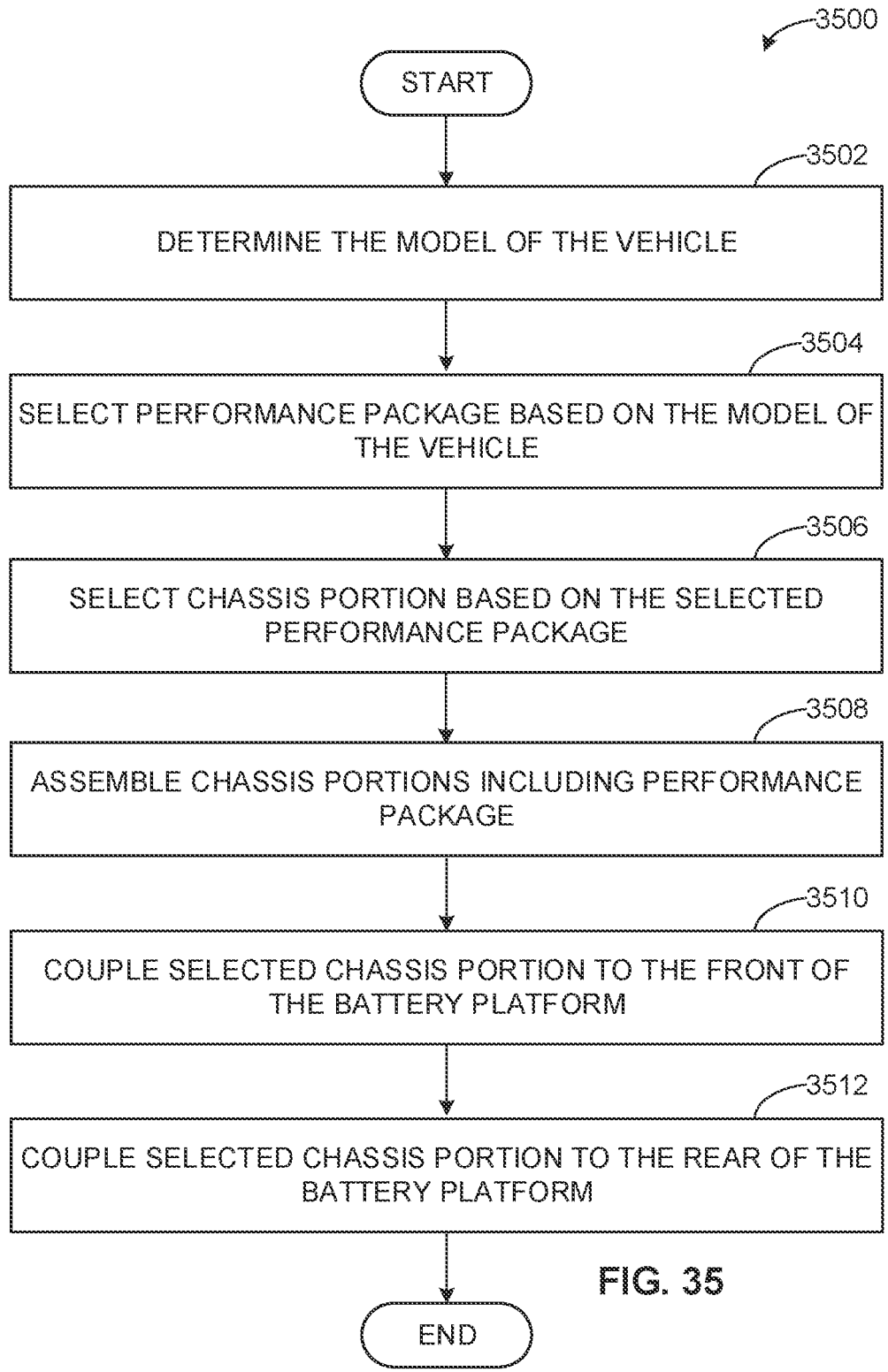
FIG. 35 is a flowchart representative of an example method to assemble the example chassis of FIG. 34 with one of the interchangeable subframes of FIG. 33A-33C.

FIG. 35 is a flowchart representative of an example method to assembly the example chassis of FIG. 34 with one of the interchangeable chassis portions 3300, 3308, 3316 of FIG. 33A-33C. At block 3502, the model of the vehicle associated with the chassis 3400 is determined. For example, the model of the vehicle can be determined to be a pick-up truck model, a compact model, an SUV model, a crossover model, a van model, etc. In some examples, the desired performance characteristics (e.g., engine torque, engine power, suspension characteristics is determined).

At block 3508, one of the interchangeable performance packages 2700, 2714, 2718 is selected based on the determined model of the vehicle. For example, if the model of the vehicle is a passenger model, the first interchangeable performance package 2700 is selected. If the model of the vehicle is a hauling model, the second interchangeable performance package 2714 is selected. If the model of the vehicle is a performance model, the third interchangeable performance package 2728 is selected. In other examples, other suitable performance packages can be selected based on the model. In some examples, multiple performance packages can be selected. In such examples, different ones of the interchangeable chassis portions 3300, 3308, 3316 can be coupled to the front and rear of the battery platforms 3402.

At block 3506, the chassis portion associated with the selected performance package is selected. For example, if the first interchangeable performance package 2700 was selected, the first interchangeable chassis portion 3300 can be selected. If the second interchangeable performance package 2714 was selected, the second interchangeable chassis portion 3308 is selected. If the third interchangeable performance package 2728 was selected, the third interchangeable chassis portion 3118 is selected.

At block 3508, the selected chassis portion(s) including the selected performance package are assembled. For example, the structural members of the selected chassis portions can be assembled in a manner similar to the chassis portions 2304A, 2304B, 2306B, 2306B of FIG. 23. If the first interchangeable chassis portion 3300 was selected, the first interchangeable performance package 2700 can be coupled to the first interchangeable chassis portion 3300 via the first motor mounting feature 2704A, the second motor mounting feature 2704B, the first frame mounting feature 2712A, and the frame mounting feature 2712B. In some examples, the first wheel 3312 and the second wheel 3314 can be coupled to the first interchangeable chassis portion 3300 via the first wheel mounting feature 2710A and the second wheel mounting feature 2710B, respectively. If the second interchangeable chassis portion 3308 was selected, the second interchangeable performance package 2714 can be coupled to the second interchangeable chassis portion 3308 via the third motor mounting feature 2718A, the fourth motor mounting feature 2718B, the third frame mounting feature 2726A, and the fourth frame mounting feature 2726B. In some examples, the first wheel 3312 and the second wheel 3314 can be coupled to the second interchangeable chassis portion 3308 via the third wheel mounting feature 2724A and the fourth wheel mounting feature 2724B, respectively. If the third interchangeable chassis portion 3316 was selected, the third interchangeable performance package 2728 can be coupled to the third interchangeable chassis portion 3316 the fifth motor mounting feature 2732A, the sixth motor mounting feature 2732B, the fifth frame mounting feature 2742A, and the sixth frame mounting feature 2742B. In some examples, the first wheel 3312 and the second wheel 3314 can be coupled to the third interchangeable chassis portion 3316 via the fifth wheel mounting feature 2740A and the sixth wheel mounting feature 2740B, respectively.

At block 3510, the selected one of the interchangeable chassis portions 3300, 3308, 3316 is coupled to the front of the battery platform 3402. For example, if the first interchangeable chassis portion 3300 is selected, the first attachment locators 3302 are coupled to the fourth attachment locators 3404. If the second interchangeable chassis portion 3308 was selected, the second attachment locators 3310 are coupled to the fourth attachment locators 3404. If the third interchangeable chassis portion 3316 was selected, the third attachment locators 3318 are coupled to the fourth attachment locators 3404. In some examples, the attachment locators 3302, 3310, 3318 include protrusions to be received by corresponding apertures of the fourth attachment locator 3404 of the battery platform 3402. In other examples, the fifth attachment locators 3404 include protrusions to be received by the attachment locators 3302, 3310, 3318. Additionally or alternatively, the front of the battery platform 3402 can be coupled to the selected one of the interchangeable chassis portions 3300, 3308, 3316 via additional fastening techniques (e.g., welds, press-fits, chemical adhesives, fasteners, etc.).

At block 3512, the selected one of the interchangeable chassis portions 3300, 3308, 3316 is coupled to the rear of the battery platform 3402. For example, if the first interchangeable chassis portion 3300 is selected, the first attachment locators 3302 are coupled to the fifth attachment locators 3406. If the second interchangeable chassis portion 3308 was selected, the second attachment locators 3310 are coupled to the fifth attachment locators 3406. If the third interchangeable chassis portion 3316 was selected, the third attachment locators 3318 are coupled to the fifth attachment locators 3406. In some examples, the attachment locators 3302, 3310, 3318 include protrusions to be received by corresponding apertures of the fifth attachment locators 3406 of the battery platform 3402. In other examples, the fifth attachment locators 3406 of the battery platform 3402 include protrusions to be received by the attachment locators 3302, 3310, 3318. Additionally or alternatively, the rear of the battery platform 3402 can be coupled to the selected one of the interchangeable chassis portions 3300, 3308, 3316 via additional fastening techniques (e.g., welds, press-fits, chemical adhesives, fasteners, etc.). The method 3500 ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Configurable vehicle chassis and associated methods are disclosed herein. Further examples and combinations thereof include the following:

Example 1 includes a vehicle frame including end frames and a central frame coupled between the end frames, the central frame positioned at an offset relative to the end frames, the vehicle frame rotatable about a longitudinal axis of the vehicle frame between a first position and a second position, the central frame at a first distance from the ground when the vehicle frame is in the first position, the central frame at a second distance from the ground when the vehicle frame is in the second position, the second distance greater than the first distance.

Example 2 includes the vehicle frame of Example 1, and further includes mirrored attachment points positioned on each of the end frames, the mirrored attachment points to receive a suspension system.

Example 3 includes the vehicle frame of Example 2, where the suspension system is coupled to the end frames in a same orientation when the vehicle frame is in the first position or the second position.

Example 4 includes the vehicle frame of Example 1, where the central frame is to receive one or more battery packs.

Example 5 includes the vehicle frame of Example 4, where electric motors are coupled to the end frames, the electric motors operatively coupled to wheels, wherein operation of the electric motors causes corresponding rotation of the wheels, the electric motors powered by the one or more battery packs.

Example 6 includes the vehicle frame of Example 5, where the electric motors are configured to rotate in a first direction when the vehicle frame is in the first position and the electric motors are configured to rotate in a second direction opposite the first direction when the vehicle frame is in the second position.

Example 5 includes the vehicle frame of Example 1, where a first type of vehicle body is coupled to the vehicle frame when the vehicle frame is in the first position, and a second type of vehicle body is coupled to the vehicle frame when the vehicle frame is in the second position, the second type of vehicle body different from the first type of vehicle body.

Example 8 includes a vehicle including a vehicle frame rotatable about a longitudinal axis between first and second positions, the vehicle frame having a first ride height when the vehicle frame is in the first position, the vehicle frame having a second ride height when the vehicle frame is in the second position, the second ride height greater than the first ride height, and one of a first type of vehicle body or a second type of vehicle body, the first type of vehicle body coupled to the vehicle frame when the vehicle frame is in the first position, the second type of vehicle body coupled to the vehicle frame when the vehicle frame is in the second position, the second type of vehicle body different from the first type of vehicle body.

Example 9 includes the vehicle of Example 8, and further includes mirrored attachment points positioned on the vehicle frame, the mirrored attachment points to receive a suspension system of the vehicle, the suspension system in a same orientation when the vehicle frame is in the first position or the second position.

Example 10 includes the vehicle of Example 8, where the vehicle frame includes a base frame coupled between front and rear frames, the base frame positioned at an offset relative to the front and rear frames.

Example 11 includes the vehicle of Example 10, where the base frame is to receive one or more battery packs.

Example 12 includes the vehicle of Example 11, and further includes at least one electric motor operatively coupled to wheels of the vehicle, the at least one electric motor powered by the one or more battery packs.

Example 13 includes the vehicle of Example 12, where the at least one electric motor is mounted to the vehicle frame in a first orientation when the vehicle frame is in the first position and the at least one electric motor is mounted to the vehicle frame in a second orientation different from the first orientation when the vehicle frame is in the second position.

Example 14 includes the vehicle of Example 13, where the at least one electric motor is configured to rotate in a first direction when in the first orientation and the at least one electric motor is configured to rotate in a second direction opposite the first direction when in the second orientation.

Example 15 includes a method including in response to determining that a vehicle is to have a first ride height, rotating a vehicle frame of the vehicle about a longitudinal axis to a first position, the vehicle frame rotatable between the first position and a second position, the vehicle frame having the first ride height when the vehicle frame is in the first position, the vehicle frame having a second ride height when the vehicle frame is in the second position, the second ride height greater than the first ride height, and coupling one of a first type of vehicle body or a second type of vehicle body to the vehicle frame, the first type of vehicle body coupled to the vehicle frame when the vehicle frame is in the first position, the second type of vehicle body coupled to the vehicle frame when the vehicle frame is in the second position, the second type of vehicle body different from the first type of vehicle body.

Example 16 includes the method of Example 15, and further includes assembling the vehicle frame by coupling a base frame between front and rear frames, the base frame positioned at an offset relative to the front and rear frames, the base frame to receive one or more battery packs.

Example 17 includes the method of Example 16, and further includes coupling one or more mirrored attachment points to the front and rear frames, the mirrored attachment points to receive a suspension system of the vehicle.

Example 18 includes the method of Example 17, and further includes mounting the suspension system to the vehicle frame in a same orientation when the vehicle frame is in the first position or the second position.

Example 19 includes the method of Example 16, and further includes coupling at least one electric motor to the front and rear frames, and electrically coupling the at least one electric motor to the one or more battery packs.

Example 20 includes the method of Example 19, and further includes mounting the at least one electric motor in a first orientation when the vehicle frame is in the first position and mounting the at least one electric motor in a second orientation different from the first orientation when the vehicle frame is in the second position, the at least one electric motor to operate in a first direction when in the first orientation and in a second direction opposite the first direction when in the second orientation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle frame comprising:
   a convex surface to face the ground when the vehicle frame is in a first operating position and face away from the ground when the vehicle frame is in a second operating position, the vehicle frame rotatable about a longitudinal axis of the vehicle frame between the first and second operating positions; and
   a concave surface opposite the convex surface, the concave surface to face away from the ground when the vehicle frame is in the first operating position and face the ground when the vehicle frame is in the second operating position.

2. The vehicle frame of claim 1, wherein the convex surface is at a first distance from the ground when the vehicle frame is in the first operating position, the concave surface is at a second distance from the ground when the vehicle frame is in the second operating position, the first distance less than the second distance.

3. The vehicle frame of claim 2, wherein front and rear ends of the vehicle frame are at a third distance from the ground, the third distance greater than the first distance and less than the second distance.

4. The vehicle frame of claim 1, wherein the convex surface is couplable to a first vehicle body and the concave surface is couplable to a second vehicle body, the first vehicle body different from the second vehicle body.

5. The vehicle frame of claim 4, wherein the first vehicle body is a truck body and the second vehicle body is a van body.

6. The vehicle frame of claim 1, further including mirrored attachment points positioned on the vehicle frame, a vehicle suspension system couplable to the mirrored attachment points in a same orientation when the vehicle frame is in the first operating position or the second operating position.

7. The vehicle frame of claim 1, wherein at least one battery pack is to be disposed in the vehicle frame between the convex surface and the concave surface.

8. A vehicle frame comprising:
   a first end frame at a front end of the vehicle frame, the first end frame defining a first wheel axle;
   a second end frame at a rear end of the vehicle frame, the second end frame defining a second wheel axle; and
   a central frame coupled between the first and second end frames, the vehicle frame rotatable about a longitudinal axis of the vehicle frame between a first operating position and a second operating position, the central frame angled upward toward the first and second wheel axles when the vehicle frame is in the first operating position, the central frame angled downward toward the first and second wheel axles when the vehicle frame is in the second operating position, the first end frame, the second end frame, and the central frame defining a convex surface and a concave surface opposite the convex surface, the convex surface to face the ground when the vehicle frame is in the first operating position, the concave surface to face the ground when the vehicle frame is in the second operating position.

9. The vehicle frame of claim 8, wherein the vehicle frame has a first ride height when the vehicle frame is in the first operating position and a second ride height when the vehicle frame is in the second operating position, the second ride height greater than the first ride height.

10. The vehicle frame of claim 8, wherein the vehicle frame is to rotate 180 degrees about the longitudinal axis between the first and second operating positions.

11. The vehicle frame of claim 8, further including first mirrored attachment points positioned on the first end frame and second mirrored attachment points positioned on the second end frame, a first suspension system to be mounted to the first mirrored attachment points and operatively coupled to first wheels of the first wheel axle, a second suspension system to be mounted to the second mirrored attachment points and operatively coupled to second wheels of the second wheel axle.

12. The vehicle frame of claim 11, wherein the first and second suspension systems are to be mounted to the first and second mirrored attachment points in a same orientation when the vehicle frame is in the first operating position or in the second operating position.

13. The vehicle frame of claim 8, wherein the vehicle frame in the first operating position is couplable to a first vehicle body and the vehicle frame in the second operating position is couplable to a second vehicle body, the first vehicle body different from the second vehicle body.

14. The vehicle frame of claim 13, wherein the first vehicle body is a truck body and the second vehicle body is a van body.

15. A vehicle comprising:
   a vehicle frame rotatable about a longitudinal axis of the vehicle frame between first and second operating positions, the vehicle frame in the first operating position at a first distance from the ground, the vehicle frame in the second operating position at a second distance from the ground, the vehicle frame to define a wheel axle, the vehicle frame including a convex surface and a concave surface opposite the convex surface, the convex surface to face the ground when the vehicle frame is in the first operating position, the concave surface to face the ground when the vehicle frame is in the second operating position;

an electric motor operatively coupled to at least one wheel of the wheel axle; and a suspension system mounted to the vehicle frame and operatively coupled to the at least one wheel, the suspension system mounted to the vehicle frame in a same orientation when the vehicle frame is in the first operating position or the second operating position.

16. The vehicle of claim 15, further including one or more mirrored attachment points positioned on the vehicle frame, the suspension system mounted to the vehicle frame via the one or more mirrored attachment points.

17. The vehicle of claim 15, wherein the electric motor is mounted to the vehicle frame in a same orientation when the vehicle frame is in the first operating position or the second operating position.

18. The vehicle of claim 15, wherein the electric motor is rotatable with the vehicle frame about the longitudinal axis, the electric motor to rotate in a first rotational direction when the vehicle frame is in the first operating position, the electric motor to rotate in a second rotational direction opposite the first rotational direction when the vehicle frame is in the second operating position.

19. The vehicle of claim 15, wherein the vehicle frame is angled upward toward the wheel axle when the vehicle frame is in the first operating position and angled downward toward the wheel axle when the vehicle frame is in the second operating position.

* * * * *